United States Patent

Kumakura

[11] Patent Number: 6,118,618
[45] Date of Patent: *Sep. 12, 2000

[54] DISK CARTRIDGE LOADING DEVICE FOR RECORDING AND/OR REPRODUCING APPARATUS

[75] Inventor: Junzo Kumakura, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/676,196

[22] PCT Filed: Nov. 17, 1995

[86] PCT No.: PCT/JP95/02360

§ 371 Date: Jul. 17, 1996

§ 102(e) Date: Jul. 17, 1996

[87] PCT Pub. No.: WO96/16403

PCT Pub. Date: May 30, 1996

[30] Foreign Application Priority Data

Nov. 18, 1994 [JP] Japan .................................... 6-309828

[51] Int. Cl.[7] .................................................. G11B 17/04
[52] U.S. Cl. ................................... 360/99.02; 360/99.06; 369/77.2
[58] Field of Search ........................... 360/99.02, 99.03, 360/99.06, 99.07; 369/75.1, 75.2, 77.2

[56] References Cited

U.S. PATENT DOCUMENTS

| | | | |
|---|---|---|---|
| 4,570,195 | 2/1986 | Shimaoka et al. | 360/97 |
| 4,734,800 | 3/1988 | Suzuki | 360/85 |
| 4,772,965 | 9/1988 | Kato et al. | 360/71 |
| 5,130,869 | 7/1992 | Kikuya et al. | 360/99.06 |
| 5,153,792 | 10/1992 | Kawano | 360/99.01 |
| 5,166,918 | 11/1992 | Kamijo | 369/77.1 |
| 5,471,356 | 11/1995 | Tsuji | 360/99.07 |
| 5,537,377 | 7/1996 | Takai et al. | 369/77.2 |
| 5,574,705 | 11/1996 | Suzuki | 369/36 |

FOREIGN PATENT DOCUMENTS

| | | |
|---|---|---|
| 539199 | 4/1993 | European Pat. Off. . |
| 0557975 A2 | 9/1993 | European Pat. Off. . |
| 0561350 A2 | 9/1993 | European Pat. Off. . |
| 0606911 A2 | 7/1994 | European Pat. Off. . |
| 0609024 A2 | 8/1994 | European Pat. Off. . |
| 644539 | 3/1995 | European Pat. Off. . |
| 62-7661 | 1/1987 | Japan . |
| 62-14384 | 1/1987 | Japan . |
| 62-158660 | 10/1987 | Japan . |
| 63-142564 | 6/1988 | Japan . |
| 2-297753 | 12/1990 | Japan . |
| 4-330657 | 11/1992 | Japan . |
| 4-332955 | 11/1992 | Japan . |

OTHER PUBLICATIONS

Patent Abstracts of Japan, 61–123052, Published Jun. 10, 1986, Ricoh Co Ltd. "Disc Cartridge Loading Mechanism".

*Primary Examiner*—Brian E. Miller
*Attorney, Agent, or Firm*—Limbach & Limbach

[57] ABSTRACT

A disc cartridge loading device for a recording medium utilizes a cartridge holder for holding a disc cartridge used as a recording medium for information signals. The cartridge holder performs a movement operation when moved from a first position permitting insertion/withdrawal of the disc cartridge to a second position for loading the disc cartridge into a loading portion of a recording/reproducing apparatus. The loading device further comprises a vertical movement operation mechanism including a vertical movement operation plate for allowing vertical movement of the cartridge holder with respect to the loading portion.

10 Claims, 30 Drawing Sheets

DISK CARTRIDGE LOADING DEVICE FOR RECORDING AND/OR REPRODUCING APPARATUS

TECHNICAL FIELD

This invention relates to a loading device for loading, into a loading unit constituted within the device body, a recording medium such as an optical disc, etc. on which information signals are recorded, particularly a recording medium like a disc cartridge within which a disc such as an optical disc, etc. is accommodated, and a recording and/or reproducing apparatus for a recording medium provided with such a loading device.

BACKGROUND ART

Hitherto, as a recording medium for information signals, discs such as optical disc, magneto-optical discs and magnetic discs, etc. are used. The disc of this kind is constituted as a disc cartridge accommodated within a cartridge. A recording/reproducing apparatus using such a disc cartridge as a recording medium is adapted to load the disc cartridge at the loading section after having undergone positioning to carry out recording and/or reproduction of information signals through recording and/or reproducing means for information signals with respect to the disc accommodated within the disc cartridge.

The recording/reproducing apparatus using optical disc or magneto-optical disc as the recording medium is adapted so that the optical pick-up device and the magnetic head constituting the recording and/or reproducing means for information signals are disposed at the position corresponding to the loading section for the disc cartridge.

Meanwhile, in the recording/reproducing apparatus using disc such as optical disc, etc. as the recording medium, there is provided a loading mechanism for automatically loading the disc cartridge into the loading section within the apparatus body. The loading mechanism used in the recording/reproducing apparatus is provided with a holder adapted so that the disc cartridge is inserted therethrough and is held thereby, and a movement operation mechanism for allowing the holder to undergo movement operation ranging between the position at which insertion and withdrawal (disengagement) of the disc cartridge can be made with respect to the holder and the position where the disc cartridge is permitted to undergo loading operation into the loading section. This movement operation mechanism serves to allow the holder to undergo movement operation ranging between the position where insertion and withdrawal (disengagement) of the disc cartridge can be made and the position where the disc cartridge is permitted to undergo loading operation into the loading section. Namely, the disc cartridge is such that when the holder is in the state where it has been moved to the position where insertion and withdrawal of the disc cartridge can be made, insertion and withdrawal with respect to the holder is carried out through the insertion/withdrawal hole provided at the outer casing constituting the apparatus body, and when the holder is in the state where it has been moved to the position where the disc cartridge is permitted to undergo loading operation into the loading section, insertion/withdrawal with respect to the loading section is carried out.

The disc cartridge which has been inserted into the holder and held thereby, which is placed in the state where it has been moved to the position at which insertion/withdrawal of the disc cartridge can be made is caused to undergo movement operation along with the holder in a direction parallel to the principal surface of the disc accommodated within the cartridge, and is transferred (moved) to the position opposite to the loading section. The cartridge is then caused to undergo movement operation in a direction perpendicular to the principal surface of the disc, and is loaded into the loading section.

Moreover, in carrying out an eject operation to eject the disc cartridge loaded in the loading section to the outward of the apparatus body, the loading mechanism serves to first allow the disc cartridge to undergo movement operation in a direction perpendicular to the principal surface of the disc so that it is withdrawn from the loading section thereafter to carry out movement operation along with the holder in a direction parallel to the principal surface of the disc to move the disc cartridge to the insertion/withdrawal hole side.

Meanwhile, in the recording/reproducing apparatus of the slot in system adapted to allow the disc cartridge to undergo loading operation through the insertion/withdrawal hole provided at the apparatus body, in carrying out eject operation of the disc cartridge, it is necessary to project a portion of the disc cartridge from the insertion/withdrawal hole. With respect to the insertion/withdrawal hole provided at the recording/reproducing apparatus of this kind, since an insertion/withdrawal hole substantially equal in the thickness and the width to the disc cartridge is only provided, it is impossible to insert fingers into the apparatus body to carry out drawing operation of the disc cartridge. Therefore, in carrying out eject operation of the disc cartridge loaded at the loading portion within the apparatus body, it is necessary to project at least one portion of the disc cartridge out of the apparatus body through the insertion/withdrawal hole so that holding by fingers is possible. In order to face a portion of the disc cartridge toward the outward of the apparatus body from the insertion/withdrawal hole at the time of eject operation in this way, it is necessary to allow the movement range of the holder for holding the disc cartridge and carrying out feed operation of the disc cartridge to be large. As a result, the recording/reproducing apparatus itself becomes large.

Further, there are used recording/reproducing apparatuses in which, in order to project the disc cartridge toward the outward of the apparatus body through the insertion/withdrawal hole at the time of eject operation, biasing force of spring is utilized to project the disc cartridge from the holder. The recording/reproducing apparatus in which spring is used to project the disc cartridge toward the outward of the apparatus body as stated above is of a structure to allow the holder to undergo transfer operation up to a predetermined position of the inward side of the apparatus body to project, to the outward of the apparatus body, the disc cartridge by making use of biasing force of spring from the position where the holder is stopped. Accordingly, this recording/reproducing apparatus can reduce the movement range of the holder to realize miniaturization of the apparatus itself.

However, in the recording/reproducing apparatus adapted to project the disc cartridge from the insertion/withdrawal hole by using biasing force of spring, quantity of projection from the insertion/withdrawal hole would not be constant in dependency upon state of the surface of the disc cartridge, deformation of the appearance shape thereof, or the like. Moreover, if biasing force of spring for biasing the disc cartridge is too large, the disc cartridge is suddenly projected from the insertion/withdrawal hole at the time of eject operation. Further, the disc cartridge would be jumped out from the apparatus body. In order to prevent such sudden jumping out of the disc cartridge, loading devices such that brake mechanism is provided are also used. However, not only does the mechanism becomes complicated, but also it is difficult to set force of spring for biasing the disc cartridge and brake force of the brake mechanism to respective suitable values. Thus, stable eject operation of the disc cartridge cannot be carried out.

DISCLOSURE OF THE INVENTION

An object of this invention is to provide a novel loading device for a recording medium and a novel recording and/or reproducing apparatus to solve the problems that the conventional loading device and the recording and/or reproducing apparatus have.

Another object of this invention is to provide miniaturization of a device for allowing a recording medium like disc cartridge to undergo loading operation into the loading portion within the apparatus body, and to realize miniaturization of the recording and/or reproducing apparatus itself.

A further object of this invention is to provide a loading device and a recording and/or reproducing apparatus which allow the movement range of the disc cartridge to be large while reducing the movement range of the holder as holding means for holding the disc cartridge within which disc such as optical disc, etc. is accommodated, thus making it possible to securely carry out loading into the loading portion, and making it possible to securely carry out eject operation.

In order to attain objects as described above, a loading device according to this invention comprises a loading portion constituted on a base and adapted so that a recording medium is loaded thereinto, a holder for holding the recording medium inserted or loaded thereinto, and movably provided between a first position where taking out of the inserted recording medium is possible and a second position where the holder is positioned above the loading portion, a movement mechanism for moving the holder from the first position to the second position by rotational operation of a first range, a loading mechanism driven by rotational operation of a second range continuous to the rotational operation of the first range of the movement mechanism and for loading the holder moved to the second position by the movement mechanism into the loading portion, and limiting means provided at the loading mechanism, and for limiting movement with respect to the base of the holder when the holder is moved from the first position to the second position or from the second position to the first position and for releasing limitation of movement with respect to the base of the holder in a manner interlocking with the operation that the loading mechanism allows the holder to undergo loading into the loading portion.

Further, the loading device according to this invention comprises an eject operation mechanism provided at the holder and for moving the disc cartridge held by the holder in a direction to project it from the holder, and a movement operation mechanism for driving the eject operation mechanism in a direction to project, from the holder, the disc cartridge inserted into the holder.

Moreover, a recording and/or reproducing apparatus according to this invention comprises a recording and/or reproducing unit which carries out recording and/or reproduction of information with respect to a disc, provided with a head slidably in contact with one surface of the disc movably supported between a position slidably in contact with the disc on which information signals are recorded, accommodated within a disc cartridge and a position away from the disc, a holder for holding the disc cartridge inserted thereinto and movably provided between a first position where taking out of the inserted disc cartridge is possible and a second position where it is positioned above the recording and/or reproducing means, moving means for moving the holder from the first position to the second position by rotational operation of a first range, a loading mechanism driven by rotational operation of a second range continuous to the rotational operation of the first range of the movement means and for loading the holder moved to the second position by the movement means into the recording and/or reproducing unit, and a head movement mechanism driven by the loading mechanism and moved between a position where the head is caused to be in slide contact with the disc and a position where it is caused to be away from the disc.

Further, the recording and/or reproducing apparatus according to this invention includes a base on which the recording and/or reproducing unit is disposed, and limiting means provided at the loading mechanism which allows the holder to undergo loading operation into the recording and/or reproducing unit, and for limiting movement with respect to the base of the holder when the holder is moved from the first position to the second position or from the second position to the first position, and for releasing limitation of movement with respect to the base of the holder in a manner interlocking with the operation that the loading mechanism allows the holder to undergo loading into the recording and/or reproducing unit.

Still further objects of this invention and the advantages realized by this invention will be more apparent by modes of more practical embodiments which will be described below with reference to the attached drawings.

BEST MODE FOR CARRYING OUT THE INVENTION

A loading device and a recording/reproducing apparatus provided with such a loading device to which this invention is applied will be described below with reference to the attached drawings.

The loading device and the recording/reproducing apparatus to which the loading device is applied which will be described later are equipment using disc cartridge in which a disc is accommodated within a cartridge as a recording medium on which information signals are recorded. Namely, the disc as the recording medium is accommodated within the cartridge and is caused to undergo loading operation into the loading portion within the recording/reproducing apparatus in one body with the cartridge.

[1] Disc Cartridge

Prior to explanation of the loading device and the recording/reproducing apparatus to which this invention is applied, the disc cartridge caused to undergo loading by the loading device and used as a recording medium for a recording/reproducing apparatus will be described below.

Figure 1:
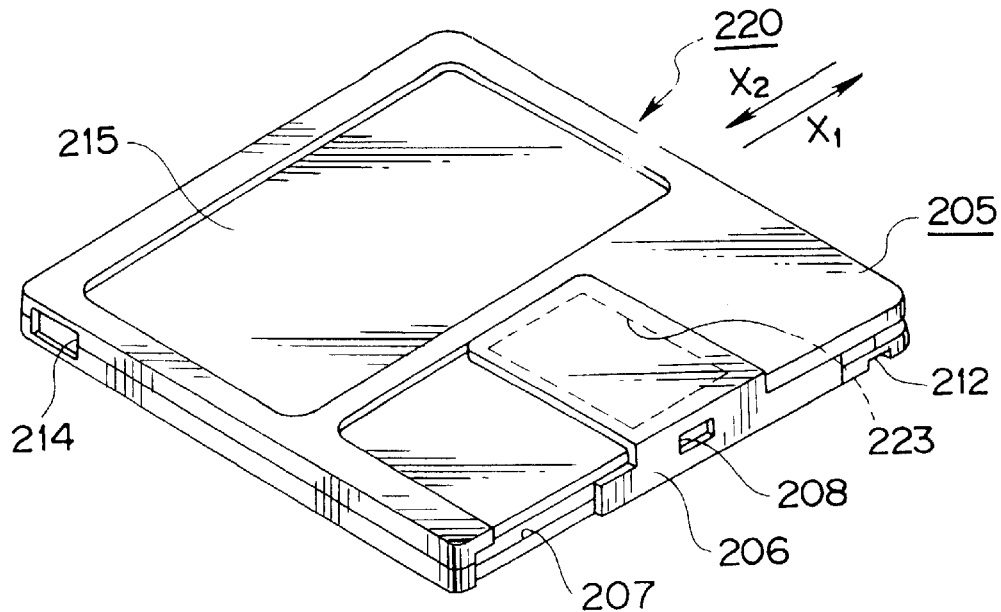
FIG. 1 is a perspective view showing a disc cartridge of the recording type within which magneto-optical disc used as a recording medium for a recording and/or reproducing apparatus according to this invention is accommodated.
Figure 2:
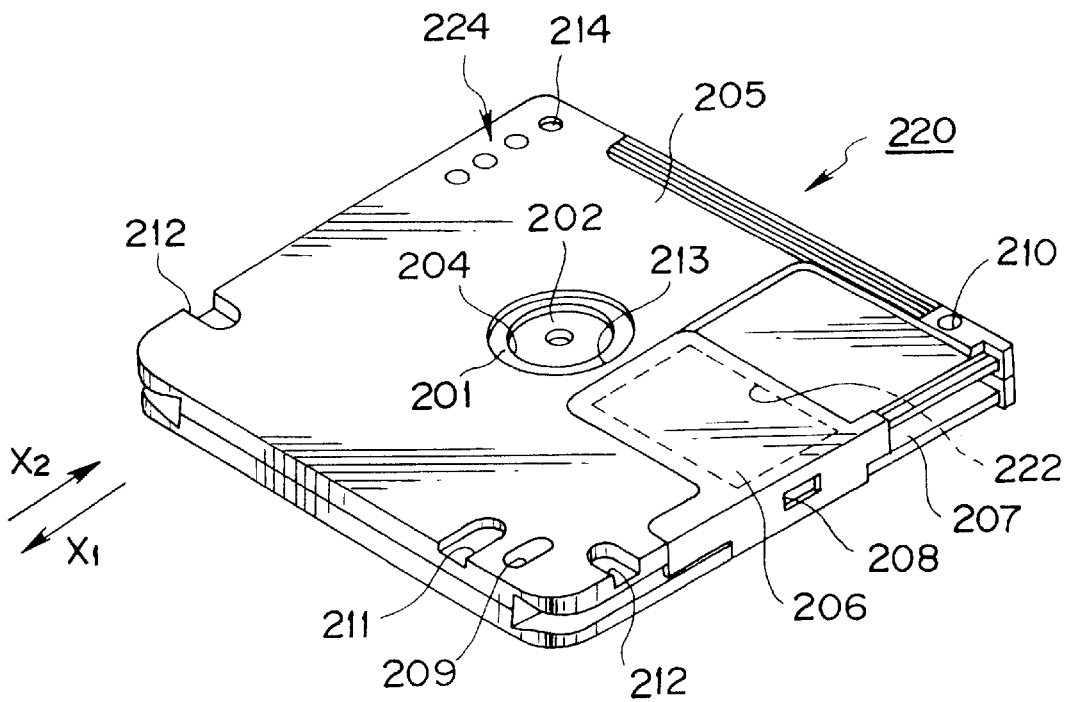
FIG. 2 is a perspective view when the disc cartridge is viewed from the loading surface side onto disc table.
Figure 3:
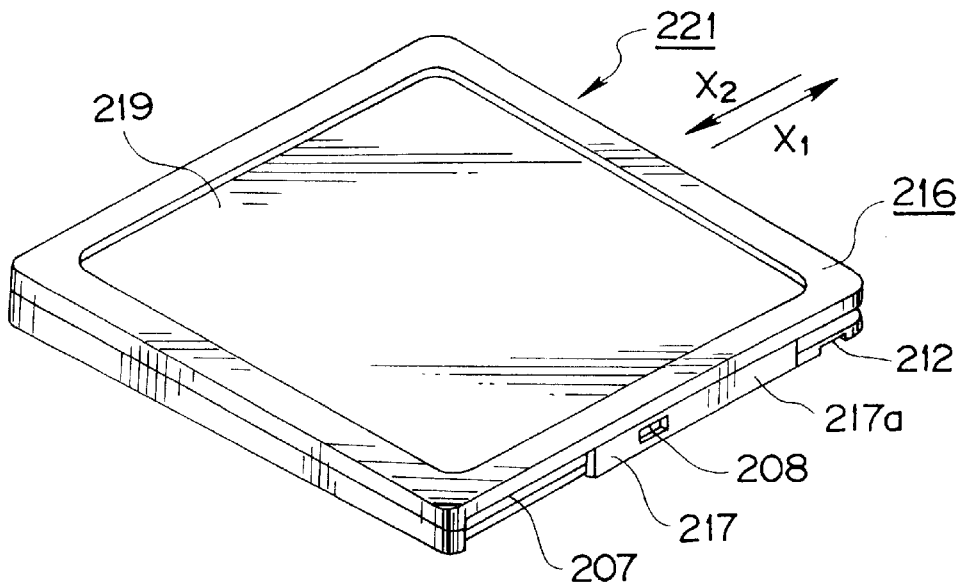
FIG. 3 is a perspective view showing a disc cartridge of the reproduction only type within which optical disc used as recording medium for the recording and/or reproducing apparatus according to this invention is accommodated.
Figure 4:
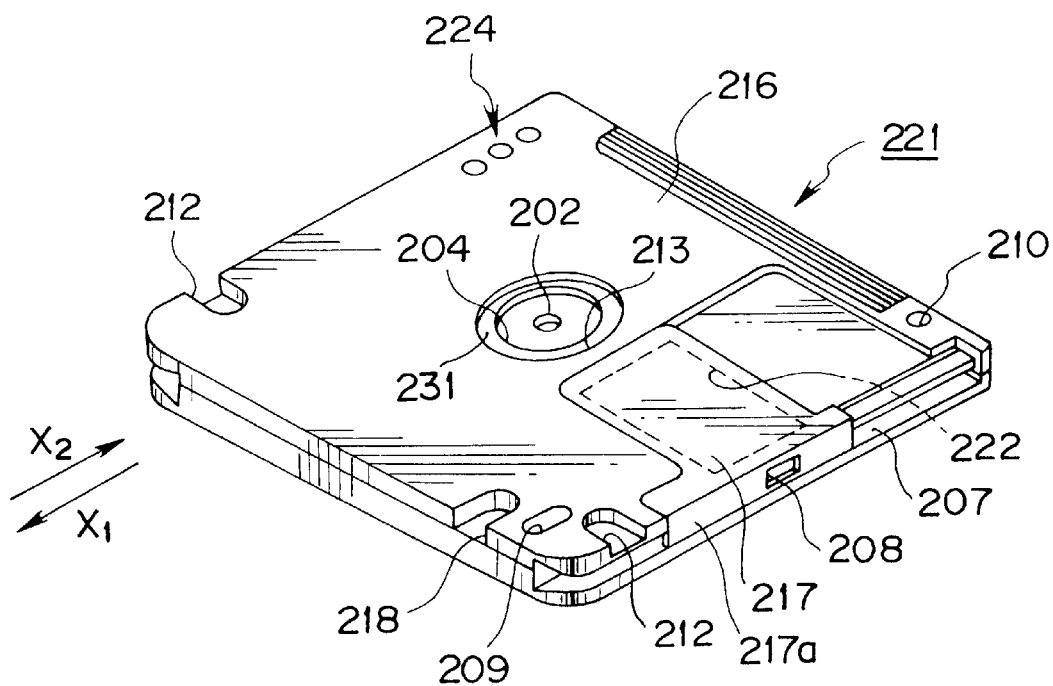
FIG. 4 is a perspective view when the disc cartridge is viewed from the loading surface side onto disc table.

As the disc cartridge used here, there are used a disc cartridge constituted as shown in FIGS. 1 and 2 within which magneto-optical disc which permits re-recording of information signals such as music signal, etc. is accommodated, and a disc cartridge constituted as shown in FIGS. 3 and 4 within which optical disc of the reproduction only type on which information signals such as music signal, etc. are recorded in advance and used only for reproduction of these recorded information signals.

Magneto-optical disc 201 which permits re-recording of information signals is of a structure in which a signal recording layer comprised of perpendicular magnetization film is deposited and formed on a disc base (substrate) consisting of transparent synthetic resin material like polycarbonate having, e.g., diameter of about 64 mm.

This signal recording layer is locally heated by light beams emitted from a light source of an optical pick-up device so that temperature is above Curie temperature. When an external magnetic field is applied to the heated portion, recording of information signals is carried out. The information signals recorded in this way are read out by irradiating linearly polarized light beams onto the signal recording layer to detect, by means of light detector, rotation of polarization direction by the Kerr effect of return light reflected from the signal recording layer.

Moreover, optical disc 231 of the reproduction only type is of a structure in which a reflection layer consisting of metallic material such as aluminum is deposited and formed on a disc base (substrate) similar to the disc base (substrate) of the magneto-optical disc 201. Fine pit trains corresponding to information signals are formed at the optical disc 231, whereby recording of information signals is fixedly carried out. Recording of information signals onto the optical disc 231 is carried out as the result of the fact that there are transferred pit trains formed in advance at stamper loaded (fitted) within a metal mold unit in molding the disc base. The information signals recorded on the optical disc 231 of the reproduction only type are read out by irradiating, to the pit trains, light beams emitted from the light source of the optical pick-up device to detect, by means of light detector, return light reflected from the optical disc 231.

Further, the magneto-optical disc 201 and the optical disc 231 are respectively rotatably accommodated into cartridge bodies 205, 216 as shown in FIGS. 1 and 2, and FIGS. 3 and 4 to constitute disc cartridges 220 and 221.

The disc cartridge 220 of the recording type to permit re-recording of information signals within which the magneto-optical disc 201 is accommodated includes a cartridge body 205 in which the outside diameter of the magneto-optical disc 201 is caused to be substantially inscribed circle as shown in FIGS. 1 and 2. At the upper surface side of the cartridge body 205, as shown in FIG. 1, there is formed an opening portion 223 for magnetic head which allows a portion of the signal recording area of the magneto-optical disc 201 accommodated therewithin to be faced to the outward over the inner and outer circumferences. Moreover, at the lower surface side of the cartridge body 205, as shown in FIG. 2, there is formed an opening portion 222 for optical pick-up device which allows a portion of the signal recording area of the magneto-optical disc 201 to be similarly faced to the outward over the inner and outer circumferences. Further, at the central portion of the lower surface side of the cartridge body 205, there is formed a central opening portion 213 formed circular into which a disc table constituting a disc rotation operation mechanism for rotationally operating the magneto-optical disc 201 accommodated within the cartridge body 205 is admitted.

At the cartridge body 205 of the disc cartridge 220 of the recording type, a shutter member 206 for opening/closing the respective opening portions 223, 222 is attached. This shutter member 206 is formed by punching and bending thin metal plate, and is composed of shutter plates having dimensions sufficient to cover respective opening portions 223, 222 and a connecting portion which connects base end portions of these shutter plates. The shutter member 206 is formed channel-shaped in cross section. It is to be noted that a shutter member formed by molding synthetic resin may be used as the shutter member 206. The shutter member 206 is attached at the front surface side of the cartridge body 205 so that respective shutter plates cover the opening portions 223, 222, and moves along the front surface side to thereby open and close respective opening portions 223, 222. The shutter member 206 is such that engagement piece provided at the connecting portion is engaged with a movement guide groove 207 formed at the front surface side of the cartridge body 205. Thus, stable linear movement is guaranteed with the engagement piece being guided by movement guide groove 207.

The disc cartridge 220 of the recording type constituted as described above is inserted into the recording/reproducing apparatus or is withdrawn (detached) therefrom with one side surface perpendicular to the front surface side along which the shutter member 206 moves being as one insertion end. Namely, the disc cartridge 220 is inserted into the recording/reproducing apparatus or is withdrawn (detached) therefrom with the direction indicated by arrow $X_1$ and the direction indicated by arrow $X_2$ in FIGS. 1 and 2 being as insertion/withdrawal direction.

On the other hand, the disc cartridge 221 within which the optical disc 231 of the reproduction only type is accommodated also includes a square cartridge body 216 in which the outside diameter of the optical disc 231 is caused to be substantially inscribed circle as shown in FIGS. 3 and 4 similarly to the disc cartridge 220 of the recording type. Since this disc cartridge 221 is not required to oppose the magnetic head used for recording information signals to the optical disc 231, the upper side of the cartridge body 216 is closed. At the lower surface side of the cartridge body 216, there is formed opening portion 222 which allows a portion of the signal recording area of the optical disc 231 to be faced to the outward extending over inner and outer circumferences, and adapted so that an optical pick-up device for irradiating light beams onto the optical disc 231 to read out information signals recorded on the optical disc 231 is faced. Further, at the central portion of the lower surface side of the cartridge body 216, there is formed central opening portion 213 formed circular into which disc table constituting disc rotation operation mechanism which allows the optical disc 231 accommodated within the cartridge body 216 to undergo rotation operation is admitted.

Also at the disc cartridge 221 of the reproduction only type, a shutter member 217 for opening/closing the opening portion 222 is attached. This shutter member 217 includes a shutter plate having dimensions sufficient to close the opening portion 222, and is provided, at the base end portion side of the shutter plate, with a supporting portion channel-shaped in cross section for movably supporting the shutter member 217 on the cartridge body 216. The shutter member 217 is attached in such a manner that a portion of a supporting portion 217a is engaged with a movement guide groove 207 formed at the front surface side of the cartridge body 216 to hold a portion of the cartridge body 216 therebetween. The shutter member 217 attached in this way is caused to undergo movement operation in a direction to open and close the opening portion 223 along the front surface side of the cartridge body 216.

The disc cartridge 221 of the reproduction only type constituted as described above is also inserted into the recording/reproducing apparatus and is withdrawn (detached) therefrom with one side surface perpendicular to the front surface side along which the shutter member 217 moves being as insertion end similarly to the disc cartridge 220 of the recording type. Namely, the disc cartridge 221 is inserted into the recording/reproducing apparatus or is withdrawn (detached) therefrom with the direction indicated by arrow $X_1$ and the direction indicated by arrow $X_2$ in FIGS. 3 and 4 being caused to be insertion/withdrawal direction.

Substantially at the central portions of the connecting portion of the shutter member 206 attached at the disc cartridge 220 of the recording type and the supporting portion of the attached shutter member 217 attached to the disc cartridge 221 of the reproduction only type, there are respectively opened engagement holes 208 with which shutter there are engaged closing operation members provided at the apparatus side, which allows shutter members 206, 217 moved to the position where the respective opening portions are opened to undergo movement operation in a position direction to close the respective opening portions 222, 223 in allowing disc cartridges 220, 221 to undergo eject operation from the recording/reproducing apparatus is engaged.

Meanwhile, at the central portions of the magneto-optical disc 201 and the optical disc 231 accommodated into respective disc cartridges 220, 221, respective center holes 204 for positioning formed circular are formed. At the central portion where the center hole 204 is formed, a chucking plate 202 is attached in a manner to close the center hole 204. This chucking plate 202 is formed by metallic plate having magnetism which can be attracted by magnet. The center hole 204 and the chucking plate 202 are faced to the outward of the cartridge bodies 205, 216 through central opening portions 213 provided at the cartridge bodies 205, 216. In this example, the center hole 204 is formed in such a manner that the diameter is caused to be 11.0 mm with allowance being caused to fall within the range of [+0.1 mm, −0.0 mm].

Moreover, at the lower surface side of cartridge bodies 205, 216 constituting respective disc cartridges 220, 221, there are provided a pair of positioning holes 209, 210 with which positioning pin provided at the loading portion side is engaged when these disc cartridges 220, 221 are loaded into the loading portion within the recording/reproducing apparatus. These positioning holes 209, 210 are provided in the state positioned on the both sides of the front surface side of the cartridge bodies 205, 216 by which shutter members 206, 217 are supported as shown in FIGS. 2 and 4. Namely, the positioning holes 209, 210 are provided in such a manner that the opening portion 222 is put therebetween. In this example, one positioning hole 209 is formed with diameter in the movement direction of the shutter members 206, 217 being as long diameter (as ellipse) so that engagement position with respect to the positioning pin can be adjusted within the range in the long diameter direction. In addition, the other positioning hole 210 is formed as complete round and limits engagement position with respect to the positioning pin.

Further, at the back side opposite to the front surface side where positioning holes 209, 210 of the lower surface side of the cartridge bodies 205, 216 are provided, as shown in FIGS. 2 and 4, a plurality of discrimination holes 224 are formed. These discrimination holes 224 indicate kind or state of disc accommodated within the cartridge bodies 205, 216, e.g., whether or not recording of information signals can be made. Further, one discrimination hole 224 provided at the disc cartridge 220 of the recording type is used as a detection hole for prevention of erroneous recording, and is opened or closed by an erroneous recording prevention member 214 movably attached within the cartridge body 205. Namely, the discrimination hole 224 used as detection hole for prevention of erroneous recording is such that when the erroneous recording prevention member 214 is caused to undergo movement operation, depth of the discrimination hole 224 is changed so that the state as to whether or not recording of information signals with respect to the magneto-optical disc 201 can be made is switched. Furthermore, at the both sides of one side surface side serving as insertion end side into the recording/reproducing apparatus of the cartridge bodies 205, 216, there are formed engagement recessed portions 212 with which a portion of the drawing mechanism which allows the disc cartridges 220, 221 to undergo drawing operation into the recording/reproducing apparatus is engaged.

Moreover, at the cartridge bodies 205, 216 constituting the disc cartridge 220, 221, as shown in FIGS. 2 and 4, there are respectively formed a magneto-optical disc identification (discrimination) recessed portion 211 and an optical disc identification (discrimination) recessed portion 218 indicating that these disc cartridges 220, 221 are of the recording type and the reproduction only type. These identification recessed portions 211, 218 are provided in the state positioned at the insertion end side into the recording/reproducing apparatus of the lower surface side of the cartridge bodies 205, 216. In this example, respective disc identification recessed portions 211, 218 are formed so that their depths are different from each other to indicate by difference of depth whether or not each disc cartridge 220, or 221 is of the recording type or of the reproduction only type.

[2] Loading Device for Disc Cartridge and Disc Recording/reproducing Apparatus Provided with such Loading Device The disc recording/reproducing apparatus provided with loading device into which disc cartridge 220 of the recording type or disc cartridge 221 of the reproduction only type constituted as described above is selectively loaded will now be described.

(1) Recording/reproducing Unit

Figure 5:
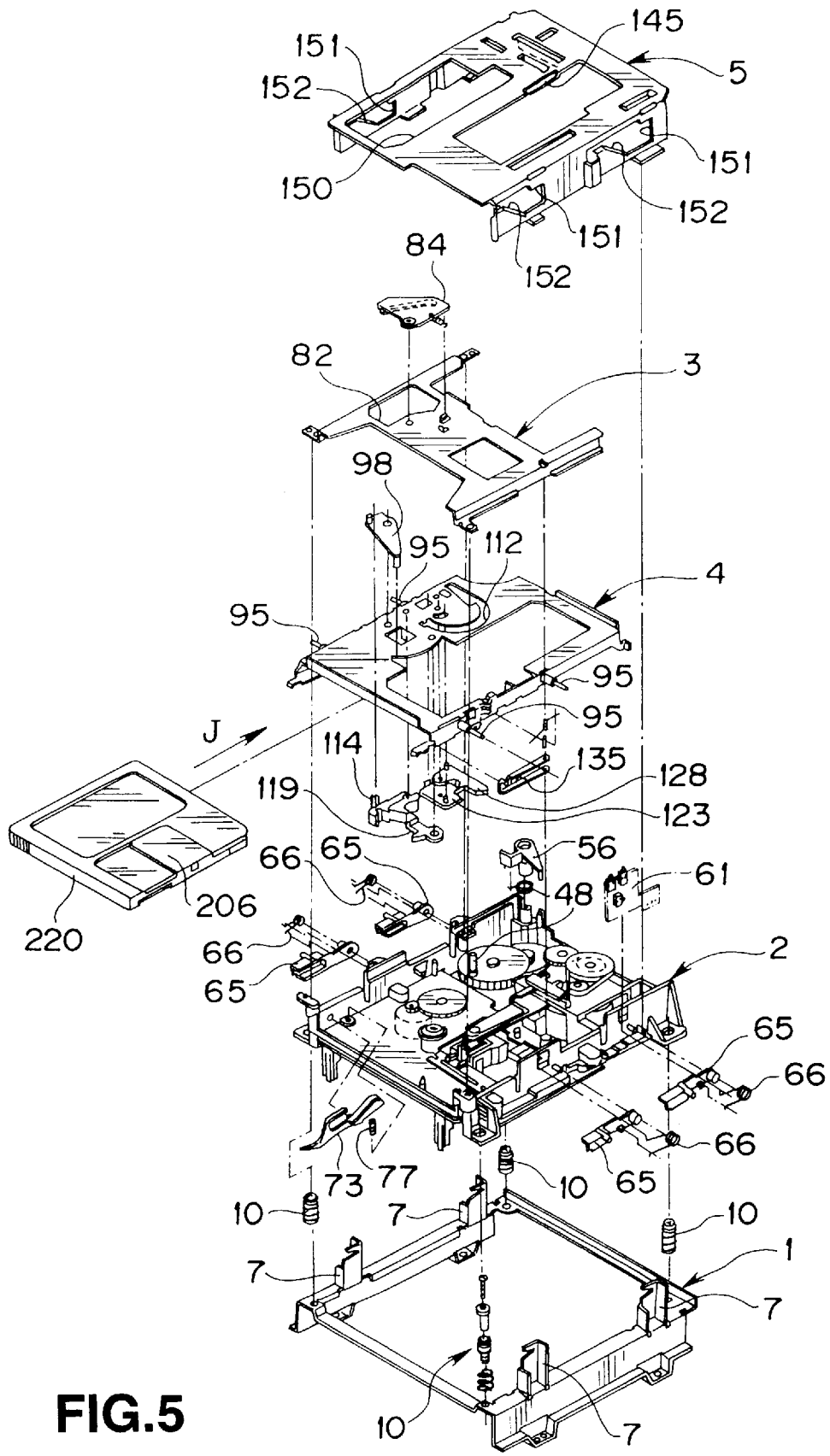
FIG. 5 is an exploded perspective view of a recording/reproducing apparatus according to this invention.
Figure 6:
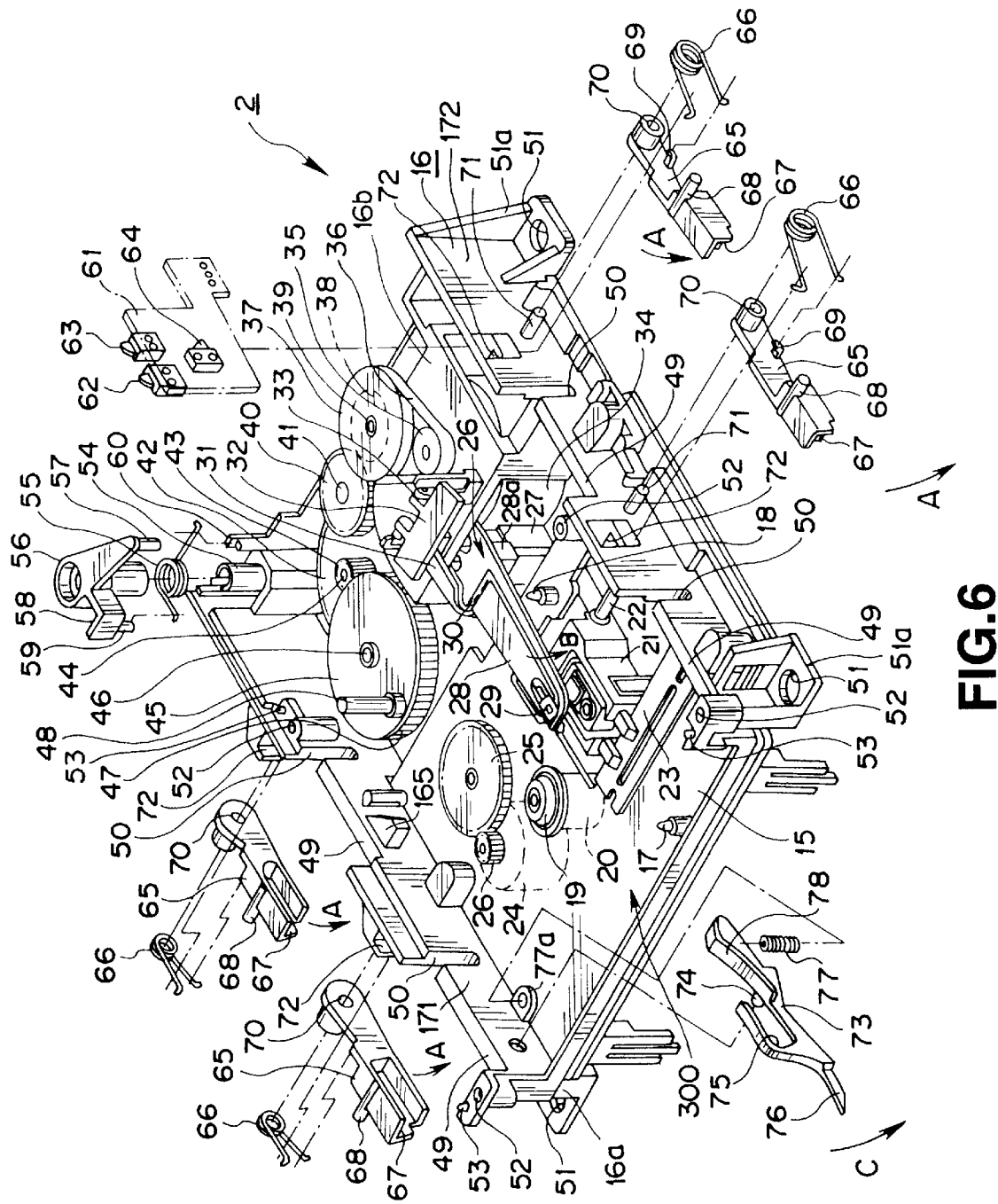
FIG. 6 is a perspective view showing supporting base on which recording/reproducing mounting (attachment) base where recording/reproducing unit is constituted is supported.

The disc recording/reproducing apparatus of this embodiment includes a recording/reproducing unit mounting base 2 as shown in FIGS. 5 and 6. This mounting base 2 is composed of a base plate 15 formed by metallic plate which takes flat plate shape, and a supporting frame 16 by which the base plate 15 is supported. The supporting frame 16 is formed by molding synthetic resin, and is composed of a frame portion 16a formed in a rising manner (hereinafter simply referred to as rising-formed depending upon circumstances) so as to surround the peripheral edge of the base plate 15, and a mounting plate portion 16b on which drive mechanism for loading device such as a drive motor 34, etc. for loading which will be described later is disposed.

At the upper surface side of the base plate 15, a loading portion 300 into which disc cartridge 220 or 221 loaded into the recording/reproducing apparatus is loaded is constituted. At the loading portion 300, there are provided positioning pins 17, 18 respectively engaged with positioning holes 209, 210 provided at the disc cartridge 220 or 221 to be loaded, and for allowing loading position of these disc cartridge 220 or 221 to undergo positioning. These positioning pins 17, 18 are formed by outsert-molding synthetic resin onto the base plate 15.

At the base plate 15 where the loading portion 300 is constituted, as shown in FIG. 6, there is disposed a disc rotation operation mechanism for allowing the magneto-optical disc 201 or the optical disc 231 accommodated within the disc cartridge 220 or 221 loaded into the loading portion 300 to undergo rotation operation. This disc rotation operation mechanism is composed of a disc table 19 onto which magneto-optical disc 201 or optical disc 231 is loaded after undergone positioning, and a spindle motor 20 for allowing the disc table 19 to undergo rotation operation in one body with the magneto-optical disc 201 or the optical disc 231 loaded thereon. A spindle motor 20 is attached at the lower surface side of the base plate 15 in the state where the drive shaft thereof is projected toward the loading portion 300 side constituted on the base plate 15. The disc table 19 is integrally attached on the drive shaft of the spindle motor 20.

In this example, the drive shaft of the spindle motor 20 is projected toward the loading portion 300 side through through-hole provided at the base plate 15.

The disc table 19 is formed substantially disc-shaped, and a centering member with which the center hole 204 of the magneto-optical disc 201 or the optical disc 231 is engaged is provided at the central portion. This centering member serves to engage with the center hole 204 when the magneto-optical disc 201 or the optical disc 231 is loaded onto the disc table 19 to carry out centering with respect to the disc table 19 of the magneto-optical disc 201 or the optical disc 231.

Further, at the base plate 15, an optical pick-up device 21 is disposed. This optical pick-up device 21 is composed of optical block including therewithin semiconductor laser serving as light source, optical parts such as beam splitter, etc., or light detector, and an object lens (objective) drive unit for controlling position of an object lens (objective) so that light beams emitted from the semiconductor laser are focused on the signal recording surface of the magneto-optical disc 201 or the optical disc 231 to be rotationally operated which has been loaded on the disc table 19 and precisely scan recording tracks. This optical pick-up device 21 is disposed in such a manner positioned within the opening portion formed at the base plate 15. Further, the optical pick-up device 21 is supported at the both sides thereof by a guide shaft 22 and a guide piece 23 attached at the lower surface side of the base plate 15, and is caused to undergo movement operation in the radial direction of the magneto-optical disc 201 or the optical disc 231 loaded on the disc table 19 while being guided by the guide shaft 22 and the guide piece 23. Feed operation of the optical pick-up device 21 is carried out through a drive force transmission gear 25 rotationally driven by a pick-up feed motor 24 disposed at the lower surface side of the base plate 15.

Moreover, a magnetic head unit 26 for applying external magnetic field to the magneto-optical disc 201 is connected to the optical pick-up device 21 so that it can be moved in synchronism with the optical pick-up device 21. This magnetic head unit 26 is of a structure in which a magnetic head element 29 is attached at the front end of leaf spring projected toward the front end portion of a head arm 28 in which a pair of leaf springs having conductivity is embedded within molded body of synthetic resin. Further, the magnetic head unit 26 is connected to the optical pick-up device 21 in the state where a mounting portion 28a of synthetic resin provided through leaf spring projected toward the base end side of the head arm 28 is fixed on a mounting base 27 provided at the base end side opposite to the front end side of the side where the object lens (objective) of the optical pick-up device 21 is disposed. At this time, the magnetic head element 29 attached at the front end of the head arm 28 is located at the position opposite to the object lens of the optical pick-up device 21.

Meanwhile, the head arm 28 of the magnetic head unit 26 is caused to undergo rotational displacement in a direction where the magnetic head element 29 comes into contact with the disc 201 or 231 mounted on the disc table 19 or becomes away therefrom with a portion of a pair of leaf springs faced toward the outward in the state positioned between the base end portion and the mounting portion 28a of the head arm 28 being as an elastic (resilient) displacement portion 30. Moreover, a rotational operation arm 31 is extended from the base end portion of the head arm 28. The head arm 28 is actuated so that when the rotational operation arm 31 is caused to undergo pressing operation by pressing operation means, it allows the magnetic head element 29 attached at the front end thereof to undergo rotational displacement in a direction away from the base plate 15 with the elastic displacement portion 30 being as center.

In the state where the rotational operation arm 31 is not caused to undergo pressing operation, the head arm 28 is caused to undergo displacement in a direction indicated by arrow B in FIG. 6 which is a direction to allow the magnetic head element 29 to become close to the disc 201 or 231 mounted on the disc table 19. Namely, the elastic displacement portion 30 constituted at the base end side of the head arm 28 is adapted so that elastic force to allow the magnetic head element 29 to undergo displacement in a direction close to the disc 201 or 231.

The rotational operation of the head arm 28 of the magnetic head unit 26 is carried out by a head rotational operation plate 32 disposed on the mounting plate portion 16b of the supporting frame 16. This head rotational operation plate 32 is rotatably attached with a support shaft 33 being as center in the state where the support shaft 33 provided in a projected manner (hereinafter simply referred to as projected depending upon circumstances) at the base end portion is supported by a pair of supporting posts vertically provided on the mounting plate portion 16b. This rotational operation plate 32 is adapted so that the front end portion is caused to be extended onto the rotation operation arm 31 of the head arm 28. The rotational operation plate 32 is rotationally biased through the torsional coil spring in a direction where the front end portion thereof becomes away from the rotation operation arm 31. Further, the rotational operation plate 32 is actuated so that when it is caused to undergo rotational operation against biasing force of the torsional coil spring, it presses the rotational operation arm 31 to rotationally operate the head arm 28 in a direction where the magnetic head element 29 becomes away from the disc 201 or 231 mounted on the disc table 19.

Figure 7:
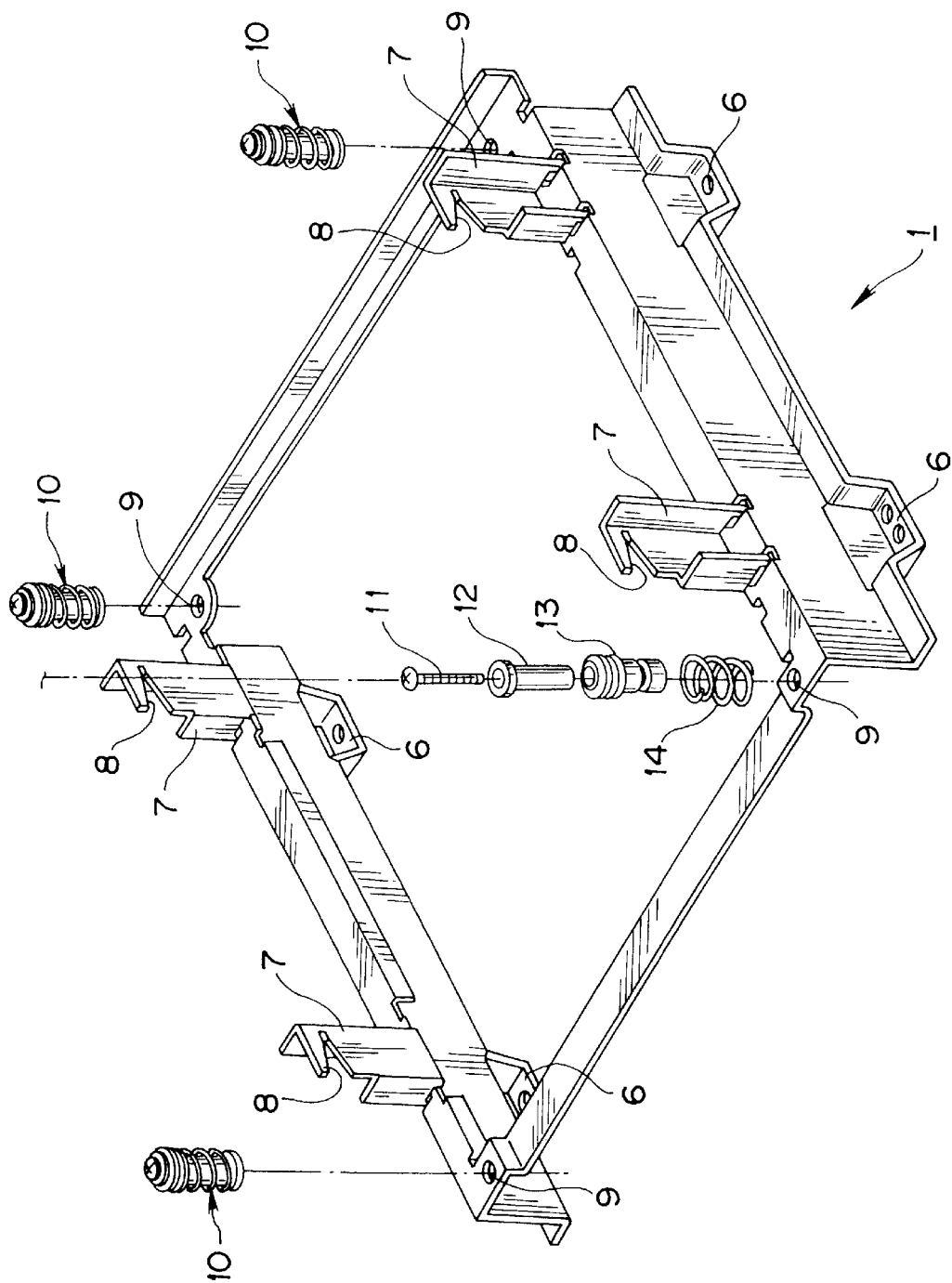
FIG. 7 is a perspective view showing recording/reproducing unit mounting base on which recording/reproducing unit is constituted.

At respective corner portions of the supporting frame 16 which supports the base plate 15 on which the optical pick-up device 21 and the magnetic head unit 26 constituting the recording and/or reproducing means which carries out recording and/or reproduction of information signals with respect to the magneto-optical disc 201 or the optical disc 231 as described above are disposed, as shown in FIG. 6, supporting leg pieces 51a in which a mounting hole 51 is bored are provided. These supporting leg pieces 51a are attached on the supporting base 1 through (dampers) 10 as shown in FIGS. 5, 7, 29 and 30. This supporting base 1 is formed rectangular as shown in FIG. 7 by punching and bending metallic material plate. Further, at respective corner portions of the supporting base 1, (dampers) 10 for elastically displacably supporting the supporting frame 16 are disposed. This (dampers) 10 is composed, as shown in FIG. 7, of a support shaft 11 constituted by screw vertically provided through a screw hole 9 bored at each corner portion of the supporting base 1, a sleeve 12 fitted over the support shaft 11, a bush 13 of rubber fitted over the outside of the sleeve 12, and a coil spring 14 fitted over the outside of the bushing 13. Further, the supporting frame 16 is supported by fitting the upper end portions of the bushes 13 into the mounting holes 51. The supporting frame 16 supported on the supporting base 1 through the dumpers 10 in this way is permitted to undergo elastic displacement in the axial direction of the support shaft 11.

Moreover, at both sides opposite to each other of the supporting base 1, a plurality of lock pieces 7 for fixedly supporting the supporting frame 16 elastically and displacably supported on the supporting base 1 are formed in a rising manner (hereinafter simply referred to as risingformed depending upon circumstances). At one side surfaces of these lock pieces 7, as shown in FIG. 7, there are respectively formed engagement grooves 8 with which an engagement pieces 155 provided at vertical movement operation plate 5 which will be described later is engaged.

Further, at respective corner portions of the supporting base 1, mounting portions 6 are provided in such a manner that they hang down. The supporting base 1 is disposed within the outer casing constituting the apparatus body of the recording/reproducing apparatus in the state where the mounting portions 6 are fixed.

At the outer casing within which the supporting base 1 on which the recording/reproducing unit for carrying out recording and/or reproduction of information signals with respect to the magneto-optical disc 201 or the optical disc 231 is constituted is accommodated and disposed, although not shown in more practical sense, there is provided an insertion/withdrawal hole for carrying out insertion/withdrawal of the disc cartridge 220 or 221 loaded into the loading portion 300 similarly to the recording and/or reproducing apparatus employing well known slot-in system. This insertion/withdrawal hole is formed as an opening portion having dimensions corresponding to shape of the side surface of the insertion end side of the disc cartridge 220 or 221. This insertion/withdrawal hole is closed by a rotary cover 157 as described later. This rotary cover 157 is formed so as to take a flat plate shape, and is rotatably supported at the outer casing through a pair of left and right support shafts 158 projected at the upper edge side of the both sides opposite to each other.

Figure 8:
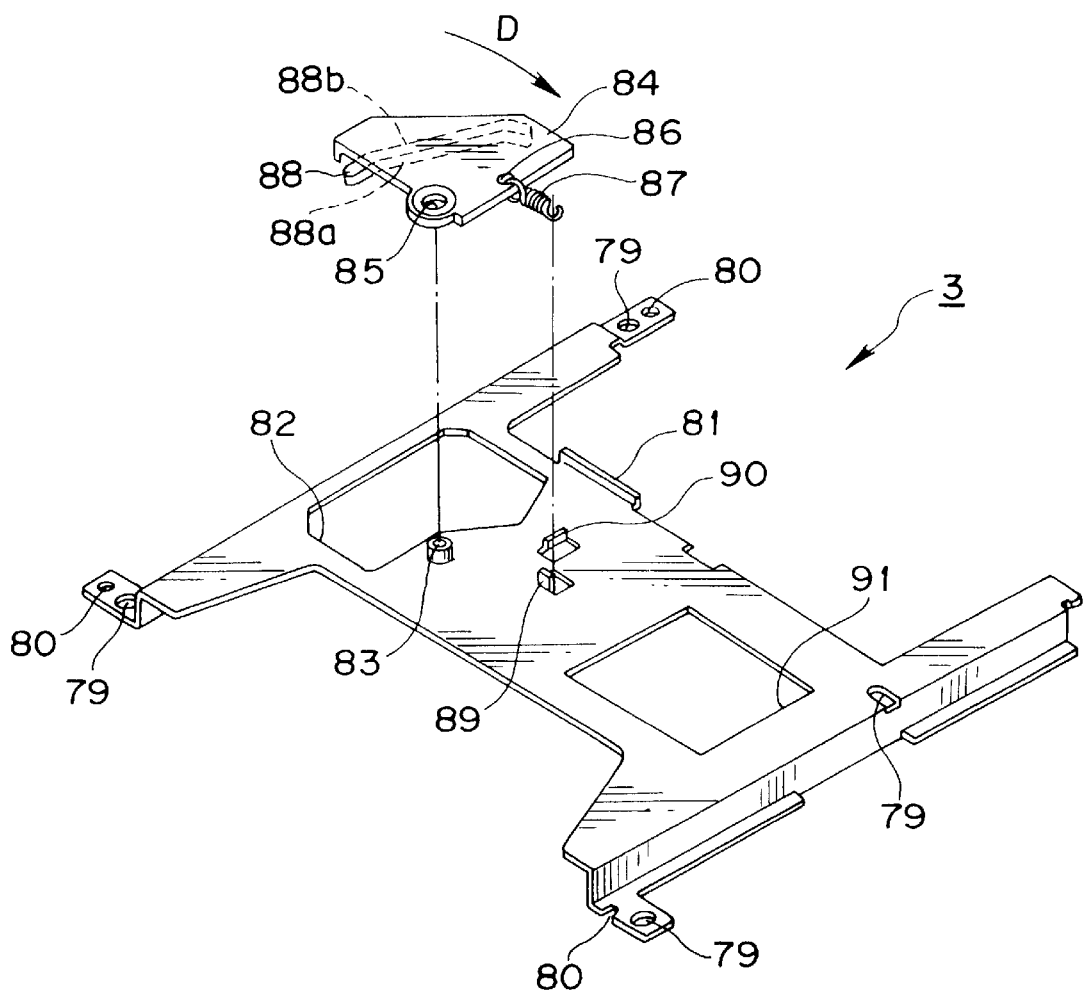
FIG. 8 is a perspective view showing top plate attached on supporting frame.

Further, at the upper surface side of the supporting frame 16 supported on the supporting base 1, as shown in FIG. 8, a top plate 3 which takes substantially flat plate shape formed by metallic plate is attached. This top plate 3 is provided, as shown in FIG. 8, with attachment holes 79 and positioning holes 80 bored at respective corner portions, and is attached on the supporting frame 16 by screwing fixing screws (not shown) inserted through respective attachment holes 79 into screw holes 52 bored at respective corner portions of the upper surface side of the supporting frame 16. Moreover, positioning projections 53 projected in the vicinity of the screw holes 52 bored at the supporting frame 16 are fitted into respective positioning holes 80. The top plate 3 is caused to undergo positioning of attachment position with respect to the supporting frame 16 by respectively fitting positioning projections 53 into the positioning holes 80.

Moreover, at the upper surface side of the top plate 3, a guide member 84 for controlling rotation of an eject lever 98 attached at the cartridge holder 4 is provided. This guide member 84 is formed so as to take substantially trapezoidal shape as shown in FIG. 8, and is rotatably attached with a caulking shaft 83 being as center by fitting the caulking shaft 83 projected so as to take cylindrical shape at the upper side of the top plate 3 into a fitting hole 85 bored at the corner portion of the base end side to caulk the caulking shaft 83. Further, the guide member 84 is rotationally biased in a direction indicated by arrow D in FIG. 8 with the caulking shaft 83 being as center by an extension (tensile) spring 87 stretched between a spring holding hole 86 bored at the guide member 84 and a spring holding piece 89 rising-formed at the upper surface side of the top plate 3. The rotational biasing position of the guide member 84 by the extension spring 87 is limited as the result of the fact that a portion of the guide member 84 is caused to come into contact with a holding piece 90 formed by raising a portion of the top plate 3. Further, at the lower surface side opposite to the top plate 3 of the guide member 84, a projecting portion 88 is projected. This projecting portion 88 is projected toward the lower surface side of the top plate 3 through a cut hole 82 formed by cutting a portion of the top plate 3.

Further, substantially at the central portion of the backward edge side of the top plate 3, a contact piece 81 with which an operation pin 125 of an eject detection lever 123 attached at the cartridge holder 4 which will be described later comes into contact is rising-formed.

(2-2) Cartridge Holder

The disc recording/reproducing apparatus to which this invention is applied includes a cartridge holder 4 positioned on the loading portion 300 constituted on the base plate 15 to hold the disc cartridge 220 or 221 inserted into the outer casing through the insertion/withdrawal hole, and is caused to undergo movement operation ranging between a first position where the disc cartridge 220 or 221 inserted and held can be taken out through the insertion/withdrawal hole and a second position where insertion/withdrawal of the disc cartridge 220 or 221 with respect to the loading portion 300 in which the disc cartridge 220 or 221 is positioned at the upper portion of the loading portion 300 can be made.

Figure 9:
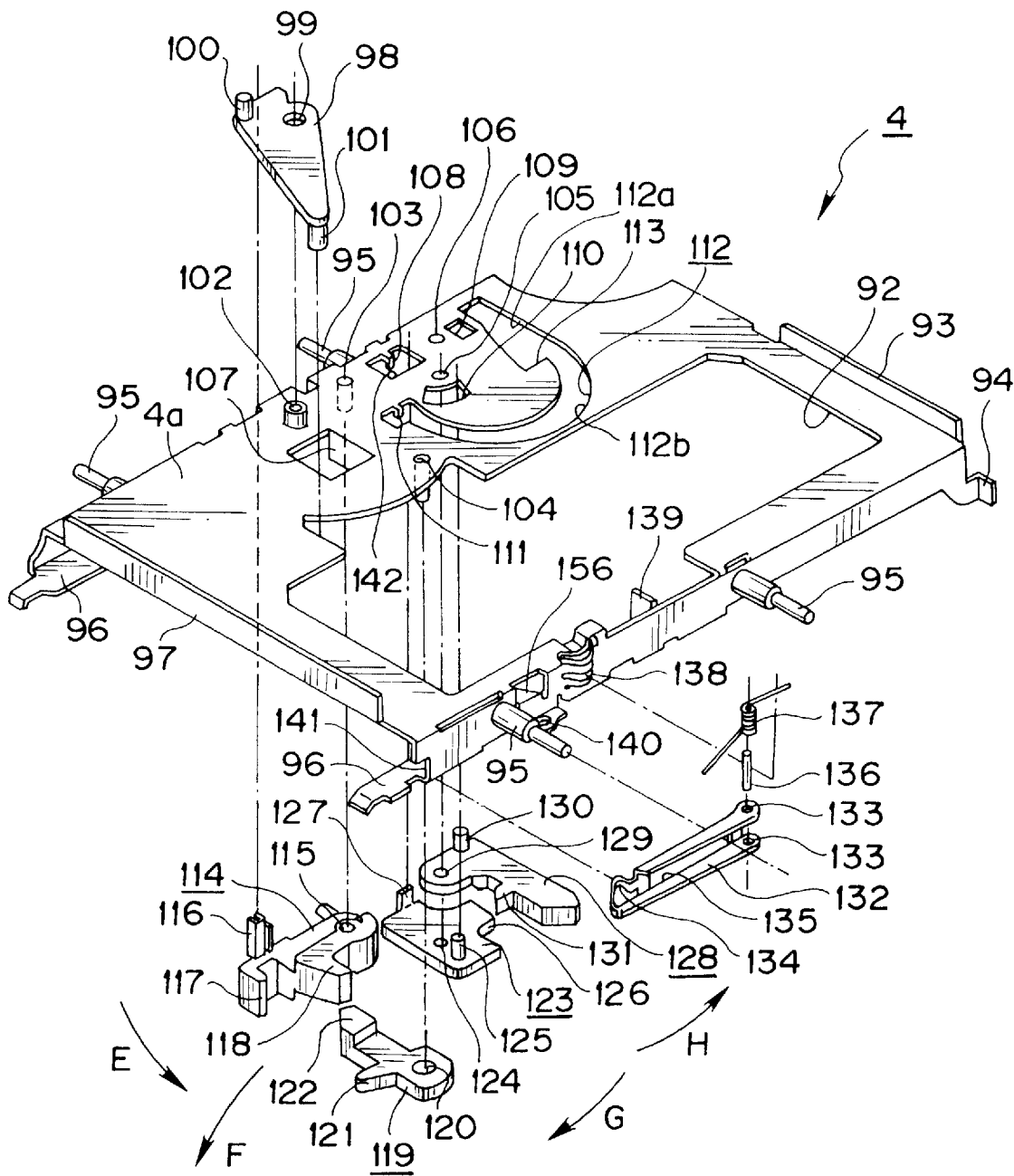
FIG. 9 is a perspective view showing cartridge holder by which disc cartridge is held.

The cartridge holder 4 is formed so as to take a flat plate shape of dimensions sufficient to hold the disc cartridge 220 or 221 as shown in FIGS. 5 and 9, and is formed by punching and bending a metallic plate. At the cartridge holder 4, cartridge holding portions 96, 96 which takes channel shape in cross section are formed at the both sides opposite to each other. When the cartridge holder 4 is disposed on the loading portion 300, the front surface side opposite to the insertion/withdrawal hole provided at the outer casing is opened. Thus, insertion/withdrawal of the disc cartridge 220 or 221 is carried out through the opened portion.

At the cartridge holder 4, there are provided positioning pieces 139, 107 for carrying out positioning of insertion position with respect to the cartridge holder 4 of the disc cartridge 220 or 221 when the disc cartridge 220 or 221 is inserted into the portion between the cartridge holding portions 96, 96 from the front side opposite to the insertion/withdrawal hole. One positioning piece 139 is provided in the state positioned at one cartridge holding portion 96 side, and the other positioning piece 107 is formed in the state where a portion positioned at the other cartridge holding portion 96 side of the plane surface portion 4a of the cartridge holder 4 is raised in a direction inwardly of the cartridge holder 4.

Further, at the cartridge holder 4, there is provided a shutter opening operation piece 156 which comes into contact with the end portion of the insertion direction side of the shutter member 206 or 217 when the disc cartridge 220 or 221 is inserted into the portion between the cartridge holding portions 96, 96 to allow the shutter member 206 or 217 to undergo relative movement with respect to the disc cartridge 220 or 221 inserted into the cartridge holder 4 to under relative movement to allow the opening portions 222, 223 to undergo opening operation. This shutter opening operation piece 156 is formed in such a manner that a portion of the side surface of one cartridge holding portion 96 is cut and raised as shown in FIG. 9. At one cartridge holding portion 96 side, there is attached a shutter closing operation lever 132 to hold the shutter member 206 or 217 moved to the position where the opening portion 222 and 223 are opened when the disc cartridge 220 or 221 held by the cartridge holder 4 is pulled out to allow it to undergo relative movement with respect to the disc cartridge 220 or 221 subjected to pulling-out operation. This shutter closing operation lever 132 is disposed in the state extended in an insertion/withdrawal direction of the disc cartridge 220 or 221 along the side surface of one cartridge holding portion 96.

Namely, the shutter closing operation lever 132 is rotatably attached with a support shaft 136 being as center by inserting the support shaft 136 supported by a support shaft supporting portion 140 formed at the side surface of one cartridge holding portion 96 into penetration holes 133, 133 bored at the base end side. Moreover, the shutter closing operation lever 132 is rotationally biased in a direction where the front end side thereof is projected toward the inward of the cartridge holder 4 by a torsional coil spring 137 of which coil portion is fitted over the support shaft 136. At the front end side of the shutter closing operation lever 132, there is projected an engagement projection 134 engaged with an engagement hole 208 provided at the shutter member 206 or 217 so as to project inwardly of the cartridge holder 4. This engagement projection 134 is projected inwardly of the cartridge holder 4 through a cut portion 141 formed at the front end edge of the side surface of one cartridge holding portion 96.

The engagement projection 134 is engaged with the engagement hole 208 provided at the shutter member 206 or 217 when the disc cartridge 220 or 221 is inserted into the portion between the cartridge holding portions 96, 96 so that the shutter opening operation piece 156 comes into contact with the front end edge of the insertion direction side of the shutter member 206 or 217. Further, the shutter closing operation lever 132 is actuated so that when the disc cartridge 220 or 221 is pulled or drawn out from the cartridge holder 4 toward the front side, it allows the shutter member 206 or 217 to undergo relative movement with respect to the disc cartridge 220 or 221, whereupon the shutter closing operation lever 132 is rotated toward the outward side against biasing force of the torsional coil spring 137 to release engagement with respect to the engagement hole 208 of the engagement projection 134.

In addition, at the side surface of the outward side of a pair of cartridge holding portions 96, 96 which are the both sides opposite to each other of the cartridge holder 4, there are provided respective pairs of supporting pins 95 which movably support the cartridge holder 4 with respect to the supporting frame 16 and guide movement direction of the cartridge holder 4.

Figure 10:
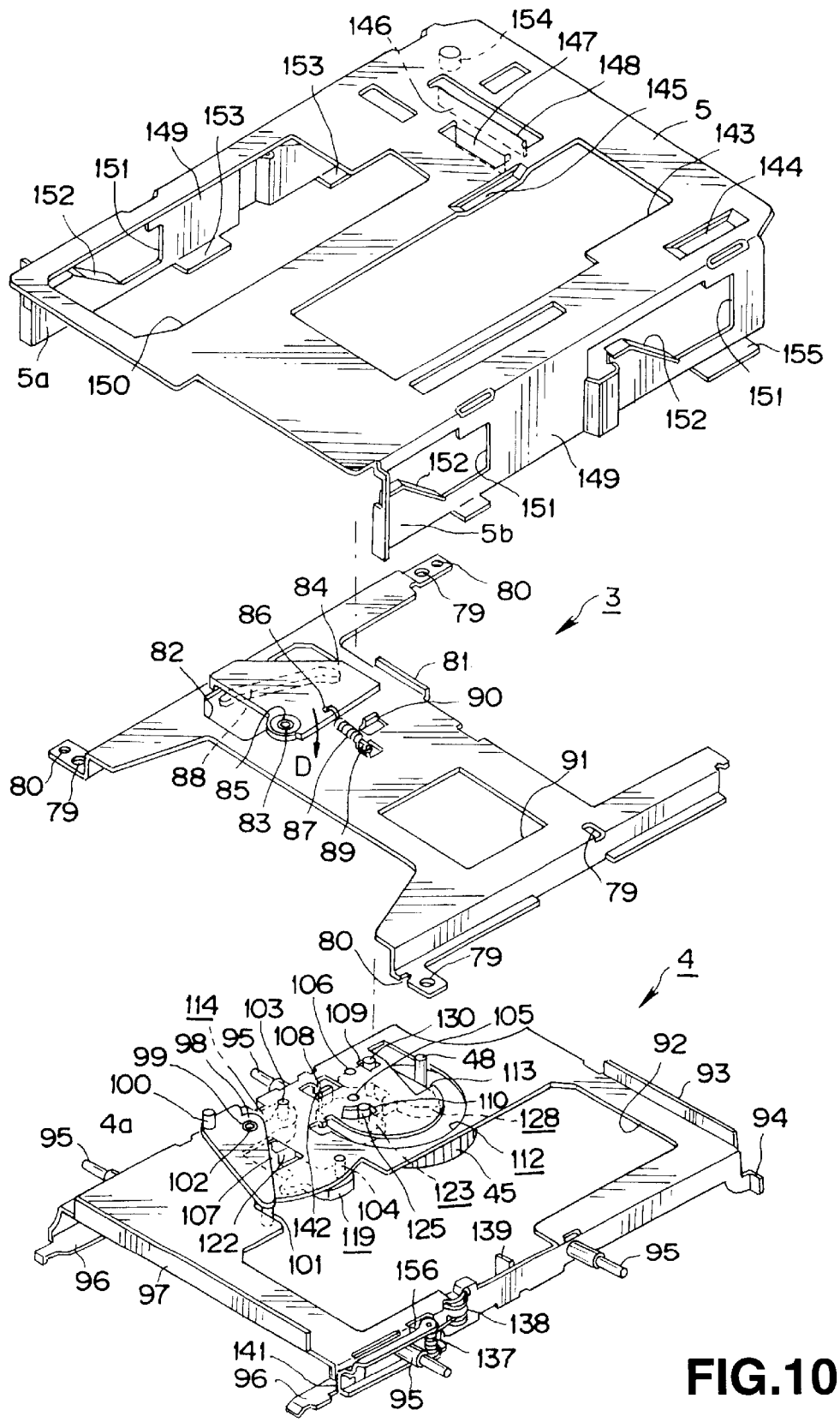
FIG. 10 is an exploded perspective view showing the relationship of arrangement of cartridge holder, top plate and vertical movement operation plate.

The cartridge holder 4 constituted as described above is disposed in a manner opposite to the loading portion 300 constituted on the base plate 15 in the state positioned between the base plate 15 and the top plate 3 as shown in FIG. 10. Further, the cartridge holder 4 is movably supported in parallel to the plane surface of the base plate 15 ranging between the first position where the disc cartridge 220 or 221 inserted and held can be taken out through the insertion/withdrawal hole and the second position where insertion/withdrawal of the disc cartridge 220 or 221 with respect to the loading portion 300 in which the disc cartridge 220 or 221 is positioned above the loading portion 300 can be made.

Namely, the cartridge holder 4 is adapted so that when respective pairs of supporting pins 95, 95 and 95, 95 projected at the both sides opposite to each other are mounted on movement guide portions 49, 49 and 49, 49 formed as shown in FIG. 6 at the upper end surface side of side walls 171, 172 rising-formed on the both sides opposite to each other of the supporting frame 16 so that the supporting pins 95, 95 and 95, 95 slide on these movement guide portions 49, 49 and 49, 49, the cartridge holder 4 can be moved ranging between the first position and the second position. The top plate 3 is oppositely disposed, with a spacing corresponding to the shaft diameter of the supporting pin 95, on these movement guide portions 49. Thus, slipping off of the supporting pin 95 mounted on the movement guide portion 49 is prevented. Further, slipping off from the supporting frame 16 of the cartridge holder 4 is prevented.

It is to be noted that the movement guide portion 49 is formed so as to have length permitted to move ranging between the first position and the second position of the cartridge holder 4. Moreover, the movement guide portion 49 guides movement in a direction in parallel to the base plate 15 of the cartridge holder 4 by supporting respective supporting pins 95.

In addition, the cartridge holder 4 is movably supported in a direction vertically in contact with the loading portion 300 or away therefrom when it is located at the second position opposite to the loading portion 300 on the base plate 15.

Namely, at the backward end of the guide portion 49, i.e., the end portion when the cartridge holder 4 is moved in the second position direction, there are formed vertical guide grooves 50 perpendicular to the loading portion 300 constituted on the upper surface of the base plate 15. These vertical guide grooves 50 extend to the end portions of the inward sides of respective movement guide portions 49, i.e., the backward end portions thereof, and are further moved toward the backward side to permit movement toward the lower sides of respective supporting pins 95 away from these movement guide portions 49, and to limit position in a direction in parallel to the base plate 15 of these supporting pins 95.

At the plane surface portion 4a of the cartridge holder 4, there is formed an opening portion 92 which permits rotation of the head arm 28 of the magnetic head unit 26 disposed on the base plate 15.

Moreover, at the internal surface side of the plane surface portion 4a of the cartridge holder 4, a cartridge insertion detection lever 119 is rotatably attached. This cartridge insertion detection lever 119 is adapted so that a support shaft 104 vertically provided so as to hang down toward the lower surface side of the cartridge holder 4 is inserted into a supporting hole 120 bored at the base end portion so that it is rotatably supported with the support shaft 104 being as center. Further, the detection lever 119 is rotationally biased by torsional coil spring (not shown) in a direction indicated by arrow F in FIGS. 9 and 10 with the support shaft 104 being as center in the state where the contact portion 122 provided at the front end portion thereof is positioned at the other cartridge holding portion 96 side. With respect to the rotational biasing position of the detection lever 119, rotational position is limited in such a manner that the contact portion 122 is caused to be in contact with a positioning piece 107 formed by cutting, in a rising manner, a portion of the plane surface portion 4a of the cartridge holder 4. At one side surface opposite to the insertion direction side of the disc cartridge 220 or 221 of the detection lever 119, there is provided a detection projection 121 in contact with the disc cartridge 220 or 221 inserted into the cartridge holder 4 to detect insertion of the disc cartridge 220 or 221. Namely, this cartridge insertion detection lever 119 is actuated so that when the disc cartridge 220 or 221 is inserted into the cartridge holder 4, the detection projection 121 is pressed by the disc cartridge 220 or 221 so that the lever 119 is rotated with the support shaft 104 being as center, i.e., about the support shaft 104 against biasing force of the torsional coil spring to thereby detect that the disc cartridge 220 or 221 has been inserted into the cartridge holder 4.

Further, at the internal surface side of the plane surface portion 4a of the cartridge holder 4, an erroneous operation prevention lever 114 for preventing erroneous operation of the cartridge holder 4 is movably attached in the state extend so as to become parallel to the cartridge holding portion 96. This erroneous operation prevention lever 114 is movably supported with support shaft 103 being as center in the state where the support shaft 103 vertically provided in a manner to hang down toward the lower surface side of the cartridge holder 4 is caused to be inserted through a supporting hole 115 bored at the base end portion. Moreover, the erroneous operation prevention lever 114 is rotationally biased by torsional coil spring (not shown) in a direction indicated by arrow E in FIG. 9 in which the front end portion provided with an engagement pawl 117 is directed toward the inward side of the cartridge holder 4 in the state where the engagement pawl 117 formed at the front end portion is opposed to the insertion direction of the disc cartridge 220 or 221. With respect to the erroneous operation prevention lever 114, rotational biasing position by the torsional coil spring is limited by allowing an engagement projection 118 projected at one side surface to be in contact with a contact portion 122 provided at the front end portion of the cartridge insertion detection lever 119. In addition, at the other side surface of the side opposite to the side where the holding pawl 117 of the front end portion of the erroneous operation prevention lever 114 is projected, an erroneous operation limiting projection 116 is provided. The erroneous operation prevention lever 114 is actuated so that when the cartridge holder 4 attempts to be moved from the first position located at the insertion/withdrawal hole side which permits insertion/ withdrawal of the disc cartridge 220 or 221 in the state where no disc cartridge 220 or 221 is inserted to the second position direction within the apparatus body, the erroneous operation limiting projection 116 is caused to be in contact with an erroneous operation limiting piece 165 projected at one inside surfaces of side walls 171, 172 which are rising-formed at the both sides opposite to each other of the supporting frame 16, thus to limit movement in the second position direction of the cartridge holder 4. Namely, the erroneous operation prevention lever 114 limits loading operation in the state where the disc cartridge 220 or 221 is not inserted into the cartridge holder 4.

Further, this erroneous operation prevention lever 114 is actuated so that when the disc cartridge 220 or 221 is inserted into the cartridge holder 4 so that the cartridge insertion detection lever 119 is rotated in the direction opposite to the direction indicated by arrow F in FIG. 9 against biasing force of the torsional coil spring, the state in contact with the contact portion 122 of the erroneous operation limiting projection 116 is released, whereby the erroneous operation prevention lever 114 is caused to undergo biasing force of the torsional coil spring so that it is rotated toward the inward of the cartridge holder 4 in the direction indicated by arrow E in FIG. 9. At this time, this erroneous operation prevention lever 114 engages the engagement pawl 117 provided at the front end portion thereof with the engagement recessed portion 212 provided at the disc cartridge 220 or 221 inserted into the cartridge holder 4, and moves the erroneous operation prevention projection 116 to the position where it is not caused to be in contact with the erroneous operation prevention piece 165.

Further, at the outside surface side of side walls 171, 172 which are rising-formed on the both sides opposite to each other of the supporting frame 16, as shown in FIG. 6, there are attached a plurality of supporting levers 65 for supporting cartridge holder which movably support the cartridge holder 4 in a direction in contact with the loading portion 300 constituted on the base plate 15 or away therefrom. These supporting levers 65 are movably attached with support shafts 71 being as center in the state where the support shafts 71 vertically provided at side walls 171, 172 of the supporting frame 16 are inserted through and by shaft insertion portions 70 which take cylindrical shape provided at the base end portion. At this time, the supporting levers 65 are attached to side walls 171, 172 of the sup porting frame 16 in such a manner that the front end portion side is faced to movement guide portions 49. Further, at front end portions of the respective supporting levers 65, there are formed engagement recessed portions 67 with which supporting pins 95 provided on the both sides of the cartridge holder 4 are engaged. These engagement recessed portions 67 are formed as a recessed portion in which the front end surface of the supporting lever 65 is opened.

Moreover, respective supporting levers 65 are rotationally biased by the torsional coil spring 66 in the direction indicated by arrow A in FIG. 6 where the front end portion side is directed to lower direction of the base plate 15 direction. This torsional coil spring 66 is attached in the state where the coil portion is wound on the shaft insertion portion 70, one arm portion is held by each holding piece 72 projected on side walls 171, 172 of the supporting frame 16, and the other arm portion is held by holding projection 69 projected on the supporting lever 65 to thereby rotationally bias the supporting lever 65 in the direction indicated by the arrow A in FIG. 6.

(2-3) Vertical Movement Operation Mechanism of Cartridge Holder

On the top plate 3 disposed on the upper surface side of the supporting frame 16 in which there is constituted recording and/or reproducing unit for carrying out recording and/or reproduction of information signals with respect to the magneto-optical disc 201 or the optical disc 231, as shown in FIGS. 5, 10, 11, 30 and 31, there is disposed a vertical movement operation plate 5 constituting vertical movement operation mechanism which allows the cartridge holder 4 moved to the position opposite to the upper portion of the loading portion 300 to undergo vertical movement operation with respect to the loading portion 300. This vertical movement operation plate 5 is caused to undergo movement operation in parallel to the direction moving ranging between the first position and the second position of the cartridge holder 4, and is formed by bending metallic plate so as to take channel-shape in cross section.

At the lower end edges of respective side walls 5a, 5b of the both sides opposite to each other of the vertical movement operation plate 5, a pair of supporting pieces 153 bent toward the inward are formed. The vertical movement operation plate 5 is supported movably with respect to the supporting frame 16 by engaging respective supporting pieces 153 with the lower surface side of the supporting frame 16.

Figure 11:
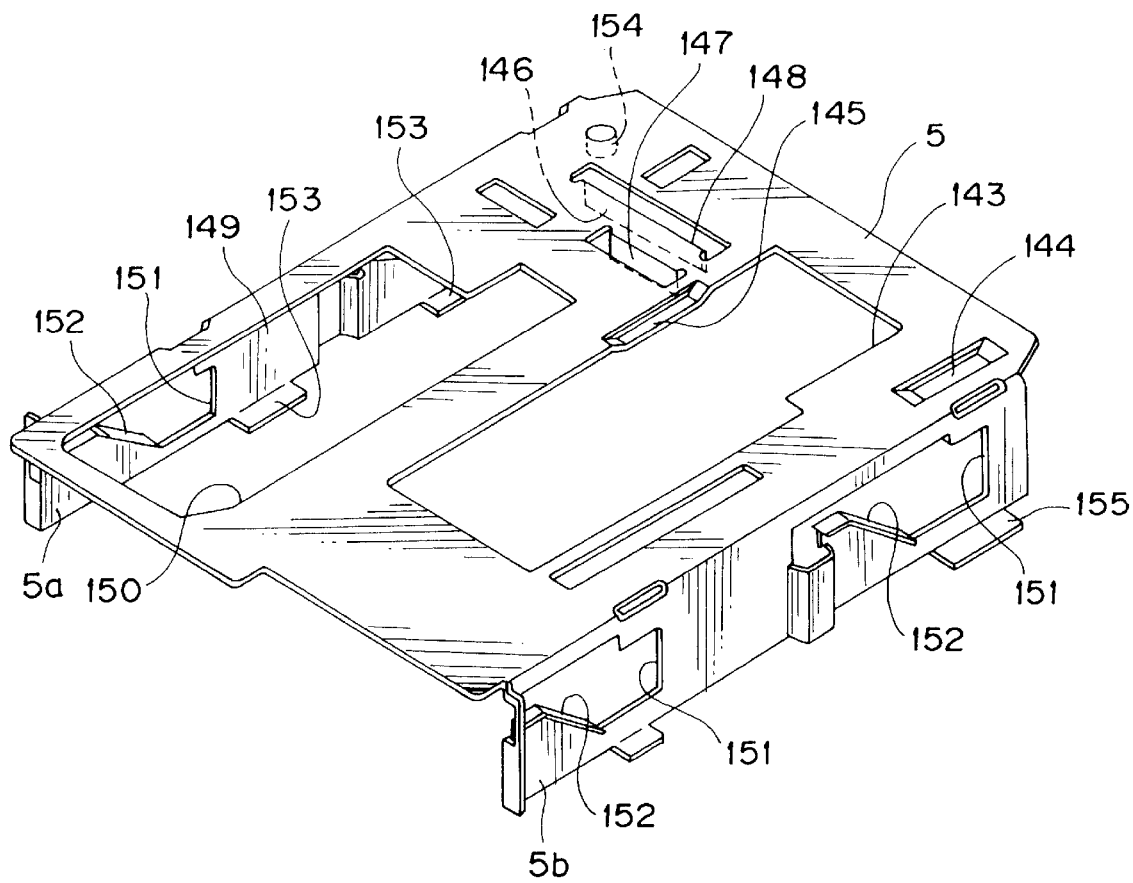
FIG. 11 is a perspective view showing vertical movement operation plate which limits movement of cartridge holder.
Figure 23:
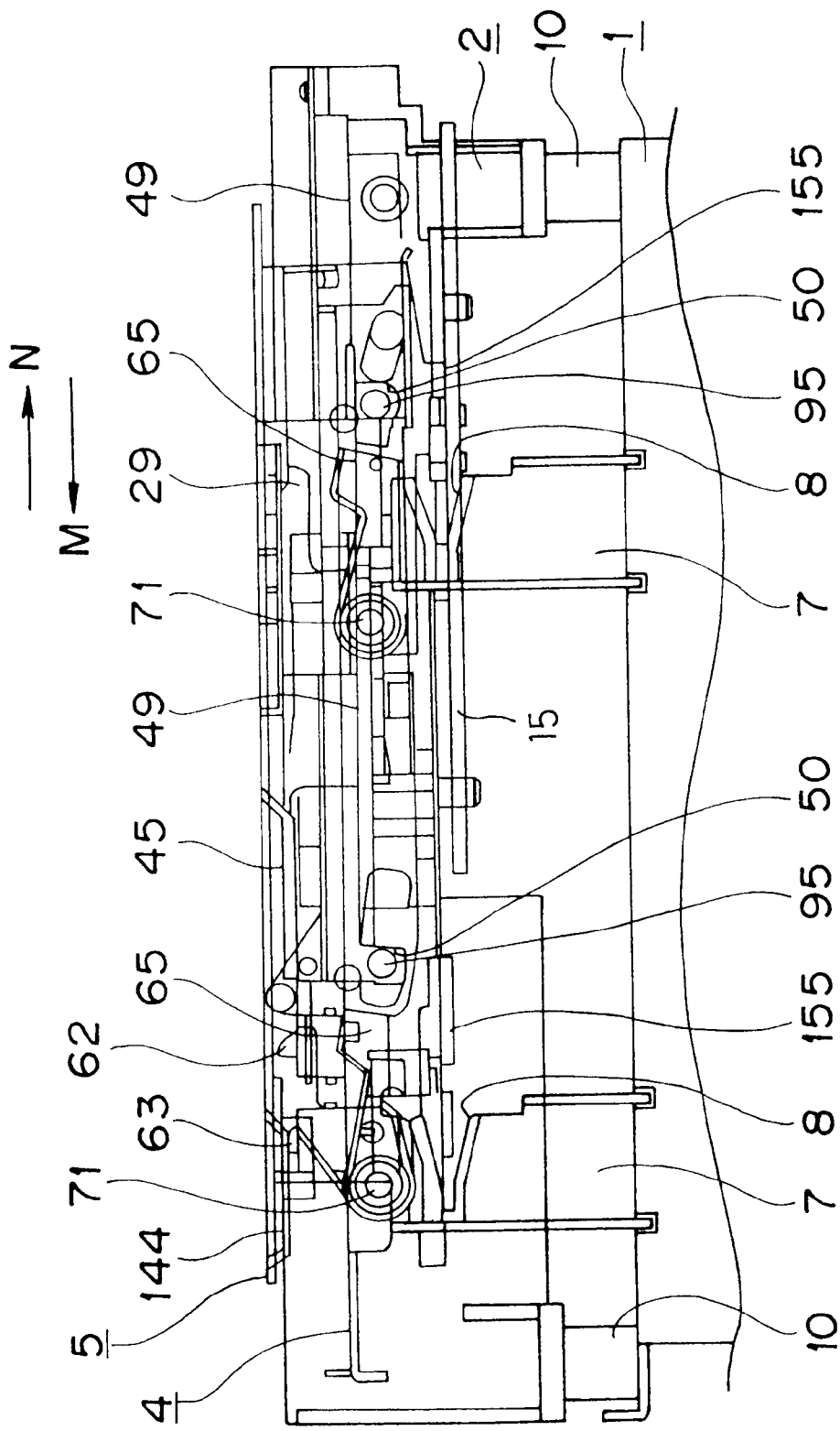
FIG. 23 is a side view showing the state where disc cartridge is loaded into the loading portion.

At respective side walls 5a, 5b of the both sides opposite to each other of the vertical movement operation plate 5, respective pairs of opening portions 151 are bored in parallel to the movement direction. Operation pins 68 provided at the supporting levers 65 which support the cartridge holder 4 are inserted through these opening portions 151. At the respective opening portions 151, as shown in FIG. 11, inclined cam portions 152 on which the operation pins 68 provided at the supporting levers 65 are formed. These inclined cam portions 152 are formed in an inclined manner so as to gradually lower from the insertion side of the disc cartridge 220 or 221 toward the internal side. By providing the inclined cam portions 152 in this way, when the vertical movement operation plate 5 is caused to undergo movement operation relative to the supporting frame 16, the operation pins 68 are caused to undergo movement operation along the inclined cam portions 152 as shown in FIG. 23. Thus, the supporting levers 65 are rotationally operated. When the supporting levers 65 are rotationally operated, the cartridge holder 4 which has been moved to the position opposite to the loading portion 300 is caused to undergo movement operation in a direction where it comes into contact with the loading portion 300 or becomes away therefrom.

The vertical movement operation plate 5 is actuated so that when it is in the state moved inwardly of the outer casing where the cartridge holder 4 is moved to the position away from the loading portion 300, engagement pieces 155 formed in a manner bent toward the outward side as shown in FIG. 11 at lower end edges of side walls 5a, 5b opposite to each other are engaged with engagement groove portions 8 of the lock pieces 7 of the supporting base 1 to fix the supporting frame 16 on the supporting base 1.

Moreover, the vertical movement operation plate 5 is such that when it is moved toward the outward side directed to the insertion/withdrawal hole side of the outer casing, the operation pins 68 are moved toward the lower side of the inclined cam portions 152. Thus, the supporting levers 65 are caused to undergo biasing force of the torsional coil springs 66 so that they are rotated in the direction indicated by the arrow A in FIGS. 6 and 21. By rotation of the supporting levers 65, the cartridge holder 4 which has been held at the position away (spaced) from the loading portion 300 lowers vertically toward the loading portion 300 side. Thus, the disc cartridge 220 or 221 held by the cartridge holder 4 is loaded into the loading portion 300. At this time, the cartridge holder 4 is caused to undergo biasing force of the torsional coil springs 66 which rotationally biases the supporting levers 65 so that it is pressed and biased to the loading portion 300 side to force-support the disc cartridge 220 or 221 thus held by the loading portion 300.

The vertical movement operation plate 5 is actuated so that when it is located at the position moved to the position where the cartridge holder 4 is lowered to the loading portion 5 side, engagement with respect to the lock pieces 7 of the supporting base 1 of the engagement pieces 155 is released as shown in FIG. 23 to allow the supporting frame 16 to be in so called floating state where movement by elastic displacement of the dumpers 10 can be made with respect to the supporting base 1.

Figure 24:
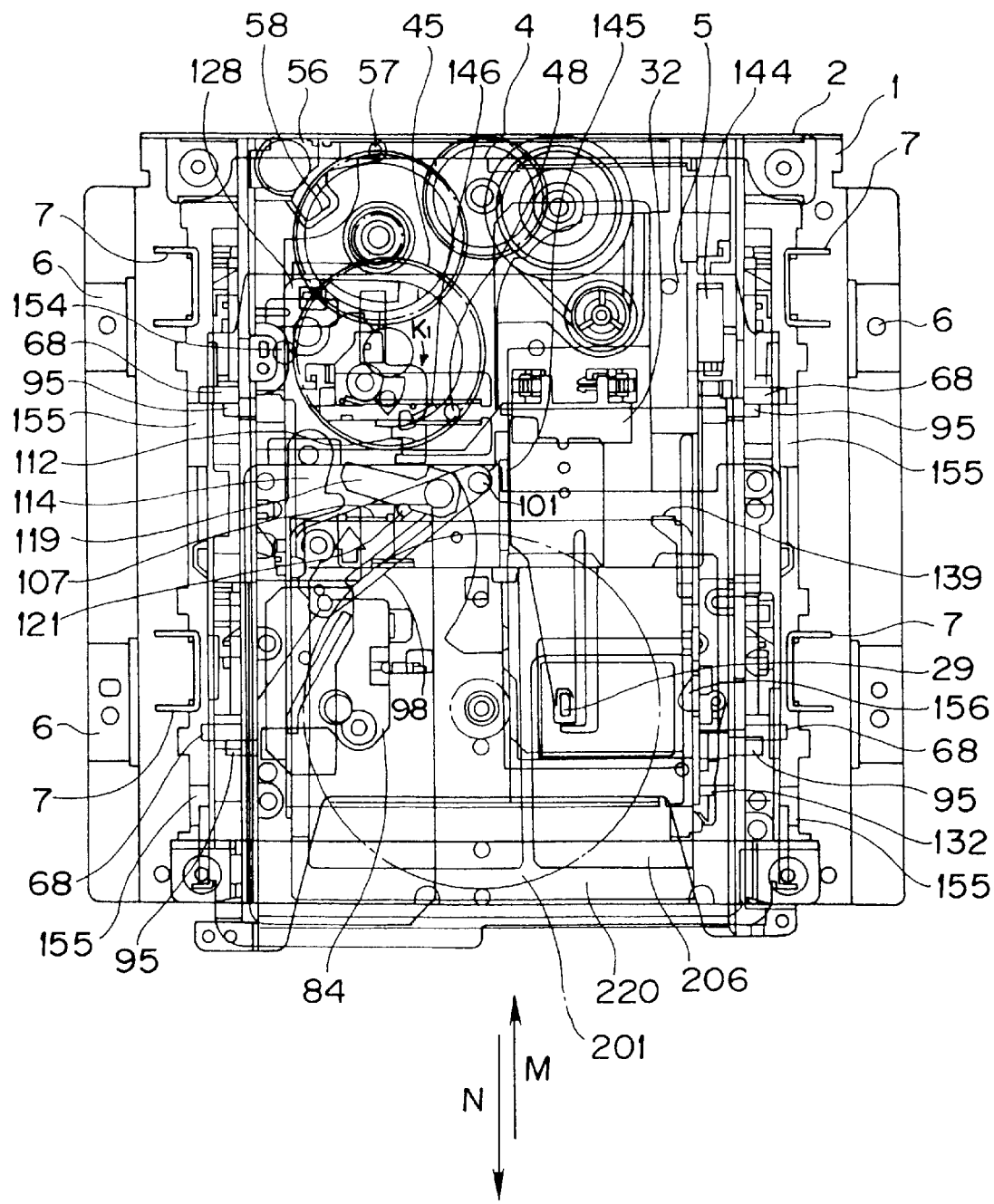
FIG. 24 is a plan view showing the recording mode state where magnetic head device is caused to be slidably in contact with magneto-optical disc within disc cartridge loaded in loading portion so that recording of information signals can be made.
Figure 25:
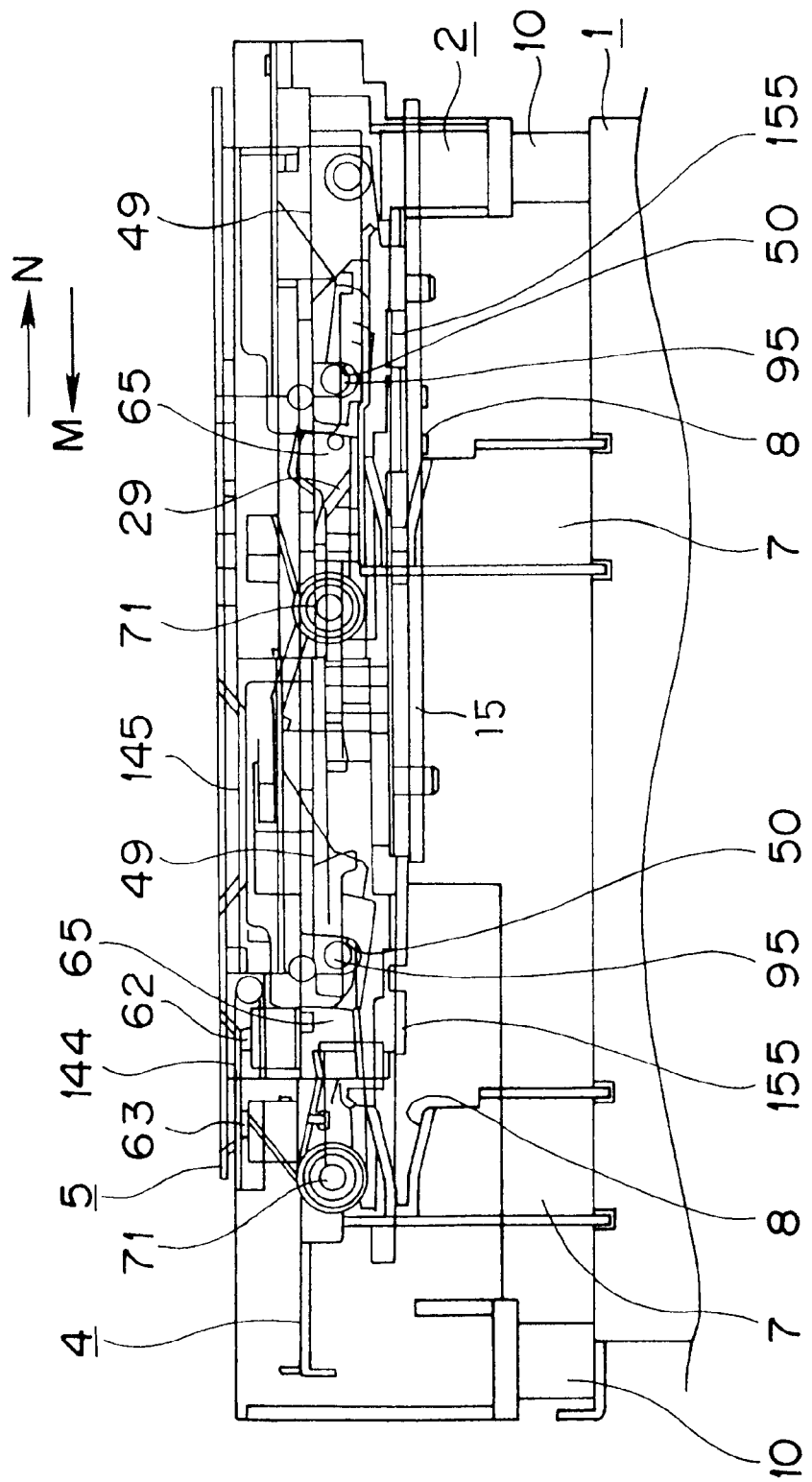
FIG. 25 is a side view showing the recording mode state.

Moreover, the vertical movement operation plate 5 i s actuated so that it is further moved to the front side toward the outward of the outer casing from the position where the cartridge holder 4 is lowered to the loading portion 300 side, the vertical movement operation plate 5 allow the head arm 28 of the magnetic head unit 26 to be in slidable contact with the magneto-optical disc 201 loaded on the disc table 19 by making use of the elastic displacement force of the elastic displacement portion 30 as shown in FIGS. 24 and 25.

Namely, the vertical movement operation plate 5 includes a projecting portion 145 for allowing the head rotation operation plate 32 to undergo pressing operation. This projecting portion 145 is projected toward the inward of the lower surface side of the vertical movement operation plate 5, and allows the head rotation operation plate 32 to undergo pressing supporting to the lower side when the vertical movement operation plate 5 is located to the position lowered to the loading portion 300 side from the position where the cartridge holder 4 is away from the loading portion 300. Further, when the vertical movement operation plate 5 is further moved toward front side from the position where the vertical movement operation plate 5 lowers the cartridge holder 4 to the loading portion 300 side, the projecting portion 145 is away from the head rotation operation plate 32 to release pressing operation of the head rotation operation plate 32. When pressing support of the head rotation operation plate 32 by the projecting portion 145 is released, the head arm 28 is caused to undergo elastic displacement force of the elastic displacement portion 30 so that it is rotated to allow the magnetic head element 29 attached at the front end portion to be in slide contact with the magneto-optical disc 201 on the disc table 19.

(2-4) Drive Mechanism

The drive mechanism for allowing the cartridge holder 4 and the vertical movement operation plate 5 to undergo movement operation to carry out loading operation of the disc cartridge 220 or 221 inserted into the cartridge holder 4 and held thereby will now be described.

This drive mechanism includes, as shown in FIG. 6, a rotating body (body of rotation) 45 disposed on an attachment plate portion 16b of the supporting frame 16, and a drive motor 34 for rotationally operating the rotating body 45. The rotating body 45 is rotatably supported through a support shaft 46 vertically provided on the attachment plate portion 16b, and is caused to undergo rotational operation over the range of substantially 360 degrees. A drive pulley 35 is attached to the drive shaft of the drive motor 34 for rotationally operating the rotating body 45. An endless belt 36 is wound and laid on the drive pulley 35 between the drive pulley 35 and a driven pullay 37 rotatably attached on the supporting frame 16 through a support shaft 39. A first transmission gear 38 is integrally formed at the driven pulley 37. This first transmission gear 38 is meshed with a second transmission gear 40 rotatably attached to the supporting frame 16 through a support shaft 41. A third transmission gear is integrally formed at the second transmission gear 40. This third transmission gear is meshed with a fourth transmission gear 42 rotatably attached to the supporting frame 16 through a support shaft 44. A fifth transmission gear 43 is integrally formed at the fourth transmission gear 42. This fifth transmission gear 43 is meshed with a gear portion 47 formed at the outer circumferential portion of the rotating body 45.

At the position eccentric from the shaft center of the principal surface portion of the rotating body 45, a movement operation pin 48 insertion-engaged with a cam groove 112 provided at the plane surface portion 4a of the cartridge holder 4 is vertically provided. The cam groove 112 formed at the cartridge holder 4 is composed, as shown in FIG. 9, of a linear cam portion 112a extended in a direction perpendicular to the movement direction of the cartridge holder 4, and a circular arc shaped cam portion 112b to take semi-circular shape continuous to the cam portion 112a. In addition, when the cartridge holder 4 is located in the state moved to the first position side located at the insertion/withdrawal hole side provided at the outer casing, the movement operation pin 48 is placed at the position engaged with the linear cam portion 112a of the cam groove 112.

The rotating body 45 is actuated so that when the disc cartridge 220 or 221 is caused to undergo insertion operation into the cartridge holder 4 and the drive motor 34 starts rotational drive so that loading operation is started, the movement operation pin 48 moves along the linear cam portion 112a of the cam groove 112 to allow the cartridge holder 4 to undergo movement operation in the second position direction opposite to the loading portion 300 inwardly of the outer casing.

Figure 18:
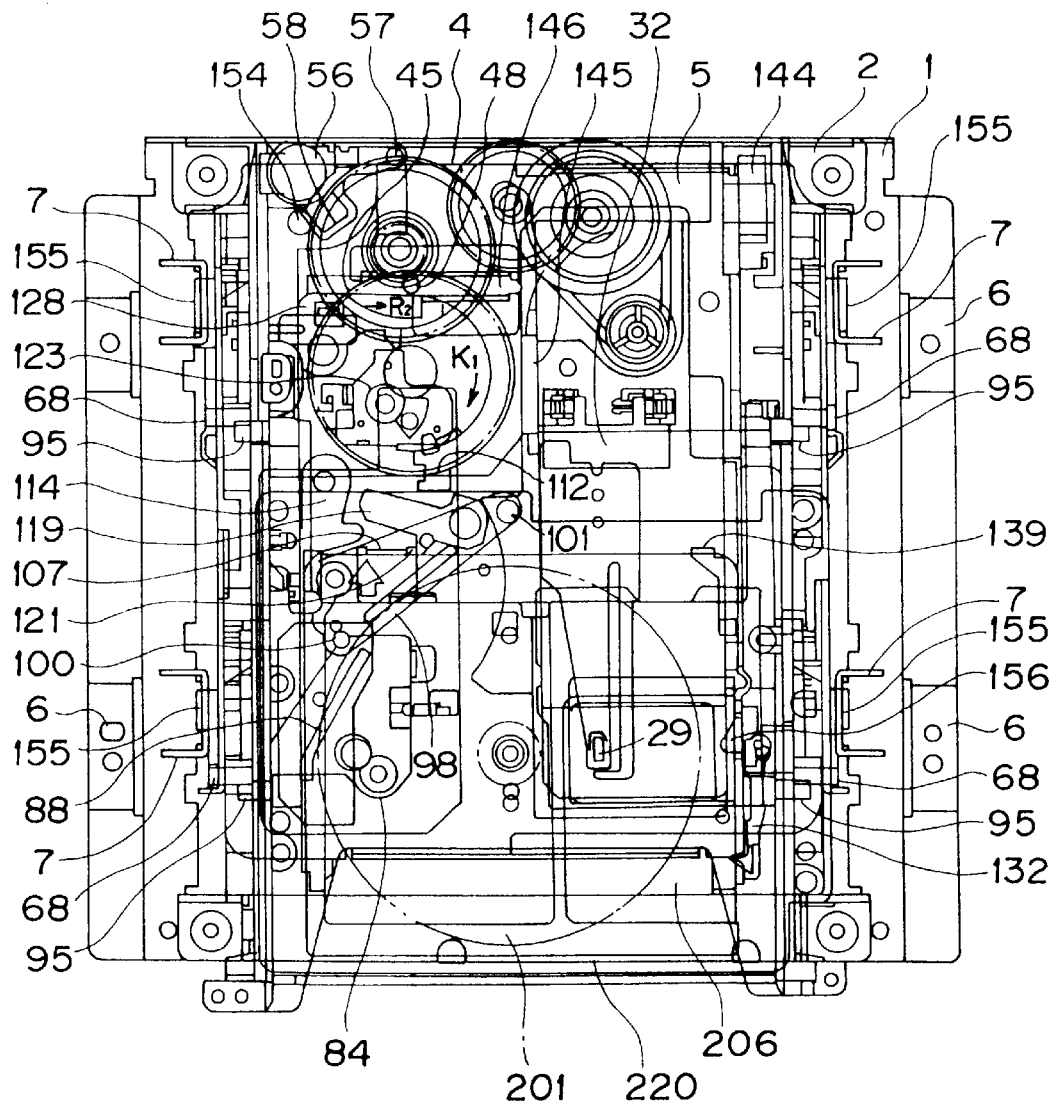
FIG. 18 is a plan view showing the state where the cartridge holder has been moved to the second position opposite to the loading portion.

Further, when the rotating body 45 is rotated by 180 degrees from the initial state in the direction indicated by arrow $K_1$ in FIG. 18 so that the movement operation pin 48 is moved to the side positioned inwardly of the outer casing, the cartridge holder 4 is moved to the second position opposite to the upper portion of the loading portion 300 as shown in FIG. 18. Thereafter, when the rotating body 45 is further rotated in the direction indicated by the arrow $K_1$ in FIG. 18, the movement operation pin 48 comes to the cam portion 112b which takes circular arc shape of the cam groove 112 as shown in FIGS. 18, 20, 22 and 24, whereby it is rotated by 180 degrees along the cam portion 112b. At this time, since the cam portion 112b is formed to take circular arc shape which is in correspondence with movement locus of the movement operation pin 48, the cartridge holder 4 maintains the state placed at the second position without being caused to undergo movement operation.

When the cartridge holder 4 is moved to the second position, i.e., is located at the position moved inwardly of the outer casing, the movement operation pin 48 is engaged with an engagement portion 146 provided at the vertical movement operation plate 5. At this time, the vertical movement operation plate 5 rotates the supporting levers 65 toward the upper direction side so that it is fixedly supported by the supporting frame 16 as described later. In this example, the engagement portion 146 with which the movement operation pin 48 is engaged is constituted, as shown in FIG. 11, with a gap between a pair of before and after (forward and backward) engagement pieces 147, 148 caused to hang down toward lower direction in the state positioned toward the backward side of the vertical movement operation plate 5.

After the cartridge holder 4 is moved to the second position opposite to the loading portion 300, the rotating body 45 is further rotated in the direction indicated by arrow $K_1$ in FIG. 18, and the movement operation pin 48 moves along the cam portion 112b in circular arc shape of the cam groove 112, the movement operation pin 48 moves the vertical movement operation plate 5 through the engagement portion 146 toward the front side which is the insertion/withdrawal hole side of the cartridge holder 4 as shown in FIGS. 18 to 24.

In the loading device for disc cartridge according to this invention, the cartridge holder 4 and the vertical movement operation plate 5 are caused to undergo movement operation by the drive motor 34 which serves as common drive source.

Moreover, in this loading device, movement direction when the cartridge holder 4 is caused to undergo movement operation in the second position direction opposite to the loading portion 300 and movement direction when the vertical movement operation plate 5 rotationally operates the supporting levers 65 to move the cartridge holder 4 in a direction close to the loading portion 300 side are caused to be opposite to each other.

At the backward side portion of the supporting frame 16, as shown in FIG. 6, a lock lever 56 for locking the vertical movement operation plate 5 is rotatably disposed through a support shaft 54 vertically provided at the backward side portion of the supporting frame 16. This lock lever 56 includes an operation pin 57 opposite to the backward end edge of the cartridge holder 4, and a holding portion 59 for holding the vertical movement operation plate 5 at the backward side position. This lock lever 56 is rotationally biased in a direction to move the operation pin 57 toward the front side closer to the cartridge holder 4 by a torsional coil spring 55.

When the cartridge holder 4 is located at the first position side of the insertion/withdrawal hole side from the second position opposite to the loading portion 300, since the backward end edge of the cartridge holder 4 is away from the operation pin 57, the lock lever 56 is rotated by biasing force of the torsional coil spring 55 so that it is rotationally biased at the initial position. The holding portion 59 of the lock lever 56 holds a holding pin 154 caused to hang down from the lower surface portion of the backward side of the vertical movement operation plate 5 to prevent movement toward the front side of the vertical movement operation plate 5 to hold the vertical movement operation plate 5 at the position fixed at the supporting frame 16. When the cartridge holder 4 reaches the second position, the operation pin 57 is pressed by the backward end edge of the cartridge holder 4. Thus, the lock lever 56 is rotated against biasing force of the torsional coil spring 55. At this time, the holding portion 59 of the lock lever 56 releases holding with respect to the holding pin 154 of the vertical movement operation plate 5 thus to permit movement toward the front side of the vertical movement operation plate 5.

Figure 20:
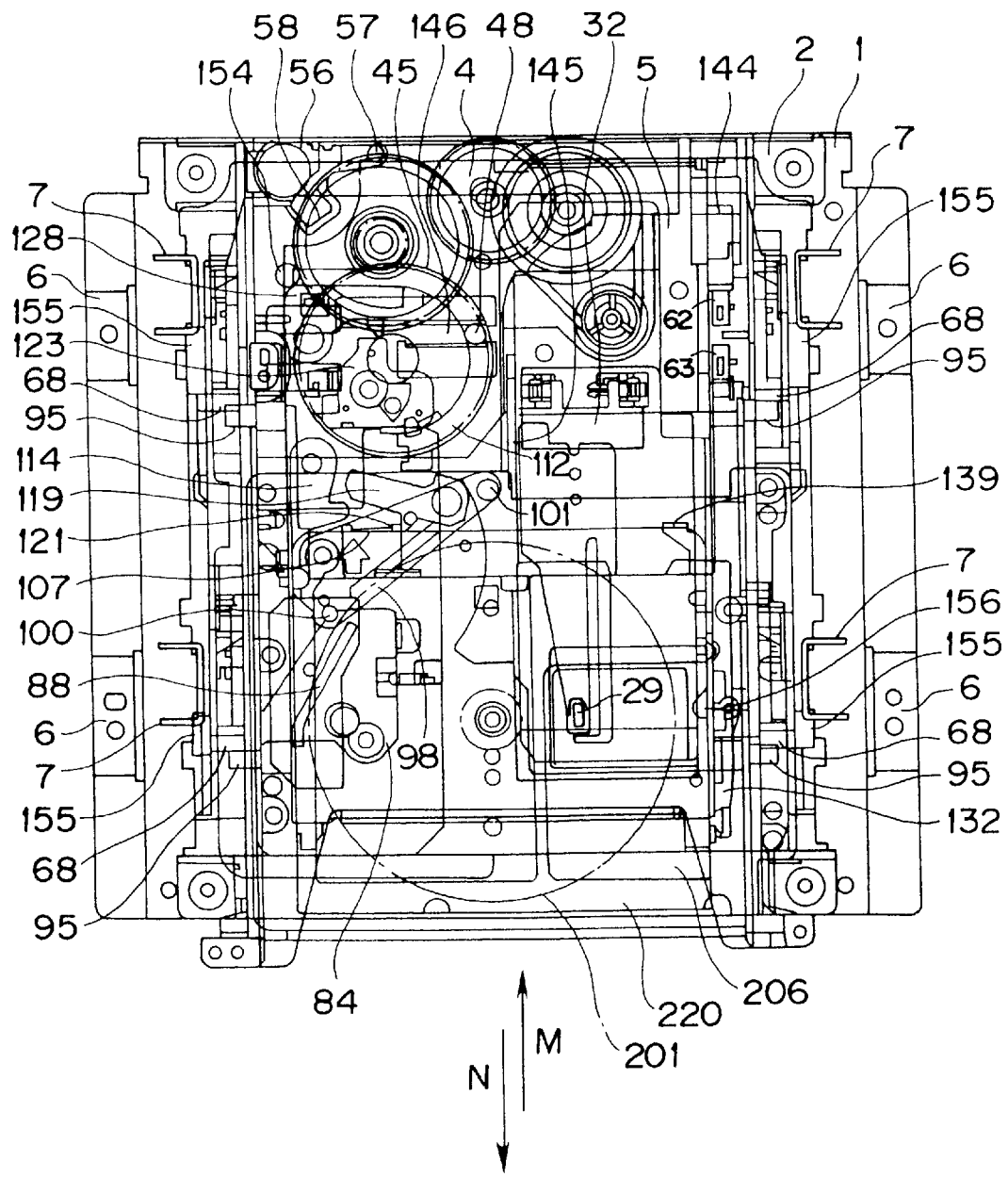
FIG. 20 is a plan view showing the state in the course of movement of the cartridge holder toward the loading portion side.
Figure 21:
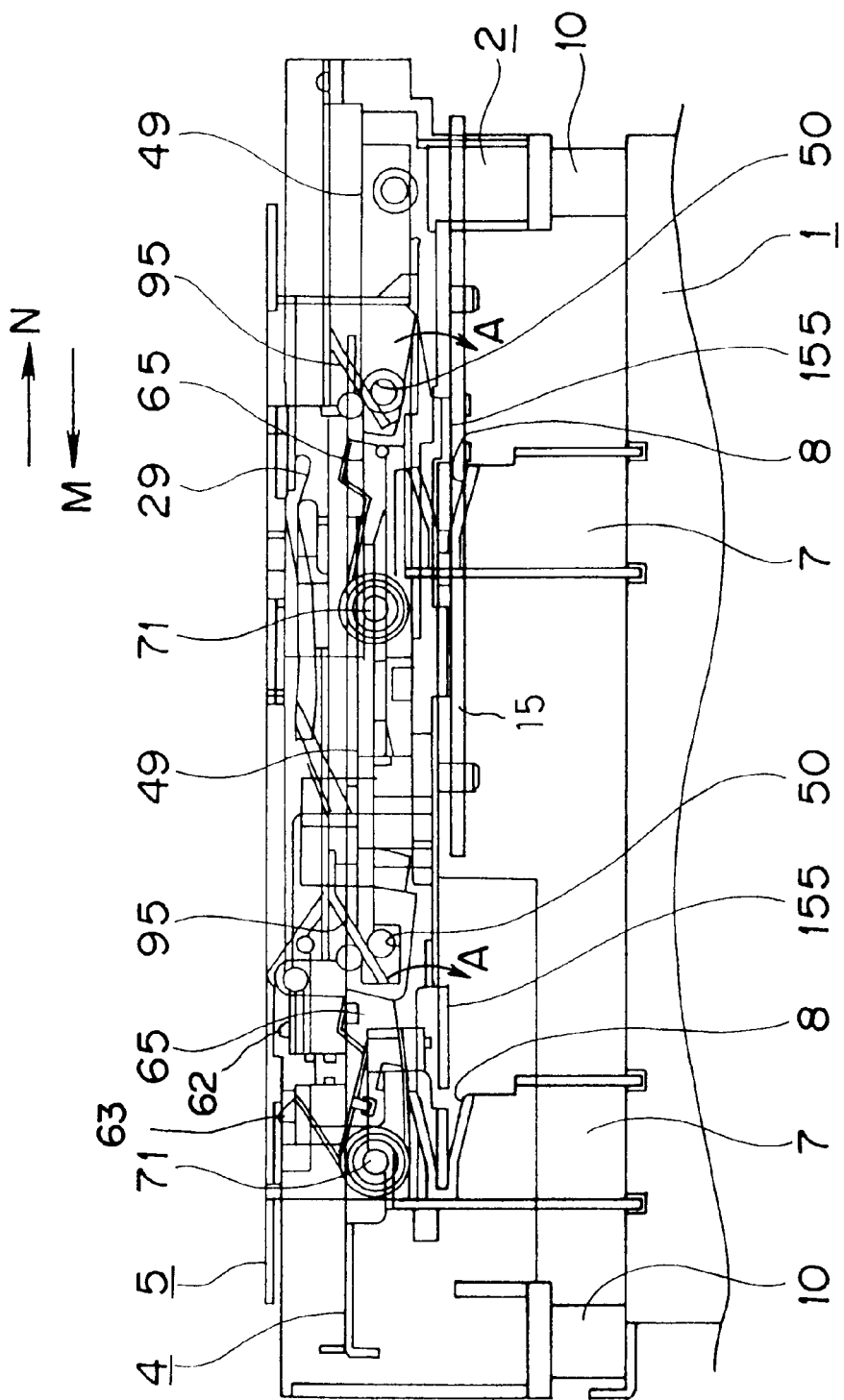
FIG. 21 is a side view showing the state in the course of movement of the cartridge holder toward the loading portion side.
Figure 22:
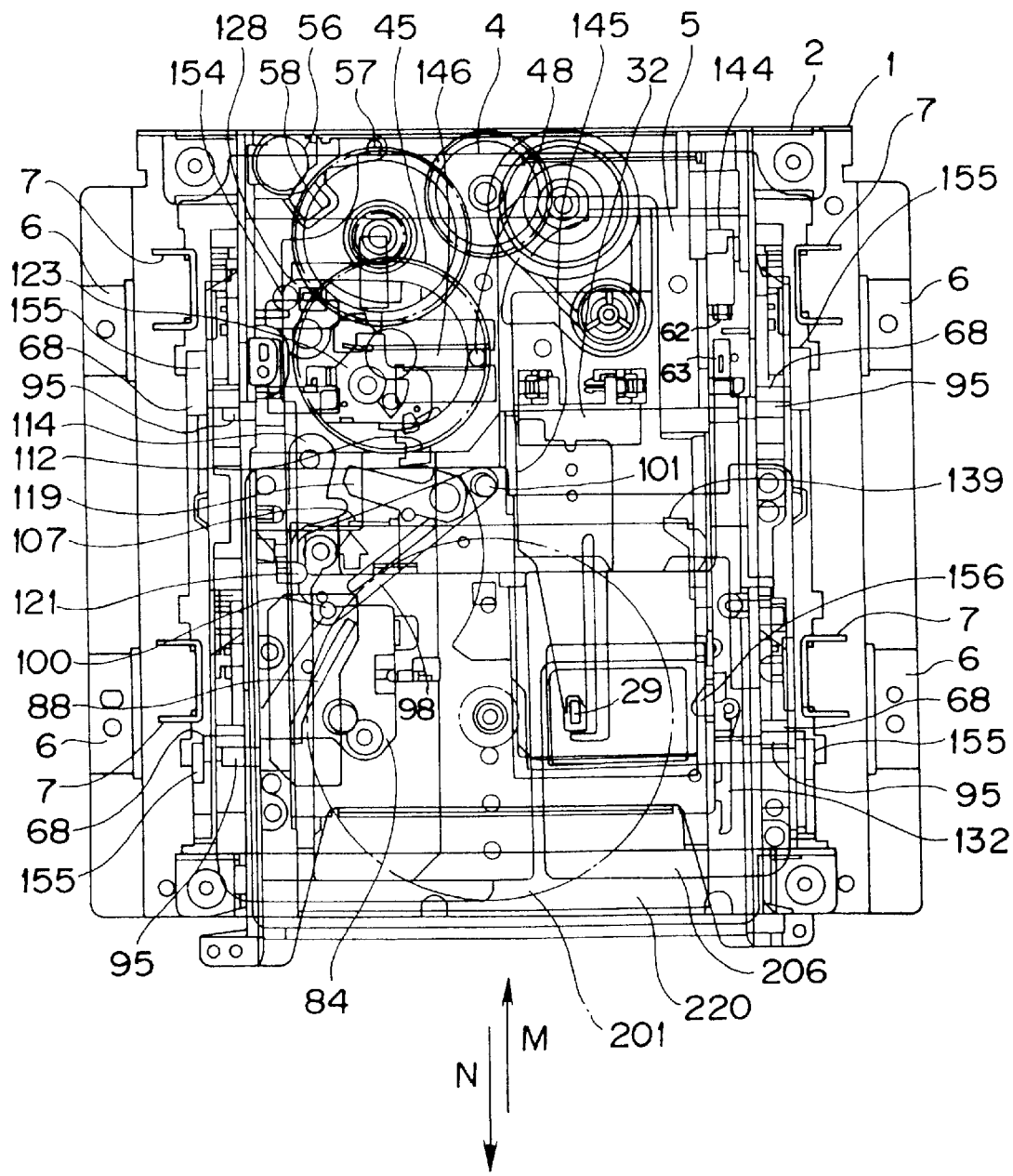
FIG. 22 is a plan view showing the state where disc cartridge held by cartridge holder is loaded into loading portion.

Moreover, at the backward side portion of the supporting frame 16, first, second and third position detection switches 62, 63, 64 are attached through a printed board 61. The first and second position detection switches 62, 63 serve to detect position of the vertical movement operation plate 5, and are disposed in the state arranged before and after with their pressing elements being directed toward the upper side. When the vertical movement operation plate 5 is located at the position where it is fixedly supported on the supporting base 1, the first and second position detection switches 62, 63 are both in the state where they are not caused to undergo pressing operation as shown in FIGS. 20 and 21. Further, the first position detection switch 62 positioned at the backward side of the first and second position detection switches 62, 63 is actuated so that when the vertical movement operation plate 5 is located at the position where it has lowered the cartridge holder 4 toward the loading portion 300 side as shown in FIGS. 22 and 23, the first position detection switch 62 is caused to undergo pressing operation by a switch pressing projection 144 provided at the backward side of the vertical movement operation plate 5. This switch pressing projection 144 is projected toward the lower side at the lower surface side of the vertical movement operation plate 5.

Further, both of the first and second position detection switches 62, 63 are adapted as shown in FIGS. 24 and 25 so that when the vertical movement operation plate 5 is in the state where the magnetic head element 29 of the magnetic head unit 26 is in the state moved to the recording mode position where it is caused to be in slidable contact with the magneto-optical disc 201, both switches are caused to undergo pressing operation by the switch pressing projection 144.

Figure 12:
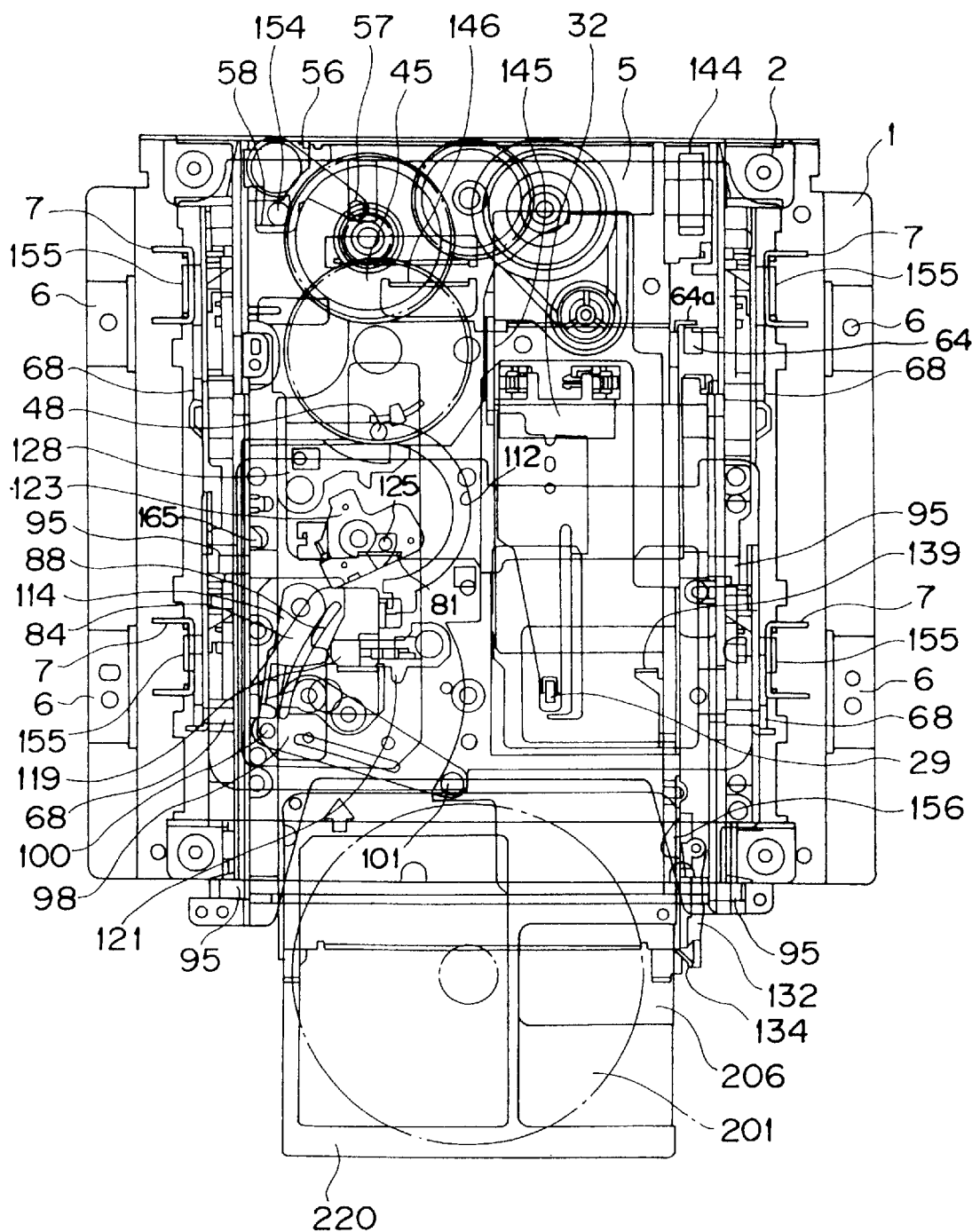
FIG. 12 is a plan view showing the state where cartridge holder is moved to first position to permit insertion/withdrawal of disc cartridge.
Figure 13:
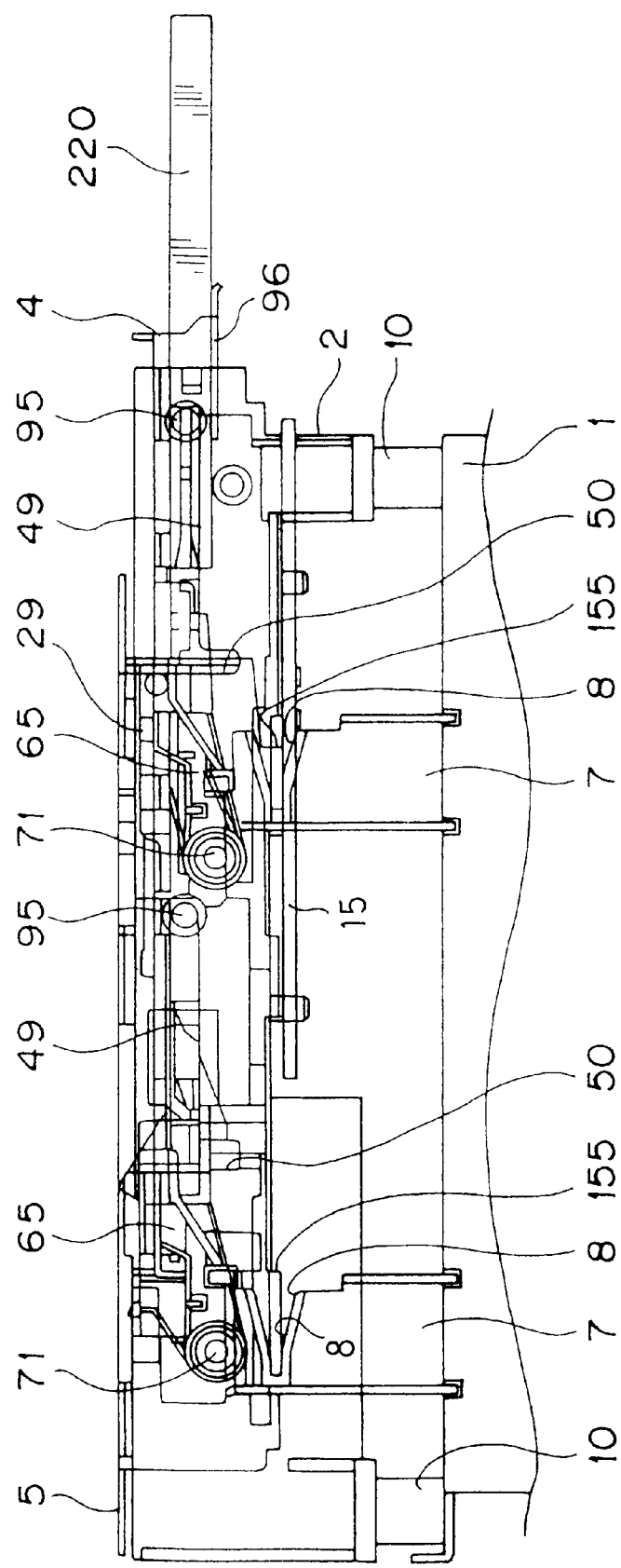
FIG. 13 is a side view showing the state where cartridge holder is moved to the first position.
Figure 14:
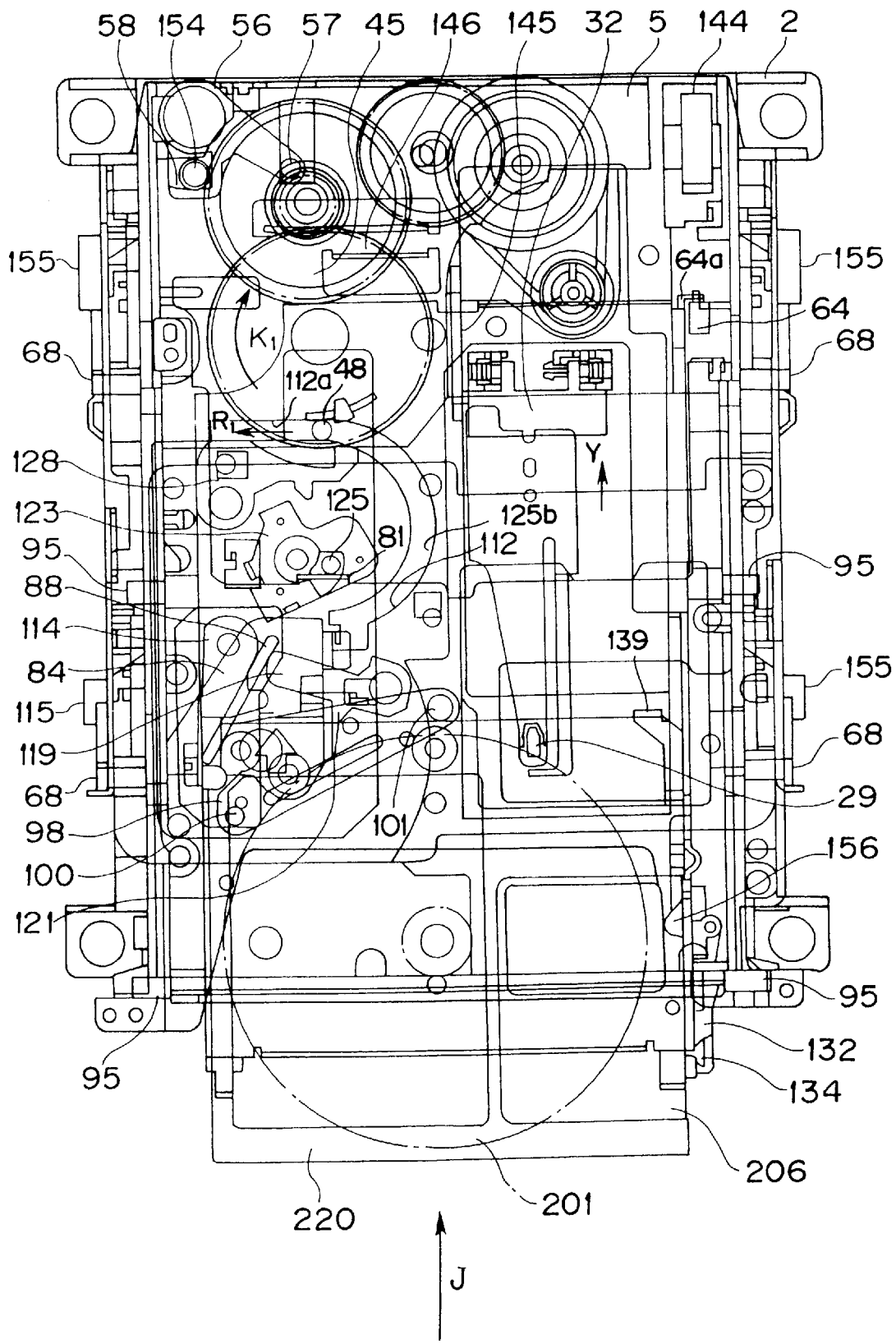
FIG. 14 is a plan view showing the state where disc cartridge is inserted into cartridge holder.
Figure 15:
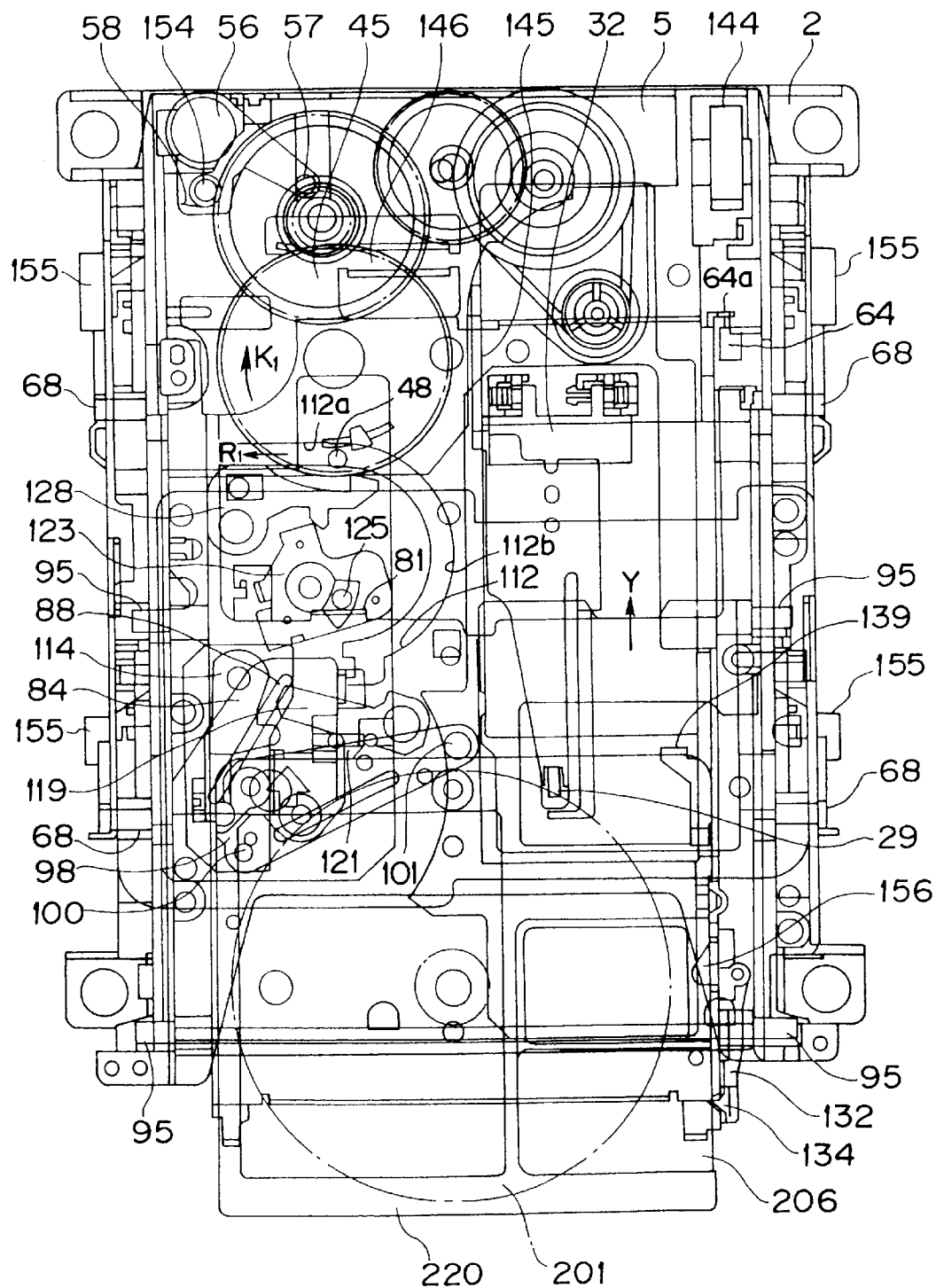
FIG. 15 is a plan view in the state where cartridge holder starts movement toward the second position inwardly of outer casing.
Figure 16:
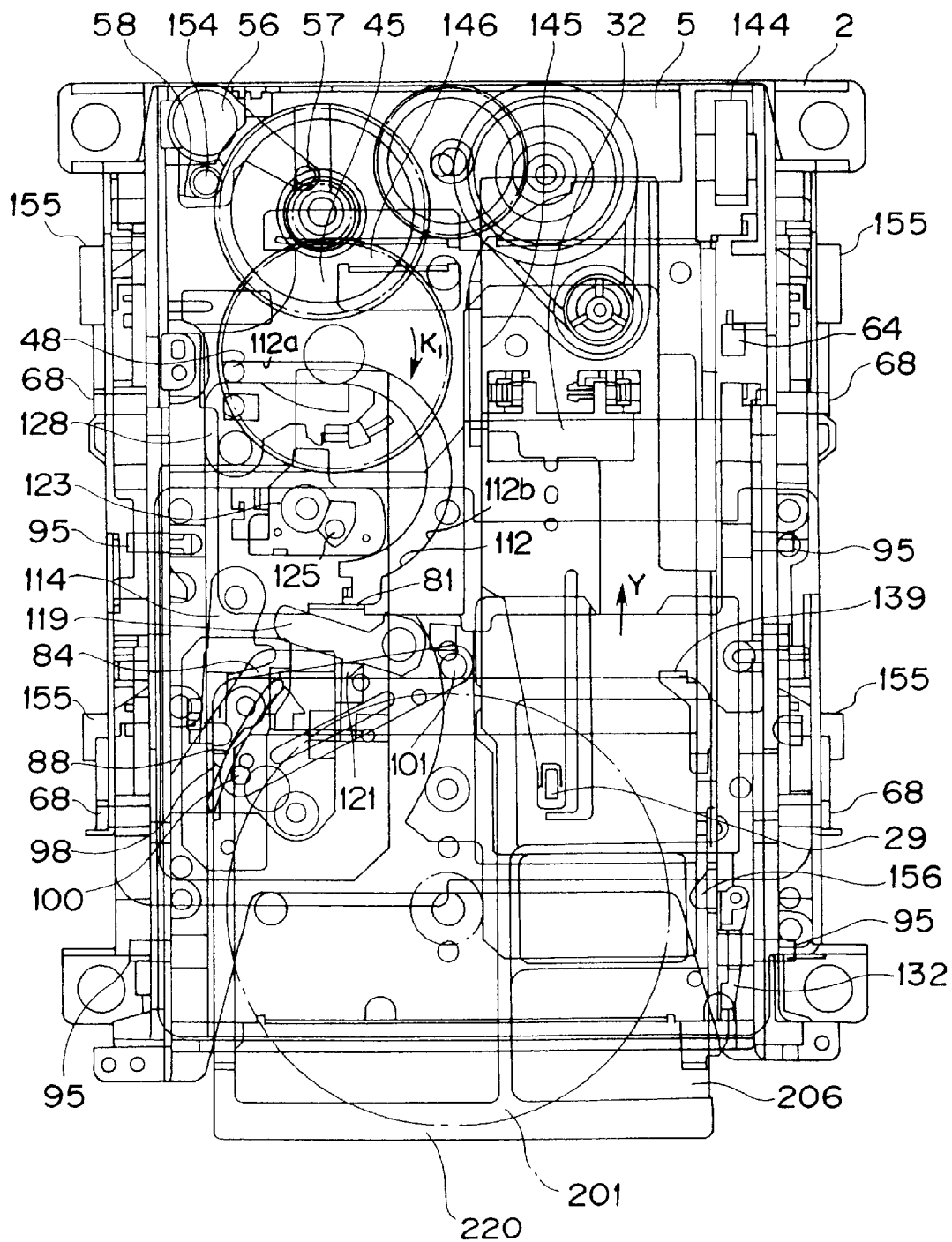
FIG. 16 is a plan view showing the state immediately after the cartridge holder starts movement toward the second position inwardly of the outer casing.
Figure 17:
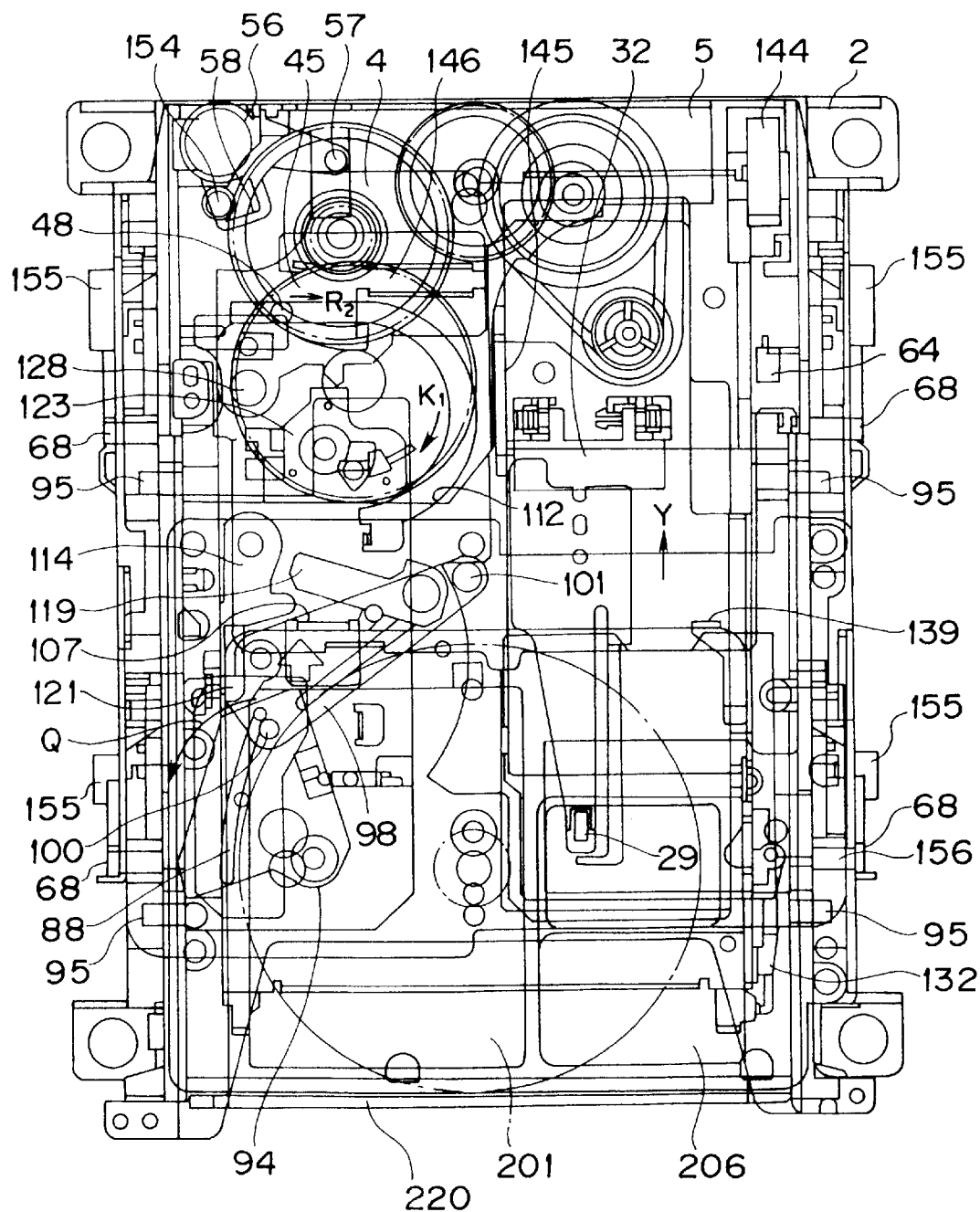
FIG. 17 is a plan view showing the state in the course of movement of the cartridge holder toward the second position inwardly of the outer casing.

Moreover, the third position detection switch 64 serves to detect position of the cartridge holder 4, and is disposed with the pressing element being directed toward the backward side. This third position detection switch 64 is adapted so that when the cartridge holder 4 is positioned at the backward side inwardly of the outer casing with respect to the first position where insertion/withdrawal of the disc cartridge 220 or 221 can be made, the third position detection switch 64 is in the state where it is not caused to undergo pressing operation by the cartridge holder 4 as shown in FIGS. 15 to 17. Further, this third position detection switch 64 is adapted as shown in FIGS. 12, 13 and 14 so that when the cartridge holder 4 is located at the first position, the switch 64 is caused to undergo pressing operation by a switch pressing piece 94 provided at the backward side of the cartridge holder 4. This switch pressing piece 94 is formed in such a manner that a portion of the backward end side portion of the cartridge holder 4 is bent toward the lateral side.

Further, at the cartridge holder 4, as shown in FIG. 9, an eject detection lever 123 is rotatably attached. This eject detection lever 123 is rotatably supported with a support shaft 105 being as center in the state where the support shaft 105 vertically provided so as to hang down toward the lower surface side of the cartridge holder 4 is inserted through a supporting hole 124 bored at the central portion thereof. This eject detection lever 123 is rotationally biased by extension (tensile) spring (not shown) in a direction indicated by arrow G in FIG. 9 which is the direction where the contact portion 126 is caused to serve as backward side in the state where the contact portion 126 is directed toward the backward side of the catridge holder 4, and is caused to undergo positioning in the state where the operation pin 125 is caused to be in contact with the front end portion of a through-hole 110 provided at the cartridge holder 4. This eject detection lever 123 is adapted so that when an cartridge holder 4 is in the state moved to the first position, it is caused to undergo rotational operation against biasing force of extension spring in the state where the operation pin 125 is caused to be in contact with a contact piece 81 of the top plate 3.

Moreover, at the cartridge holder 4, as shown in FIG. 9, a movement operation pin guide lever 128 is rotatably attached. This movement operation pin guide lever 128 is rotatably supported with a support shaft 106 being as center in the state where the support shaft 106 vertically provided so as to hang down toward the lower surface side of the cartridge holder 4 is inserted through a support hole 129 of the base end side. This movement operation pin guide lever 128 is rotationally biased by torsional coil spring (not shown) in a direction indicated by arrow H in FIG. 9 which is the direction where the front end side thereof is moved to the cam groove 112 side which is the backward side of the cartridge holder 4 in the state where the front end portion is directed toward the lateral side of the cartridge holder 4 and a contact projecting portion 131 provided at the side edge portion is directed toward the front side of the cartridge holder 4. This movement operation pin guide lever 128 is positioned at the lower side of a cut portion 113 formed at the position opposite to the linear cam portion 112b of the cam groove 112, and is caused to undergo positioning at the position where the cut portion 113 is covered by one side portion. Moreover, the movement operation pin guide lever 128 allows the contact projecting portion 131 to be opposite to the contact portion 126 of the eject detection lever 123. Further, the movement operation pin guide lever 128 is adapted so that when the cartridge holder 4 is located at the first position, the eject detection lever 123 is rotated in a direction indicated by arrow G in FIG. 9 by extension spring. For this reason, rotation toward the front side can be made. Accordingly, at this time, when the disc cartridge 220 or 221 is inserted into the cartridge holder 4 so that the cartridge holder 4 attempts to be moved toward the second position direction, the movement operation pin guide lever 128 is caused to be in contact with the movement operation pin 48 so that it is rotated toward front side with respect to the cartridge holder 4. Thus, admission into the cut portion 113 of the movement operation pin 48 can be made, thereby permitting movement toward backward side of the cartridge holder 4.

By movement toward the backward side of the cartridge holder 4 by admission into the cut portion 113 of the movement operation pin 48, pressing operation with respect to the third position detect ion switch 64 is released. By releasing of pressing operation with respect to the third position detection switch 64, loading operation is started.

Further, this movement operation pin guide lever 128 is adapted so that when the cartridge holder 4 is located at the second position side inwardly of the outer casing than the first position, rotation toward the front side is prevented because the eject detection lever 123 is returned to the initial position. Accordingly, at this time, the movement operation pin guide lever 128 prevents admission into the cut portion 113 of the movement operation pin 48.

(2-5) Eject Lever

Eject lever 98 for allowing the disc cartridge 220 or 221 held by the cartridge holder 4 to undergo eject oprtsyion will now be described.

This eject lever 98 includes, as shown in FIG. 9, a drive pin 100 and a contact pin 101 serving as a contact portion with respect to the disc cartridge 220 or 221 held by the cartridge holder 4 as shown in FIG. 9, and is rotatably attached on the upper surface side of the cartridge holder 4. Namely, the eject lever 98 is rotatably supported with a support shaft 102 being as center in the state where the support shaft 102 projected on the plane surface portion of the cartridge holder 4 is supported through a through-hole 99 bored at the base end side where the drive pin 100 is provided. This eject lever 98 is adapted so that when it is rotated in the direction where the contact pin 101 is caused to be front side, it pushes out, toward the front side, the disc cartridge 220 or 221 held by, the cartridge holder 4.

The guide member 84 attached at the top plate 3 rotates the eject lever 98 through the drive pin 100 with respect to the cartridge holder 4 in dependency upon movement ranging between the first position and the second position of the cartridge holder 4.

The drive pin 100 provided at the eject lever 98 is adapted as shown in FIGS. 14 to 18 so that when the cartridge holder 4 moves from the first position to the second position, it is passed through a first path with respect to the guide member 84, and moves without being caused to undergo movement operation by the guide member 84. Namely, the guide member 84 is adapted so that when the drive pin 100 is passed through the first path with respect to the guide member 84, one side surface 88a side of the projecting portion 88 is pushed by the drive pin 100 so that it is rotationally operated in the direction opposite to the direction indicated by arrow D in FIG. 8 against biasing force of the extension spring 87, and when the cartridge holder 4 reaches the second position, the drive pin 100 is away from the projecting portion 88 so that it is rotationally returned to the initial position by biasing force of the extension spring 87.

Further, the drive pin 100 is adapted as shown in FIGS. 18 and 26 to 28 so that when the cartridge holder 4 moves from the second position side toward the first position side, it is passed through a second path with respect to the guide member 84 so that it is caused to undergo movement operation by the guide member 84 to rotate the eject lever 98 in the direction where the contact pin 101 presses the disc cartridge 220 or 221. Namely, the drive pin 100 is adapted so that when it is passed through the second path with respect to the guide member 84, it is moved with respect to the cartridge holder 4 following the other side surface 88b of the projecting portion 88 of the guide member 84 moved to the initial position. When the drive pin 100 moves following the projecting portion 88 of the guide member 84, the eject lever 98 is rotated. Thus, eject operation from the cartridge holder 4 of the disc cartridge 220 or 221 through the contact pin 101 is carried out.

(2-6) Cover Mechanism

Cover mechanism for opening/closing insertion/withdrawal hole to carry out insertion/withdrawal of the disc cartridge 220 or 221 provided within the outer casing with respect to the cartridge holder 4 will now be described.

At the supporting frame 16 in which the recording/reproducing unit is constituted, there is provided a cover control lever 73 for rotationally operating a rotational cover 157 constituting the cover mechanism to open/close the insertion/withdrawal hole and for controlling rotation of the rotational cover 157. This control lever 73 is rotationally operated by supporting pins 95 projected on the side surface of the cartridge holder 4 in dependency upon movement position of the cartridge holder 4.

Figure 32:
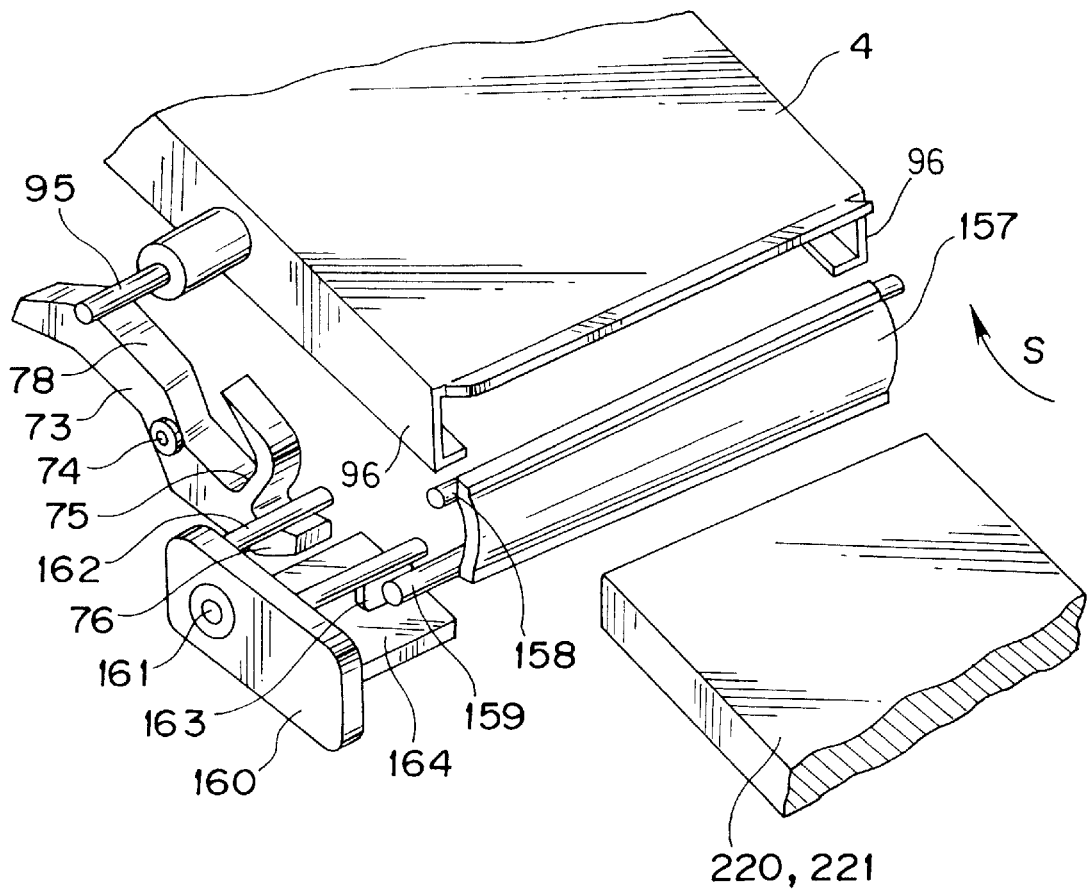
FIG. 32 is a perspective view showing rotation cover for opening/closing insertion/withdrawal hole provided at outer casing and opening/closing mechanism for the rotation cover.
Figure 35:
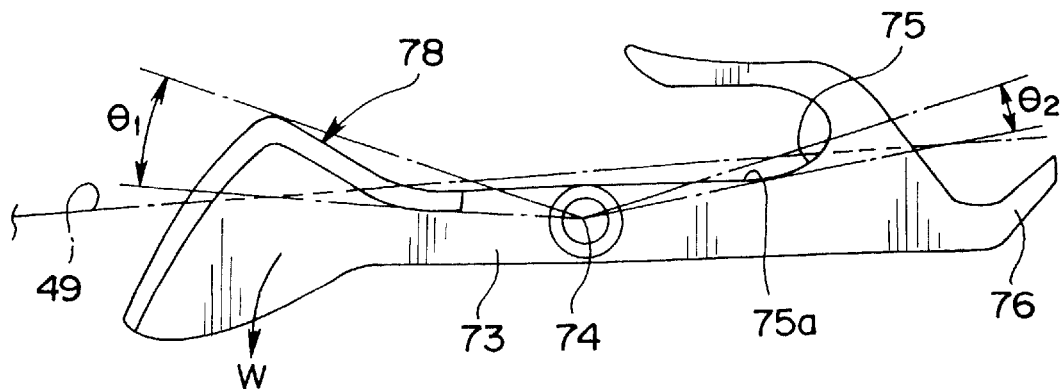
FIG. 35 is a side view showing cover control lever for controlling opening/closing operation of the rotation cover.

Further, the cover control lever 73 is located at the position close to the insertion/withdrawal hole provided at the outer casing, and is adapted as shown in FIGS. 6, 32 and 35 so that a support shaft 74 vertically provided on one side surface of the central portion is attached through the frame portion 16a of the supporting frame 16. Namely, the cover control lever 73 is rotatably attached with the support shaft 74 being as center at the inside surface of one side wall 171 of the supporting frame 16.

This cover control lever 73 is adapted so that an inclined surface portion 78 is formed at the upper surface of the backward side positioned inwardly of the outer casing with the support shaft 74 being as center when the cover control lever 73 is attached at the supporting frame 16. Moreover, an engagement recessed portion 75 is formed at the front side positioned at the insertion/withdrawal hole side with the support shaft 74 being as center. The cover control lever 73 is rotationally biased, as shown in FIG. 6, in the direction indicated by arrow C in FIG. 6 so that the inclined surface portion 78 is positioned above by a compression coil spring 77 disposed between a supporting piece 77a projected on the inside surface of one side wall 171 of the supporting frame 16 and the backward end portion thereof.

Moreover, the inclined surface portion 78 is formed by swelling the middle portion of the upper surface of the backward side of the cover control lever 73, and is adapted so that when the cover control lever 73 is located at the initial position where the cover control lever 73 is rotationally biased by the compression coil spring 77, it is projected toward the upper direction with respect to the movement guide portion 49 formed at the upper end surface of the frame portion 16a. When the supporting pin 95 is passed on the inclined surface portion 78, the cover control lever 73 is rotated in a direction indicated by arrow W in FIG. 35 against biasing force of the compression coil spring 77 with the support shaft 74 being as center so that the inclined surface portion 78 is flush (level) wish the upper surface of the movement guide portion 49. The rotational range of the cover control lever 73 at this time is the range indicated by arrow $\theta_1$ in FIG. 35.

The engagement recessed portion 75 formed at the front side of the cover control lever 73 is opened toward the backward side, and has a width corresponding to the outside diameter of the supporting pin 95. At the initial position, lower surface 75a is positioned at the lower side with respect to the upper surface of the movement guide portion 49. When the supporting pin 95 is admitted into the engagement recessed portion 75, the cover control lever 73 is rotated in the direction indicated by arrow W in FIG. 35 against biasing force of the compression coil spring 77 so that the lower surface 75a of the engagement recessed portion 75 is flush (level) with the upper end surface of the movement guide portion 49. The rotational range of the cover control lever 73 at this time is the range indicated by arrow $\theta_2$ in FIG. 35.

The rotational range $\theta_1$ when the supporting pin 95 rides on the inclined surface portion 78 so that it is rotated is caused to be greater than the rotational range $\theta_2$ rotated when the supporting pin 95 is admitted into the engagement recessed portion 75 so that it is rotated.

At the end portion of the front side where the engagement recessed portion 75 of the cover control lever 73 is formed, an engagement piece 76 with which a connecting member 160 is engaged is projected as shown in FIGS. 32 and 35. This engagement piece 76 is engaged with an operation pin 162 provided at the backward side of the connecting member 160. This connecting member 160 is adapted so that the central portion is supported through a support shaft 161 within the outer casing so that it can be rotated with the support shaft 161 being as center. Further, the connecting member 160 is rotationally operated with the support shaft 161 being as center in dependency upon rotational angle of the cover control lever 73 in a manner interlocking with rotation of the cover control lever 73.

The connecting member 160 is provided, as shown in FIG. 32, at the front side portion thereof, with a lock piece 163 which is in contact and engaged with an operation projection 159 projected from one side of the lower end side of the rotary cover 157 and limits rotation in a direction to open the insertion/withdrawal hole of the rotary cover 157, and an operation piece 164 for pressing the operation projection 159 to rotationally operate the rotary cover 157.

Figure 33:
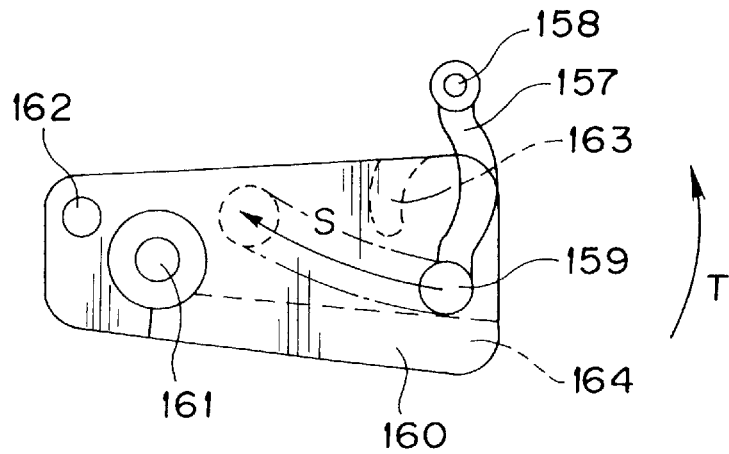
FIG. 33 is a side view showing the state where the rotation cover is permitted to open the insertion/withdrawal hole.

Further, when the cartridge holder 4 is in the state where it is moved to the first position close to the insertion/withdrawal hole side which permits insertion/withdrawal of the disc cartridge 220 or 221, there results the state where the supporting pin 95 is engaged with the engagement recessed portion 75 so that it has pressed the lower surface 75a of the engagement recessed portion 75. At this time, the cover control lever 73 is in the state rotated by angle $\theta_2$ from the initial position, and the operation projection 159 is located at the intermediate position between the lock piece 163 and the operation piece 164 as shown in FIG. 33. Accordingly, at this time, the rotary cover 157 is in the state rotatable in a direction to open the insertion/withdrawal hole in the direction indicated by arrow S in FIG. 33 with the operation projection 159 being passed through a gap between the lock piece 163 and the operation piece 164.

In the case where the rotary cover 157 is in the rotatable state, when the disc cartridge 220 or 221 is inserted into the insertion/withdrawal hole, the rotary cover 157 is pressed by the disc cartridge 220 or 221 caused to undergo insertion operation so that it is rotated in the direction indicated by arrow S in FIG. 33 to open the insertion/withdrawal hole with support shaft 158 being as center.

Figure 34:
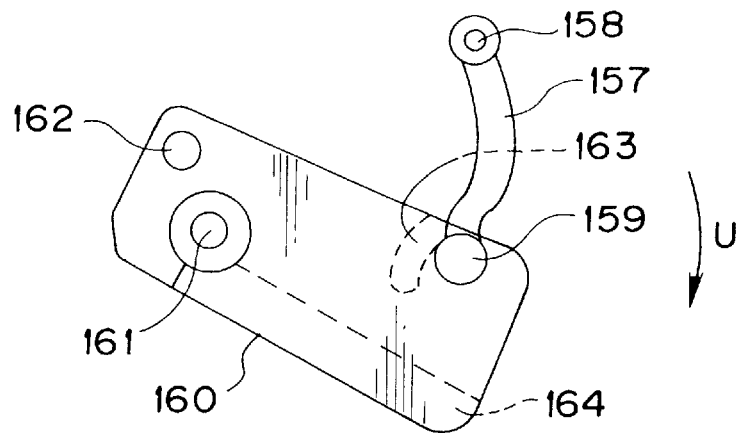
FIG. 34 is a side view showing the state where the rotation cover has closed the insertion/withdrawal hole.

Further, when the cartridge holder 4 is moved to the second position opposite to the loading portion 300, the cover control lever 73 is subjected to releasing of pressing by the supporting pin 95 to undergo biasing force of the compression coil spring 77. Thus, the cover control lever 73 is placed in the state rotated to the initial position. At this time, the connecting member 160 is rotated in a direction indicated by arrow U in FIG. 34 to allow the lock piece 163 to be in contact with the operation projection 159 to limit rotation in the direction to open the insertion/withdrawal hole of the rotary cover 157. As the result of the fact that rotation of the rotary cover 157 is limited in this way, insertion operation of the disc cartridge 220 or 221 into the insertion/withdrawal hole is limited. Thus, double insertion of the disc cartridge 220 or 221 is prohibited.

Moreover, when the cartridge holder 4 is in the state where it moves between the first position close to the insertion/withdrawal hole side and the second position opposite to the loading portion 300, the supporting pin 95 is in the state where it rides on the inclined surface portion 78 to place the cover control lever 73 in the state rotated within the range indicated by arrow $\theta_1$ in FIG. 35 in the direction indicated by arrow W in FIG. 35 against biasing force of the compression coil spring 77. Then, the connecting member 160 is rotated in the direction indicated by arrow T in FIG. 33 to pull up the operation projection 159 by the operation piece 164. At this time, the rotary cover 157 is caused to undergo pressing operation by the operation piece 158, and is rotated in the direction indicated by arrow S in FIG. 33. Thus, the rotary cover 157 is placed at the position where the insertion/withdrawal hole is opened. Accordingly, contact of the rotary cover 157 with respect to the disc cartridge 220 or 221 which is being passed through the insertion/withdrawal hole is prevented.

[3] Loading Operation of the Disc Cartridge

The operation for loading the disc cartridge 220 or 221 into the loading portion 300 of the disc recording/reproducing apparatus of this embodiment constituted as described above, and for allowing the disc cartridge 220 or 221 loaded into the loading portion 300 to undergo eject operation will be described below.

(3-1) Insertion Operation into the Cartridge Holder of the Disc Cartridge

In the case of allowing the disc cartridge 220 of the recording type or the disc cartridge 221 of reproduction only type to undergo insertion operation into the cartridge holder 4, the cartridge holder 4 is caused to be moved to the first position close to the insertion/withdrawal hole provided at the outer casing as shown in FIGS. 12 and 13.

When the cartridge holder 4 is located at the first position, as shown in FIG. 13, the vertical movement operation plate 5 is placed in the state moved to the position where the engagement piece 155 is engaged with the engagement groove 8 provided at the supporting base 1, and is fixed on the supporting base 1. As the result of the fact that the vertical movement operation plate 5 is fixed on the supporting base 1, the recording/reproducing unit is constituted. Thus, the recording/reproducing mounting (attachment) base 2 to which the cartridge holder 4 is attached is fixed on the supporting base 1 without undergoing elastic force of the damper 10. Because the recording/reproducing unit mounting base 2 is fixed on the supporting base 1, the cartridge holder 4 is subjected to positioning in such a manner that opening portion of the front surface side where insertion/ withdrawal of the disc cartridge 220 or 221 is carried out is precisely opposed to the insertion/withdrawal hole of the outer casing.

When the cartridge holder 4 is located at the first position, the supporting pin 95 provided at the cartridge holder 4 is engaged with the engagement recessed portion 75 of the cover control lever 73, thus to place the cover control lever 73 in the state where it is rotated against biasing force of the compression coil spring 77. When the cover control lever 73 is rotated by the supporting pin 95, the operation projection 159 provided at the rotary cover 157 is placed at the position in contact with both the lock piece 163 and the operation piece 164 provided at the connecting member 160 rotationally operated by the cover control lever 73 as shown in FIG. 33, thus placing the rotary cover 157 in the state where it can be rotated in a direction to open the insertion/withdrawal hole.

When the disc cartridge 220 or 221 is inserted through the insertion/withdrawal hole in the state where the cartridge holder 4 is moved to the first position as described above, the disc cartridge 220 or 221 caused to undergo insertion operation is inserted into the cartridge holder 4 while the rotary cover 157 is rotated toward the inward of the outer casing with the support shaft 158 being as center.

When the disc cartridge 220 or 221 is normally inserted into the cartridge holder 4, the shutter member 206 or 217 is caused to undergo relative movement by the shutter opening operation piece 156 provided at the cartridge holder 4. Thus, opening portions 222, or 223 provided at the disc cartridges 220 or 221 is opened.

(3-2) Loading Operation

Then, the disc cartridge 220 or 221 is inserted a in a direction indicated by arrow J in FIG. 14 until the end surface of the insertion direction side comes into contact with positioning pieces 139, 107. After the inserted disc cartridge 220 or 221 comes into contact with the positioning pieces 139, 107, when disc cartridge 220 or 221 is further caused to undergo pressing operation inwardly of the outer casing, the cartridge holder 4 is moved in the direction indicated by arrow J in FIG. 14 in one body with the disc cartridge 220 or 221 to release pressing of the third position detection switch 64 which has been pressed by the pressing operation piece 84a provided at one side of the backward end side of the cartridge holder 4.

Movement of the cartridge holder 4 which has been in one body with the disc cartridge 220 or 221 is carried out by allowing the movement operation pin 48 provided at the rotating body 45 engaged with the cam groove 112 to undergo relative movement toward the cut portion 113 side provided within the cam groove 112 in a manner opposite to the linear cam portion 112a. Namely, movement of the cartridge holder 4 which has been in one body with the disc cartridge 220 or 221 is carried out within the range where the movement operation pin 48 moves from the linear cam portion 112a to the cut portion 113 side.

When pressing of the third position detection switch 64 is released, it is detected that the disc cartridge 220 or 221 is inserted into the cartridge holder 4 and held thereby. The detection signal thus obtained is inputted to control circuit (not shown). When the detection signal is inputted to the control circuit, drive in forward direction of the drive motor 34 is started. When the drive motor 34 begins to be driven in the forward rotation direction, the rotating body 45 is caused to undergo rotation operation in the direction indicated by arrow $K_1$ in FIG. 14. Thus, the movement operation pin 48 vertically provided on the rotating body 45 rotates in a direction toward the direction indicated by arrow $R_1$ in FIG. 14 along the linear cam portion 112a of the cam groove 112. When the movement operation pin 48 rotates in the direction indicated by arrow $R_1$ in FIG. 14 along the linear cam portion 112a, the cartridge holder 4 is caused to undergo movement operation in the direction indicated by arrow Y in FIG. 14 toward the loading portion 300 side in parallel to the base plate 15 while holding the disc cartridge 220 ro 221.

The movement operation pin 48 for carrying out movement operation of the cartridge holder 4 is adapted so that when the rotating body 45 is rotated ranging from the initial position to the position rotated by substantially 90 degrees in the direction indicated by arrow $K_1$ in FIGS. 14, 15 and 16, it rotates in the direction toward the direction indicated by arrow $R_1$ in FIGS. 14 and 15 to move the cartridge holder 4 in the direction indicated by arrow Y in FIGS. 14, 15 and 16 toward the loading portion 300 direction.

When the cartridge holder 4 is moved from the first position toward the second position direction opposite to the loading portion 300, the drive pin 100 provided at the eject lever 98 is passed through the first path with respect to the guide member 84, and moves without being operated by the guide member 84. Namely, the guide member 84 is adapted so that when the drive pin 100 of the eject lever 98 is passed through the first path with respect to the guide member 84, one side portion of the projecting portion 88 is pressed by the drive pin 100 so that the guide member 84 is rotationally operated against biasing force of the extension spring 87. When the cartridge holder 4 reaches the second position opposite to the loading portion 300, the guide member 84 is caused to undergo biasing force of the extension spring 87 so that it is returned to the initial position because the drive pin 100 of the eject lever 98 is away from the projecting portion 88.

In addition, when the cartridge holder 4 is in the state where it is moving between the first position and the second position, the cover control lever 73 is rotated in the direction indicated by arrow W in FIG. 35 against biasing force of compression coil spring 77 by the supporting pin 95 to rotationally operate the connecting member 160 to rotate the rotary cover 157, toward the side where the insertion/ withdrawal hole is opened, by means of an operation piece 158 provided at the connecting member 160.

(3-3) Loading Operation of the Disc Cartridge

When the rotating body 45 is rotated ranging from the initial position to the position rotated by substantially 90 degrees in the direction indicated by arrow $K_1$ in FIGS. 14, 15 and 16, and is then further rotated in the same direction, the movement operation pin 48 rotates in the direction toward the direction indicated by arrow $R_2$ in FIGS. 17 and 18 in a manner opposite to the above along the linear cam portion 112a to move the cartridge holder 4 in the direction indicated by arrow Y in FIG. 17 toward the loading portion 300 direction to move it up to the position opposite to the upper portion of the loading portion 300. When the cartridge holder 4 is moved up to the position opposite to the upper portion of the loading portion 300, the movement operation pin 48 reaches the position faced to the cam portion 112b in the circular arc form continuous to the linear cam portion 112a of the cam groove 112 as shown in FIG. 18. At this time, the rotating body 45 is located at the position rotated by substantially 180 degrees from the initial position. Further, even when the rotating body 45 is further rotated in the direction indicated by arrow $K_1$ in FIG. 18 from the state shown in FIG. 18 where the movement operation pin 48 is faced to the circular arc shaped cam portion 112b, since the movement operation pin 48 moves along the cam portion 112b which takes circular arc shape in correspondence with movement locus of the movement operation pin 48, the cartridge holder 4 is held at the second position opposite to the portion on the loading portion 300. In this case, since the cam portion 112b which takes circular arc shape is formed semi-circular, the cartridge holder 4 is continuously held at the second position during rotational operation in the range of further rotation of 180 degrees of the rotating body 45.

Figure 19:
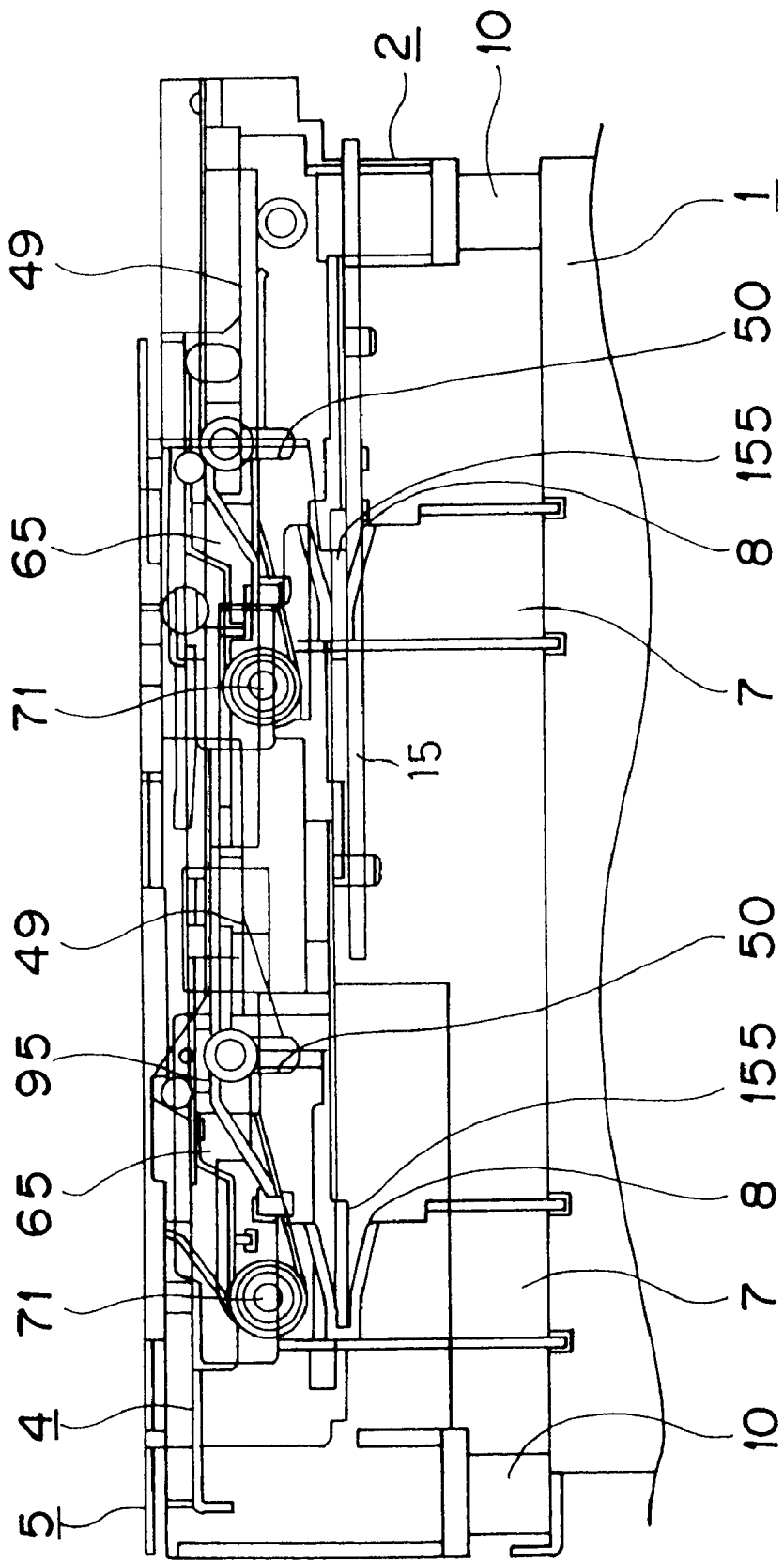
FIG. 19 is a side view showing the state where the cartridge holder has been moved to the second position opposite to loading portion.

Moreover, when the cartridge holder 4 is moved in the direction indicated by arrow Y in FIG. 17 toward the loading portion 300 direction, the supporting pin 95 is engaged with the engagement recessed portion 67 provided at the supporting lever 65. When the rotating body 45 is further rotated in the direction indicated by arrow $K_1$ in FIG. 17, the cartridge holder 4 is moved to the position opposite to the upper portion of the loading portion 300 as shown in FIG. 19, and the rotating body 45 is further rotated in the direction indicated by the arrow $K_1$ in FIG. 18, the supporting pin 95 reaches the position faced to the vertical guide groove 50 formed at the termination of the movement guide portion 49 provided at the supporting frame 16. When the rotating body is further rotated in the direction indicated by arrow $K_1$ in FIG. 18 from that position, the movement operation pin 48 is admitted into the circular arc shaped cam portion 112b of the cam groove 112, and is admitted into the portion between engagement portions 146 constituted between a pair of engagement pieces 147, 148 provided at the vertical movement operation plate 5 as shown in FIGS. 18 and 20.

When the movement operation pin 48 is admitted into the circular arc shaped cam portion 112b and the rotating body 45 is further rotated in the direction indicated by arrow $K_1$ in FIG. 18 from the state admitted into the portion between engagement portions 146, the vertical movement operation plate 5 is moved in the direction indicated by arrow N in FIG. 20 in the state where the cartridge holder 4 is maintained at the position opposite to the loading portion 300. Namely, the vertical movement operation plate 5 is moved in the direction indicated by arrow N in FIG. 20 as the result of the fact that one engagement piece 147 is pressed by rotating movement operation pin 48. When the vertical movement operation plate 5 is moved in the direction indicated by arrow N in FIG. 20, the supporting lever 65 which has supported the supporting pin 95 is caused to undergo biasing force of the torsional coil spring 66 so that it is rotated in the direction indicated by arrow A in FIG. 20. Followed by movement in the direction indicated by arrow N in FIG. 20 of the vertical movement operation plate 5, the supporting pin 95 is caused to undergo biasing force of the torsional coil spring 66 which rotationally biases the supporting pin 95, and is guided by vertical guide groove 50 formed at the supporting frame 16. Thus, the supporting pin 95 is lowered toward the base plate 15 side along the inclined cam portion 152 formed at the vertical movement operation plate 5.

When the supporting pin 95 is guided by the vertical guide groove 50 followed by movement in the direction indicated by arrow N in FIG. 20 of the vertical movement operation plate 5, the disc cartridge 220 or 221 held by the cartridge holder 4 is caused to undergo positioning of loading position by respectively fitting positioning pins 17, 18 into positioning holes 209 and 210. Thus, the disc cartridge 220 or 221 is loaded into the loading portion 300.

Moreover, when the vertical movement operation plate 5 is actuated so that the cartridge holder 4 is moved down to the position lowered to the position shown in FIG. 23 where the disc cartridge 220 or 221 is loaded into the loading portion 300, engagement into the engagement groove 8 provided at the supporting base 1 of the engagement piece 155 is released. Thus, the recording/reproducing unit mounting (attachment) base 2 in which the recording/reproducing unit to which the vertical movement operation plate 5 is attached is constituted is in the state supported on the supporting base 1 only by dumpers 10. Namely, the recording/reproducing unit mounting base 2 is brought into the state in a floating manner through the dumpers 10. Since the recording/reproducing unit mounting base 2 is supported in the floating state in this way, impact applied to the outer casing, etc. is absorbed by the dumpers 10. Thus, it is prevented that vibration, etc. is transmitted to the recording/reproducing unit mounting base 2.

When the vertical movement operation plate 5 is actuated to move the cartridge holder 4 down to the position lowered to the position close to the loading portion 300, pressing operation of the cover control lever 73 by the supporting pin 95 is released. Thus, the cover control lever 73 is caused to undergo biasing force of the compression coil spring 77 so that it is rotated to the initial position. Then, the connecting member 160 is caused to undergo rotational operation by the cover control lever 73 to allow the lock piece 163 to be in contact with the operation projection 159 to hold the rotary cover 157 in such a manner that the insertion/withdrawal hole is in closed state.

When the disc cartridge 220 or 221 is loaded into the loading portion as described above, the magneto-optical disc 201 or the optical disc 231 accommodated within the disc cartridge 220 or 221 is loaded onto the disc table 19 in the rotatable state in one body with the disc table 19. Then, the spindle motor 20 is driven to drive the optical pick-up device 21. Thus, reproduction of information signals recorded on the magneto-optical disc 201 or the optical disc 231 is carried out.

(3-4) Selection of Recording Mode

The vertical movement operation plate 5 is adapted as shown in FIGS. 24 and 25 so that after the disc cartridge 220 of the recording type is loaded into the loading portion 300, the rotating body 45 is rotationally operated in the direction indicated by arrow $K_1$ in FIG. 24, whereby,when it is caused to undergo movement operation in the forward direction of the direction indicated by arrow N in FIG. 24, the vertical movement operation plate 5 allows the magnetic head element 29 of the magnetic head unit 26 to undergo movement operation up to the position slidably in contact with the magneto-optical disc 201 loaded on the disc table 19.

In this state, recording of information signals with respect to the magneto-optical disc 201 by the optical pick-up device 201 and the magnetic head unit 29 can be made.

Then, by driving the optical pick-up device 21, the magnetic head unit 29 and the spindle motor 20, recording of information signals is carried out.

In this example, position of the vertical movement operation plate 5 is detected by first and second position detecting switches 62, 63, and is discriminated by control circuit on the basis of its detection signal. This control circuit also detects, through detection switch (not shown), whether the disc cartridge loaded on the loading portion 300 is the disc cartridge 220 of the recording type or the disc cartridge 221 of the reproduction only type. Further, this control circuit is operative so that in the case where the disc cartridge loaded into the loading portion 300 is the disc cartridge 221 of the reproduction only type, it holds the vertical movement operation plate 5 at the position where the cartridge holder 4 is lowered to the loading portion 300 side. Namely, further drive of the drive motor 34 for rotationally operating the rotating body 45 is limited.

(3-5) Eject Operation of the Disc Cartridge

In order to carry out eject operation to take out, from the cartridge holder 4, the disc cartridge 220 or 221 loaded at the loading portion 300, the drive motor 34 is drive in reverse direction. When the drive motor 34 is rotated in reverse direction, the rotating body 45 is rotationally operated in the direction indicated by arrow $K_2$ in FIG. 26. When the rotating body 45 is rotationally operated in the direction indicated by arrow $K_2$ in FIG. 26, the vertical movement operation plate 5 is moved by the movement operation pin 48 in the direction toward the inwardly of the outer casing in the direction indicated by arrow M in FIGS. 20 to 24. The cartridge holder 4 is moved toward the upper side to allow the supporting pin 95 to be away from the loading portion 300 while being guided by the vertical guide groove 50 by movement of the vertical movement operation plate 5 to detach the disc cartridge 220 or 221 from the loading portion 300.

At this time, the movement operation pin 48 is engaged with the engagement portion 146 to carry out movement operation of the vertical movement operation plate 5. In this case, the movement operation pin 48 moves within the circular arc shaped cam portion 112b of the cam groove 112 to limit movement in the horizontal direction of the cartridge holder 4.

When the movement operation pin 48 is rotated by 180 degrees along the circular arc shaped cam portion 112b, the vertical movement operation plate 5 is rotated from the circular arc shaped cam portion 112b up to the position faced to the cam portion 112a. In the process of this rotation, the vertical movement operation plate 5 is moved in the direction toward the inward of the outer casing which is the direction indicated by arrow M in FIGS. 20 to 24 to engage the engagement piece 155 with the engagement groove 8 provided at the supporting base 1 to fix, on the supporting base 1, the recording/reproducing unit mounting base 2 on which the cartridge holder 4 is attached. At this time, the movement operation pin 48 is away from the engagement portion 146 and is admitted into the linear cam portion 112a of the cam groove 112. When the rotating body 45 is further rotationally operated in the direction indicated by arrow $K_2$ in FIG. 26 from the above state, the movement operation pin 48 is moved in the direction indicated by arrow $R_3$ in FIG. 26 along the linear cam portion 112a to move the cartridge holder 4 in the first position direction close to the insertion/withdrawal hole which is the direction indicated by arrow O in FIGS. 26 to 28.

Figure 26:
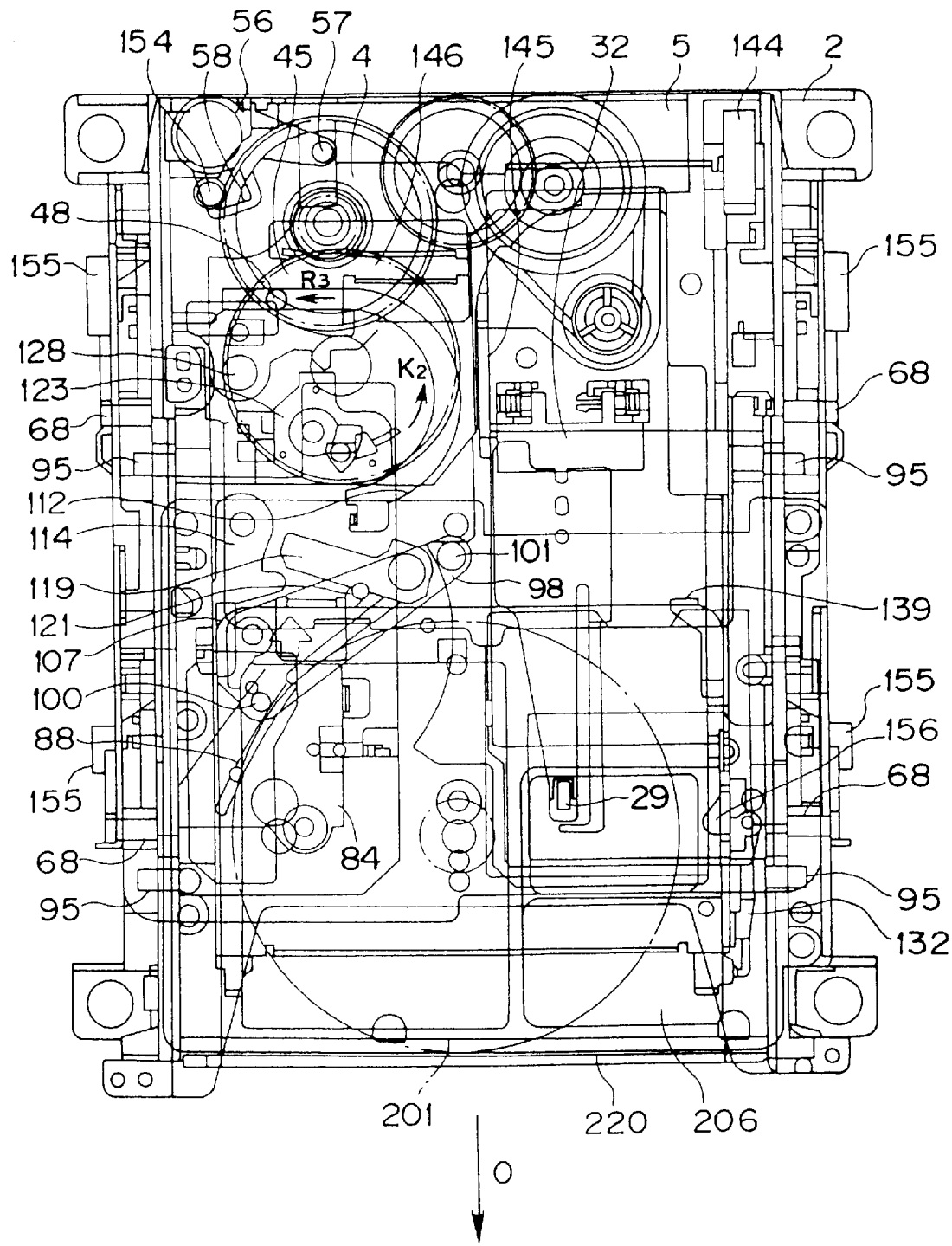
FIG. 26 is a plan view showing starting state of eject operation for moving the cartridge holder from the second position toward the first position.
Figure 27:
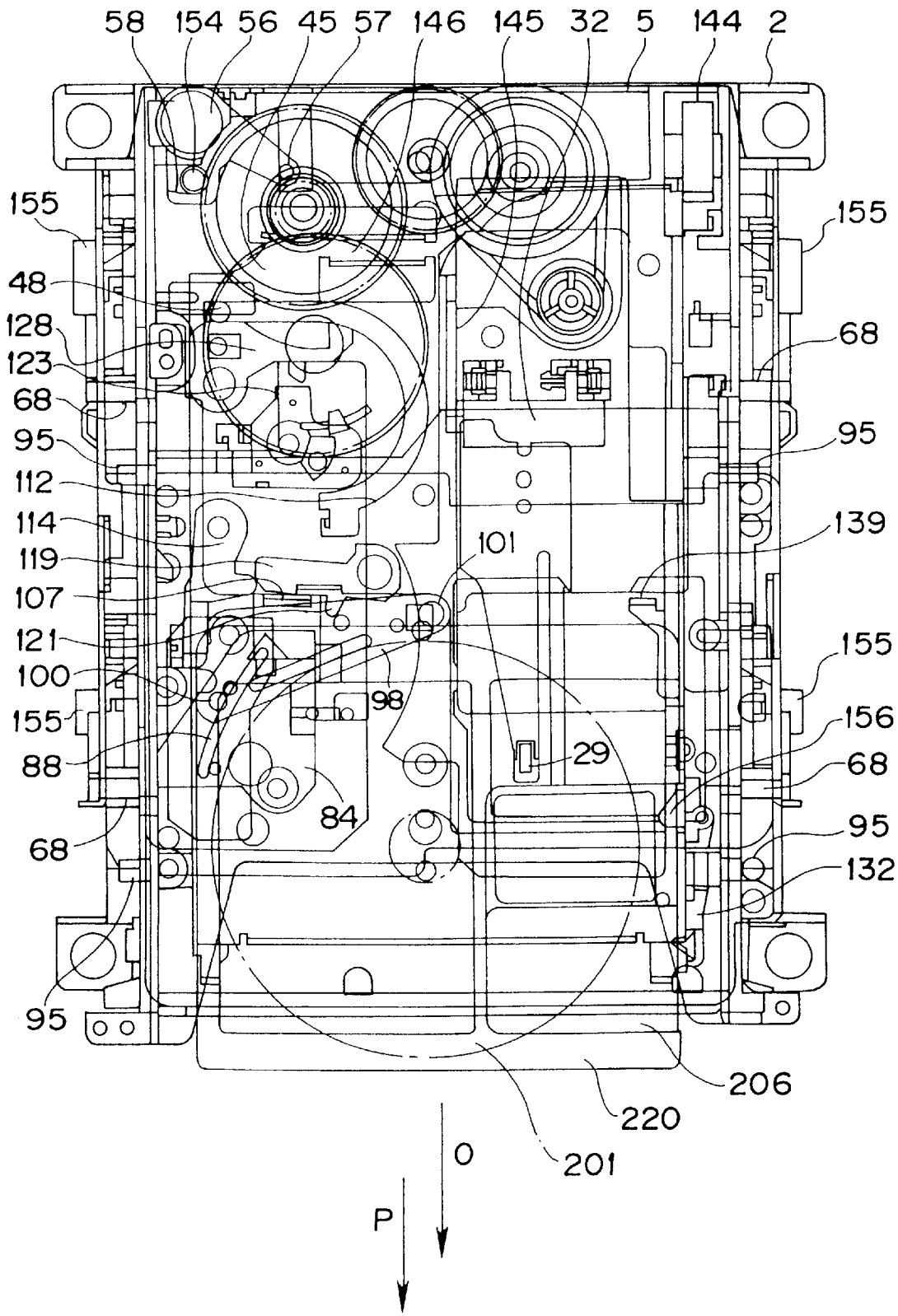
FIG. 27 is a plan view showing the state in the course of the eject operation that the cartridge holder moves from the second position toward the first position.
Figure 28:
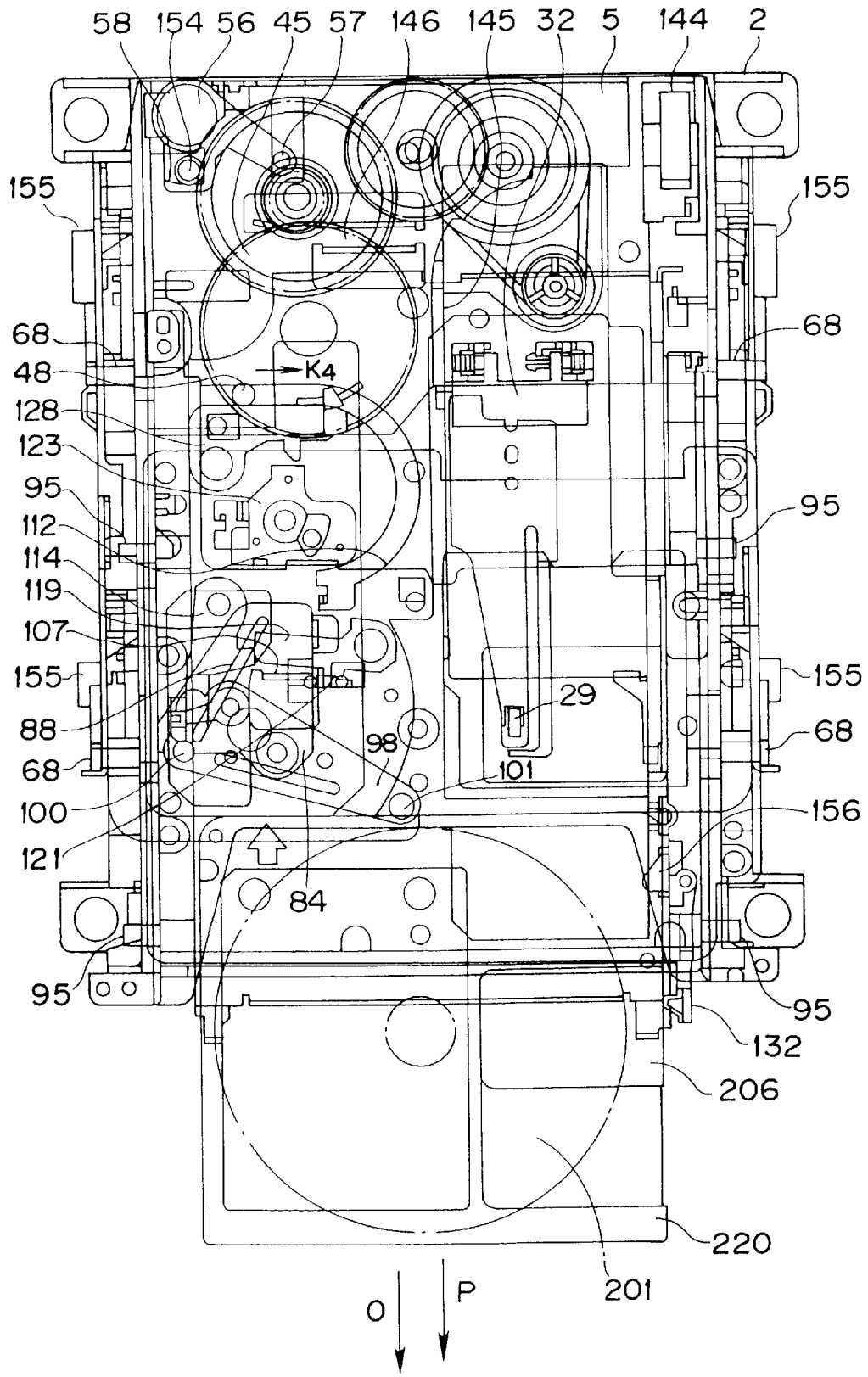
FIG. 28 is a plan view showing the state where the cartridge holder is moved to the first position so that eject operation which permits taking out of the disc cartridge has been completed.
Figure 29:
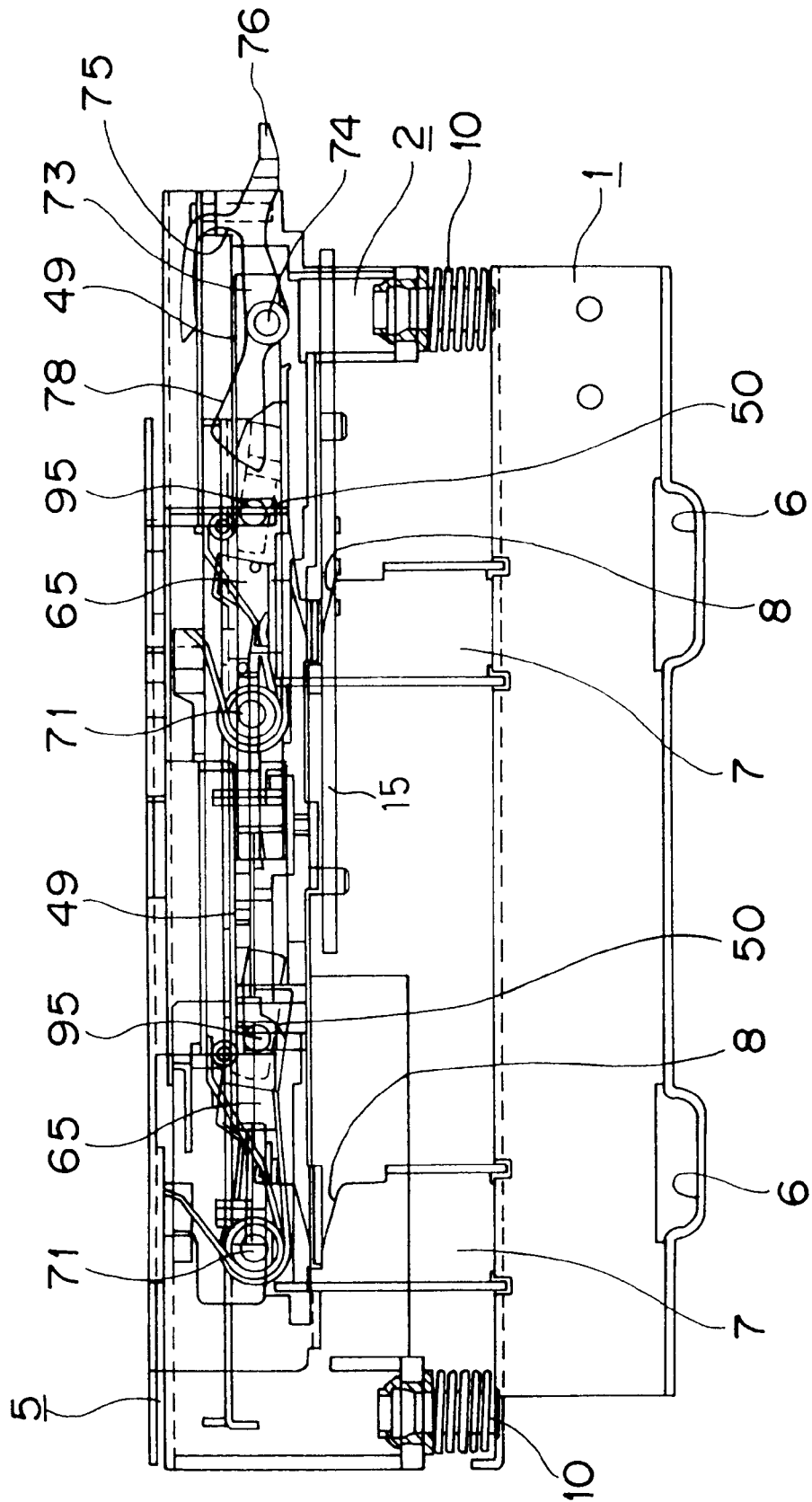
FIG. 29 is a side view showing the essential part of a recording/reproducing apparatus according to this invention.
Figure 30:
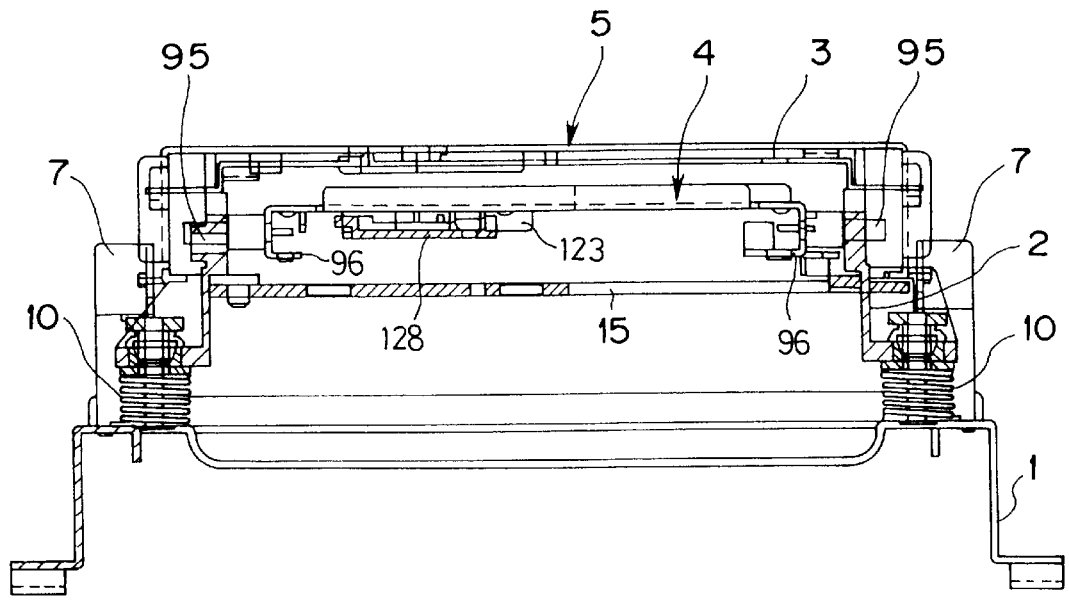
FIG. 30 is a front view showing the essential part of the recording/reproducing apparatus according to this invention.
Figure 31:
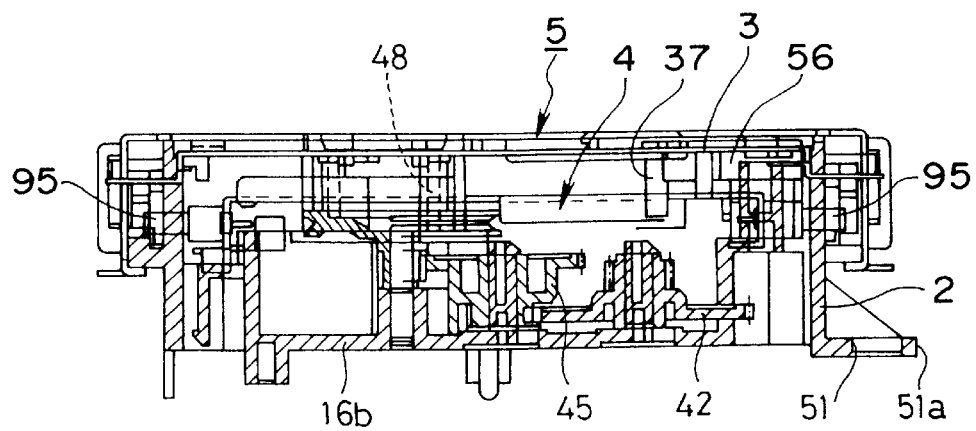
FIG. 31 is a back view showing, partially in a broken manner, the essential part of the recording/reproducing apparatus according to this invention.

At this time, the drive pin 100 of the eject lever 98 is passed through the second path with respect to the guide member 84 and is caused to undergo movement operation by the guide member 84 to press the disc cartridge 220 or 221 held by the cartridge holder 4 through the eject lever 98 toward the insertion/withdrawal hole side in the direction indicated by arrow P in FIGS. 26 to 28. Namely, when the drive pin 100 is passed through the second path with respect to the guide member 84, it is moved with respect to the cartridge holder 4 following the other side portion of the projecting portion 88 of the guide member 84 located at the initial position.

Moreover, for a time period during which the cartridge holder 4 is moved from the second position to the first position, the cover control lever 73 allows the rotary cover 157 to undergo rotational operation through the connecting member 160 to rotate it at the position where the insertion/withdrawal hole is opened so that the rotary cover 157 does not come into contact with the disc cartridge 220 or 221 ejected toward the outside of the outer casing through the insertion/withdrawal hole.

It is to be noted that for a time period until the rotating body 45 is rotated by substantially 90 degrees in the direction indicated by arrow $K_2$ in FIG. 26 after the transfer (movement) operation pin 48 is pulled (slipped) out from the circular arc shaped cam portion 112b, the movement operation pin 48 moves in the direction indicated by arrow $R_3$ in FIG. 26 along the linear cam portion 112a. In this case, for a time period during which the rotating body 45 is further rotated by substantially 90 degrees in the direction indicated by arrow $K_2$ in FIG. 26 above substantially 90 degrees, the movement operation pin 48 moves in the direction indicated by arrow $R_4$ in FIG. 28 in a direction opposite to the above along the linear cam portion 112a to move the cartridge holder 4 in the direction indicated by arrow O in FIG. 28. Namely, when the rotating body 45 is rotated by 180 degrees as a whole, the cartridge holder 4 is moved from the second position to the first position.

Further, when the cartridge holder 4 is moved up to the first position shown in FIG. 28, the eject lever 98 is rotated in a direction to project the disc cartridge 220 or 221 from the cartridge holder 4 by the guide member 84. The disc cartridge 220 or 221 is partially projected from the insertion/withdrawal hole by rotation of the eject lever 98, and is gripped (grasped) by finger so that it is placed in drawable state from the cartridge holder 4. By drawing the disc cartridge 220 or 221 from the insertion/withdrawal hole, the eject operation is completed.

As described above, the cartridge holder 4 is moved up to the position where the disc cartridge 220 or 221 can be taken out, whereby this disc recording/reproducing apparatus is placed in the initial state where the disc cartridge 220 or 221 can be inserted into the cartridge holder 4 for a second time.

Industrial Applicability

The loading device for recording medium according to this invention allows the cartridge holder for holding disc cartridge used as a recording medium for information signals and the vertical movement operation mechanism including vertical movement operation plate for carrying out vertical movement operation of the cartridge holder with respect to the loading portion to selectively undergo movement operation by the rotating body and the movement operation mechanism for rotationally operating the rotating body in dependency upon position of the cartridge holder to thereby carry out transfer (movement) operation extending over the inside and outside of the outer casing of the disc cartridge and the loading operation into the loading portion. Accordingly, it is possible to securely carry out a series of operations from the transfer operation of the disc cartridge to the loading operation into the loading portion.

In addition, since the transfer operation of the disc cartridge and the loading operation into the loading portion are carried out by the common movement operation mechanism, the mechanism is simplified and miniaturization of the device itself can be realized. Thus, miniaturization of recording and/or reproducing apparatus provided with such a loading device can be also realized.

What is claimed is:

1. A loading device for a recording medium, comprising:

a loading portion positioned on a base;

holding means for holding an inserted or loaded recording medium and movably provided between a first position which permits taking out of the inserted recording medium and a second position located above the loading portion;

moving means for moving the holding means from the first position to the second position by rotational operation of the moving means through a first range, wherein the first range moves the holding means from the first position to the second position;

loading means for moving the holding means vertically, onto the loading portion, the holding means having been moved to the second position by the moving means, the loading means being driven by rotational operation of the moving means through a second range continuous from the rotational operation through the first range of the moving means, wherein the second range ranges from the second position to a position on the loading portion; and limiting means provided on the loading means, and for limiting movement of the holding means with respect to the base when the holding means is moved from the first position to the second position, or from the second position to the first position, and for releasing limitation of movement with respect to the base of the holding means in a manner interlocking with an operation that the holding means allows the holding means to undergo loading onto the loading portion, wherein, within the holding means, there is formed a linear cam portion engagable with the moving means to move the holding means from the first position to the second position by the rotational operation through the first range, and a circular arc shaped cam portion formed continuously to the linear cam portion for moving the loading means in a direction from the second position to the position on the loading portion by the rotational operation through the second range.

2. A loading device for a recording medium as set forth in claim 1, wherein the moving means comprises an engagement portion to be engaged with the linear cam portion and the circular arc shaped cam portion, a rotating body provided at the engagement portion, and drive means for rotationally driving the rotating body, whereby the engagement portion is engaged with the linear cam portion by rotation of 180 degrees of the rotating body to move the holding means from the first position to the second position, and the engagement portion is engaged with the circular arc shaped cam portion by further rotation of 180 degrees of the rotating body to move the loading means in a direction from the second position to the first position.

3. A loading device for a recording medium, comprising:

a loading portion positioned on a base;

holding means for holding an inserted or loaded recording medium and movably provided between a first position which permits taking out of the inserted recording medium and a second position located above the loading portion;

moving means for moving the holding means from the first position to the second position by rotational operation of the moving means through a first range, wherein the first range moves the holding means from the first position to the second position;

loading means for moving the holding means vertically, onto the loading portion, the holding means having been moved to the second position by the moving means, the loading means being driven by rotational operation of the moving means through a second range continuous from the rotational operation through the first range of the moving means, wherein the second range ranges from the second position to a position on the loading portion; and limiting means provided on the loading means, and for limiting movement of the holding means with respect to the base when the holding means is moved from the first position to the second position, or from the second position to the first position, and for releasing limitation of movement with respect to the base of the holding means in a manner interlocking with an operation that the holding means allows the holding means to undergo loading onto the loading portion, wherein the limiting means comprises at least one engagement projection provided at either of the loading means and the base, and an engagement portion to be engaged with the engagement projection provided at the other, whereby when the loading means allows the holding means to undergo loading onto the loading portion, engagement between the engagement projection and the engagement portion is released, and when the loading means allows the holding means to be away from the loading portion, the engagement projection and the engagement portion are engaged with each other.

4. A loading device for a recording medium, comprising:

a loading portion positioned on a base;

holding means for holding an inserted or loaded recording medium and movably provided between a first position which permits taking out of the inserted recording medium and a second position located above the loading portion;

moving means for moving the holding means from the first position to the second position by rotational operation of the moving means through a first range, wherein the first range moves the holding means from the first position to the second position;

loading means for moving the holding means vertically, onto the loading portion, the holding means having been moved to the second position by the moving means, the loading means being driven by rotational operation of the moving means through a second range continuous from the rotational operation through the first range of the moving means, wherein the second range ranges from the second position to a position on the loading portion; and limiting means provided on the loading means, and for limiting movement of the holding means with respect to the base when the holding means is moved from the first position to the second position, or from the second position to the first position, and for releasing limitation of movement with respect to the base of the holding means in a manner interlocking with an operation that the holding means allows the holding means to undergo loading onto the loading portion; and a rotational member caused to undergo rotational operation when the holding means is caused to undergo movement operation from the first position to the second position, or from the second position to the first position, and an opening/closing mechanism for opening/closing an insertion space of the recording medium formed at the front surface side of the holding means, whereby the opening/closing mechanism is configured so that opening/closing operation is limited by the rotational member, and only when the holding means is located at the first position, limitation by the rotational member is released so that movement in a direction to open the insertion space can be made by the opening/closing means.

5. A recording and/or reproducing apparatus for a recording medium, comprising:

recording and/or reproducing means for carrying out recording and/or reproduction of information with respect to the recording medium, which is provided with a head slidably in contact with one surface of the recording medium movably supported between a position slidably in contact with the recording medium and a position away from the recording medium;

holding means for holding the inserted recording medium, and movably provided between a first position where taking out of the inserted recording medium is permitted and a second position located above a loading portion;

moving means for moving the holding means from the first position to the second position by rotational operation of the moving means through a first range, wherein the first range moves the holding means from the first position to the second position;

loading means for loading the holding means moved to the second position by the moving means onto the loading portion, the loading means being driven by rotational operation of the moving means through a second range continuous from the rotational operation through the first range of the moving means, wherein the second range ranges from the second position to a position on the loading portion;

head moving means driven by the loading means, and adapted for moving the head between a position caused to be slidably in contact with the recording medium and a position caused to be away from the recording medium; and a linear cam portion, formed within the holding means, engaged with the moving means to move the holding means from the first position to the second position by the rotational operation through the first range, and a circular arc shaped cam portion formed continuously to the linear cam portion and adapted for moving the loading means in a direction from the first position to the second position by the rotational operation through the second range.

6. A recording and/or reproducing apparatus for a recording medium as set forth in claim 5, wherein the moving means comprises an engagement portion engaged with the linear cam portion and the circular arc shaped cam portion, a rotating body provided at the engagement portion, and drive means for rotationally driving the rotating body, whereby the engagement portion is engaged with the linear cam portion by rotation of 180 degrees of the rotating body to move the holding means from the first position to the second position, and the engagement portion is engaged with the circular arc shaped cam portion by further rotation of 180 degrees of the rotating body to move the loading means in a direction from the second position to the first position.

7. The recording and/or reproducing apparatus for a recording medium, comprising:

recording and/or reproducing means for carrying out recording and/or reproduction of information with respect to the recording medium, which is provided with a head slidably in contact with one surface of the recording medium movably supported between a position slidably in contact with the recording medium and a position away from the recording medium;

holding means for holding the inserted recording medium, and movably provided between a first position where taking out of the inserted recording medium is permitted and a second position located above a loading portion;

moving means for moving the holding means from the first position to the second position by rotational operation of the moving means through a first range, wherein the first range moves the holding means from the first position to the second position;

loading means for loading vertically the holding means moved to the second position by the moving means onto the loading portion, the loading means being driven by rotational operation of the moving means through a second range continuous from the rotational operation through the first range of the moving means, wherein the second range ranges from the second position to a position on the loading portion;

head moving means driven by the loading means, and adapted for moving the head between a position caused to be slidably in contact with the recording medium and a position caused to be away from the recording medium; and a linear cam portion, formed within the holding means, engaged with the moving means to move the holding means from the first position to the second position by the rotational operation through the first range, and a circular arc shaped cam portion formed continuously to the linear cam portion and adapted for moving the loading means in a direction from the first position to the second position by the rotational operation through the second range.

8. The recording and/or reproducing apparatus for a recording medium of claim 7, wherein the moving means comprises an engagement portion engaged with the linear cam portion and the circular arc shaped cam portion, a rotating body provided at the engagement portion, and drive means for rotationally driving the rotating body, whereby the engagement portion is engaged with the linear cam portion by rotation of 180 degrees of the rotating body to move the holding means from the first position to the second position, and the engagement portion is engaged with the circular arc shaped cam portion by further rotation of 180 degrees of the rotating body to move the loading means in a direction from the second position to the first position.

9. The recording and/or reproducing apparatus for a recording medium, comprising:

a recording and/or reproducing unit having a head slidably in contact with one surface of the recording medium movably supported between a position slidably in contact with the recording medium and a position away from the recording medium;

a holder for holding the inserted recording medium, and movably provided between a first position where taking out of the inserted recording medium is permitted and a second position located above a loading portion;

a movement mechanism for moving the holder from the first position to the second position by rotational operation of the movement mechanism through a first range, wherein the first range moves the holding means from the first position to the second position;

a loading mechanism for moving vertically the holder moved to the second position onto the loading portion by rotational operation of the movement mechanism through a second range continuous from the rotational operation through the first range, wherein the second range ranges from the second position to a position on the loading portion;

a head moving mechanism driven by the loading mechanism and for moving the head between a position caused to be slidably in contact with the recording medium and a position caused to be away from the recording medium; and a linear cam portion, formed within the holder, engaged with the movement mechanism to move the holder from the first position to the second position by the rotational operation through the first range, and a circular arc shaped cam portion formed continuously to the linear cam portion and adapted for moving the loading mechanism in a direction from the first position to the second position by the rotational operation through the second range.

10. The recording and/or reproducing apparatus for a recording medium of claim 9, wherein the movement mechanism comprises an engagement portion engaged with the linear cam portion and the circular arc shaped cam portion, a rotating body provided at the engagement portion, and drive means for rotationally driving the rotating body, whereby the engagement portion is engaged with the linear cam portion by rotation of 180 degrees of the rotating body to move the holder from the first position to the second position, and the engagement portion is engaged with the circular arc shaped cam portion by further rotation of 180 degrees of the rotating body to move the loading mechanism in a direction from the second position to the first position.

* * * * *